(12) United States Patent
Lee et al.

(10) Patent No.: US 10,168,736 B2
(45) Date of Patent: Jan. 1, 2019

(54) COUPLING MEMBER AND ELECTRONIC DEVICE INCLUDING THE SAME

(71) Applicant: Samsung Electronics Co., Ltd., Suwon-si, Gyeonggi-do (KR)

(72) Inventors: Hyung-Woo Lee, Seoul (KR); Hwan-Seok Choi, Hwaseong-si (KR); Kyung-Hwan Lee, Seoul (KR); Jong-Cheon Wee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 15/235,918

(22) Filed: Aug. 12, 2016

(65) Prior Publication Data
US 2017/0045910 A1    Feb. 16, 2017

(30) Foreign Application Priority Data

Aug. 13, 2015    (KR) .................. 10-2015-0114309
Jul. 21, 2016    (KR) .................. 10-2016-0092500

(51) Int. Cl.
*G06F 1/16*    (2006.01)

(52) U.S. Cl.
CPC ............ *G06F 1/163* (2013.01); *G06F 1/1633* (2013.01); *G06F 1/1637* (2013.01); *G06F 1/1656* (2013.01)

(58) Field of Classification Search
CPC ...................................................... G06F 1/163
See application file for complete search history.

(56) References Cited

U.S. PATENT DOCUMENTS

| | | | |
|---|---|---|---|
| 9,612,623 B2 * | 4/2017 | Lim ..................... | G06F 1/166 |
| 2001/0016971 A1 | 8/2001 | Guyard | |
| 2003/0002394 A1 | 1/2003 | Kinkio et al. | |
| 2007/0070823 A1 | 3/2007 | Sima | |
| 2007/0143970 A1 | 6/2007 | Loetscher | |
| 2008/0159085 A1 | 7/2008 | Hozumi et al. | |
| 2013/0003510 A1 | 1/2013 | Speichinger | |
| 2015/0181351 A1 * | 6/2015 | Sarow ................ | A44C 5/0015 |
| | | | 381/334 |

(Continued)

FOREIGN PATENT DOCUMENTS

| | | |
|---|---|---|
| EP | 0 731 395 A2 | 9/1996 |
| EP | 2 319 349 A1 | 8/2001 |

(Continued)

*Primary Examiner* — Nidhi Thaker
(74) *Attorney, Agent, or Firm* — Jefferson IP Law, LLP

(57) ABSTRACT

A coupling member that is attachable to/detachable from a housing of an electronic device while making the housing wearable on a user's body, and an electronic device including the coupling member is provided. The electronic device includes a band member that is configured to come in contact with a user's body portion, a slide member that is mounted on the band member, and is bound to a portion of the housing in a state where the coupling member is mounted on the housing, an opening that is formed in the slide member, a locking member that is disposed on the band member, and a locking protrusion that is formed on a locking member. The locking protrusion appears to the outside of the slide member through the opening according to the reciprocating of the locking member, and the coupling member is bound to the housing.

25 Claims, 47 Drawing Sheets

(56) References Cited

U.S. PATENT DOCUMENTS

| | | | |
|---|---|---|---|
| 2015/0342308 A1* | 12/2015 | Wilson | A45F 5/00 224/219 |
| 2016/0073519 A1* | 3/2016 | Hiroki | G06F 1/163 361/749 |
| 2016/0223992 A1* | 8/2016 | Seo | G04G 19/10 |
| 2016/0320583 A1* | 11/2016 | Hall, Jr. | G02B 7/002 |
| 2016/0322745 A1* | 11/2016 | Shedletsky | G06F 1/163 |
| 2016/0342176 A1* | 11/2016 | Han | G06F 1/163 |
| 2016/0349707 A1* | 12/2016 | Huang | G04B 37/1486 |

FOREIGN PATENT DOCUMENTS

| | | | |
|---|---|---|---|
| JP | H7-263078 A | 10/1995 | |
| JP | 8-315 A | 1/1996 | |
| JP | 2015-136547 A | 7/2015 | |
| KR | 10-2003-0001337 A | 1/2003 | |
| KR | 10-0784342 B1 | 12/2007 | |

* cited by examiner

COUPLING MEMBER AND ELECTRONIC DEVICE INCLUDING THE SAME

CROSS-REFERENCE TO RELATED APPLICATION(S)

This application claims the benefit under 35 U.S.C. § 119(a) of a Korean patent application filed on Aug. 13, 2015 in the Korean Intellectual Property Office and assigned Serial number 10-2015-0114309 and of a Korean patent application filed on Jul. 21, 2016 in the Korean Intellectual Property Office and assigned Serial number 10-2016-0092500, the entire disclosure of which is hereby incorporated by reference.

TECHNICAL FIELD

The present disclosure relates to an electronic device. More particularly, the present disclosure relates to an electronic device that is wearable on a body.

BACKGROUND

An electronic device refers to a device that performs a specific function according to an equipped program, such as an electronic scheduler, a portable multimedia reproducer, a mobile communication terminal, a tablet personal computer (PC), an image/sound device, a desktop/laptop PC, or a vehicular navigation system, as well as a home appliance. For example, such an electronic device may output information stored therein as sound or an image. As the degree of integration of such an electronic device has increased, and as super-high speed and large capacity wireless communication has become popular, various functions have recently been equipped in a single mobile communication terminal. For example, functions (such as an entertainment function (e.g., a game function), a multimedia function (e.g., a music/video reproducing function), a communication and security function for mobile banking, a schedule management function, and an e-wallet function) are integrated in a single electronic device, in addition to a communication function.

A portable electronic device (e.g., an electronic scheduler, a portable multimedia reproducer, a mobile communication terminal, or a tablet PC) is generally equipped with a flat display device and a battery, and has a bar-type, folder-type, or sliding-type appearance. Recently, as the electronic communication technology has been developed, electronic devices have been miniaturized, and thus, an electronic device, which is wearable on a portion of a body (such as a wrist or a head) has been commercialized.

As carrying an electronic device becomes daily routine and the electronic device becomes wearable, the electronic device may also be used as a means for expressing a user's personality. In order to express one's personality using the electronic device, the user may mount or attach an additional decoration to the exterior of the electronic device. However, this may deteriorate the inherent appearance of the electronic device.

A wearable electronic device includes a coupling member that makes the electronic device wearable on a human body. When the coupling member is attachable to/detachable from a main body or housing of the electronic device, it is possible to variously express one's personality while maintaining the intrinsic appearance of the electronic device. When it is easy to attach/detach the coupling member to/from the housing, a coupling member having an external appearance that is desired by the user may be easily mounted on the housing.

However, the coupling member may be easily released from the housing in the worn state. For example, when the coupling member is made to be easily attached/detached, it may be difficult to maintain a stable worn state.

On the contrary, when the coupling member is rigidly mounted on the housing in order to stably maintain the electronic device in the state where the electronic device is worn on a human body, it may be difficult for the user to separate the coupling member from the housing. For example, in a structure in which the worn state is stably maintained, it may difficult to replace the coupling member with another one having an appearance that is desired by the user.

Therefore, a need exits for a coupling member that can be easily replaced while making a housing wearable on a user's body so that various users' personalities and tastes can be satisfied, and an electronic device including the coupling member.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a coupling member that can be easily replaced while making a housing wearable on a user's body so that various users' personalities and tastes can be satisfied, and an electronic device including the coupling member.

Various embodiments of the present disclosure may provide a coupling member that makes a housing wearable on a user's body and can be easily removed from the housing while being rigidly mounted on the housing, and an electronic device including the coupling member.

In accordance with an aspect of the present disclosure, a wearable electronic device is provided. The wearable electronic device includes a housing that includes a first face that faces in a first direction, a second face that faces in a second direction that is opposite to the first direction, and a side face that at least partially encloses a space between the first face and the second face, a display that is exposed through the first face of the housing, and a coupling member that is mounted to be attachable to/detachable from a portion that faces in a third direction in the side face of the housing, and is configured to detachably couple the electronic device to a user's body portion.

A portion of the housing includes a first recess that is formed on a portion of the side face of the housing in a fourth direction that is opposite to the third direction, a first protrusion that protrudes in the third direction from another portion of the side face of the housing, and a second recess that extends on at least a portion of the first protrusion to face in the first direction.

The coupling member includes a first portion that is configured to be in contact with the user's body portion when the electronic device is coupled to the user's body portion, a second portion that is arranged to be movable in the third direction between the first portion and the portion of the housing when the coupling member is mounted on the portion of the housing, and includes a second protrusion that protrudes in a fourth direction, and a third portion that is disposed between the second portion and the portion of the housing and includes at least one opening.

When the coupling member is mounted on the portion of the housing, the second protrusion may protrude to the outside of the third portion through the opening to be at least partially accommodated in the first recess, and the third portion may be at least partially accommodated in the second recess.

In accordance with another aspect of the present disclosure, a wearable electronic device is provided. The wearable electronic device includes a housing that includes a first face that faces in a first direction, a second face that faces in a second direction that is opposite to the first direction, and a side face that at least partially encloses a space between the first face and the second face, a display that is exposed through the first face of the housing, and a coupling member that is mounted to be attachable to/detachable from a portion that faces in a third direction in the side face of the housing, and is configured to detachably couple the electronic device to a user's body portion.

A portion of the housing includes a first protrusion and a second protrusion that protrude in the third direction, a first recess that is formed on the first protrusion in a fourth direction that is perpendicular to the third direction, and a second recess that is formed on the second protrusion in a fifth direction that is opposite to the fourth direction.

The coupling member includes a first portion that is configured to be in contact with the user's body portion when the electronic device is coupled to the user's body portion, a through-hole that is formed through the first portion in the fourth direction or the fifth direction, a recess that is formed to extend from the one face of the first portion in the first direction to be connected to the through-hole, a bar that is disposed inside the through-hole, and configured to have elasticity in the fourth direction and/or the fifth direction, and a button that is at least partially disposed inside the recess, and is arranged to be pushed in the first direction.

When the coupling member is mounted on the portion of the housing, the first portion may be at least partially disposed between the first protrusion and the second protrusion, and the opposite ends of the bar may be accommodated in the first and second recesses, respectively.

In accordance with another aspect of the present disclosure, a wearable electronic device is provided. The wearable electronic device includes a housing that includes a first face that faces in a first direction, a second face that faces in a second direction that is opposite to the first direction, and a side face that at least partially encloses a space between the first face and the second face, a display that is exposed through the first face of the housing, and a coupling member that is mounted to be attachable to/detachable from a portion that faces in a third direction in the side face of the housing, and is configured to detachably couple the electronic device to a user's body portion.

The coupling member includes a button that releases the coupling member from the portion of the housing by a movement in the third direction.

A coupling member according to various embodiments of the present disclosure is a coupling member that is attachable to/detachable from a housing of an electronic device, and makes the housing wearable on a user's body. The coupling member includes a band member that is configured to come in contact with the user's body portion, a slide member that is mounted on the band member, and is bound to a portion of the housing in the state where the coupling member is mounted on the housing, an opening that is formed in the slide member, a locking member that is disposed on the band member, and is disposed to be reciprocated between the slide member and the band member in a state where the coupling member is mounted on the housing, and a locking protrusion that is formed on a locking member.

The locking protrusion may appear to the outside of the slide member through the opening according to the reciprocating of the locking member, and the coupling member may be bound to the housing.

According to the coupling member of various embodiments of the present disclosure and the electronic device including the coupling member, it is possible to rigidly fix the housing and the coupling member to each other by forming the coupling member to be attachable to/detachable from the housing and restricting the movement of the coupling member in the attachment/detachment direction in the state where the coupling member is mounted on the housing. According to various embodiments of the present disclosure, a second portion (e.g., a locking member), which is disposed on a first portion (e.g., a band member) to be reciprocated, is disposed on the coupling member such that the user can easily release the locked state between the coupling member and the housing by manipulating the second portion. For example, the user may easily replace the coupling member by releasing the locking state between the coupling member and the housing by using the second portion. According to various embodiments of the present disclosure, since it is easy to attach/detach the coupling member to/from the housing, the user may mount a coupling member, which has an external appearance that is desired by the user, on the housing.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
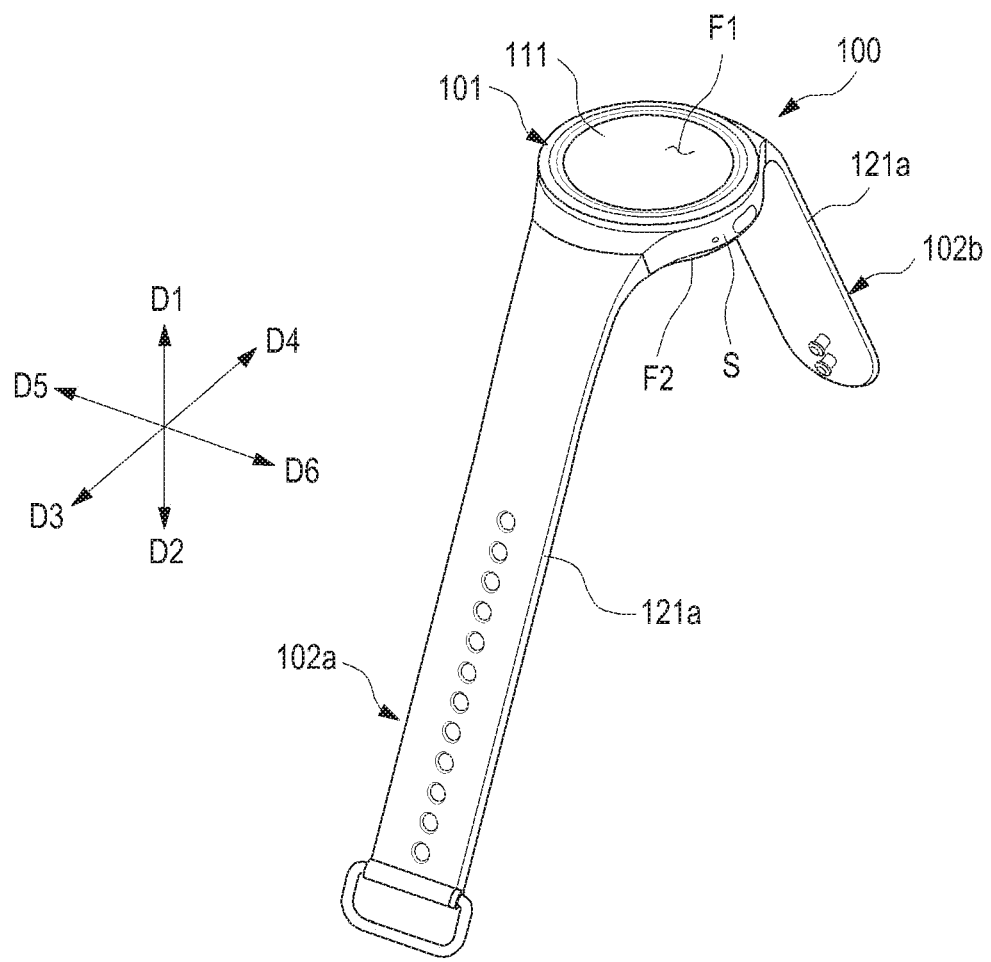
FIG. 1 is a perspective view illustrating an electronic device including a coupling member according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In an embodiment of the present disclosure, the expression "A or B", "at least one of A or/and B", or "one or more of A or/and B" includes all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., a first element) is referred to as being (operatively or communicatively) "connected," or "coupled," to another element (e.g., a second element), it may be directly connected or coupled directly to the other element or any other element (e.g., a third element) may be interposer between them. In contrast, it may be understood that when an element (e.g., the first element) is referred to as being "directly connected," or "directly coupled" to another element (e.g., the second element), there are no element (e.g., the third element) interposed between them.

The expression "configured to" used in an embodiment of the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., an embedded processor) only for performing the corresponding operations or a generic-purpose processor (e.g., central processing unit (CPU) or application processor (AP)) that can perform the corresponding operations by executing one or more software programs stored in a memory device.

In an embodiment of the present disclosure, the terms are used to describe specific embodiments of the present disclosure, and are not intended to limit the present disclosure. As used herein, the singular forms are intended to include the plural forms as well, unless the context clearly indicates otherwise. In the description, it should be understood that the terms "include" or "have" indicate existence of a feature, a number, an operation, a structural element, parts, or a combination thereof, and do not previously exclude the existences or probability of addition of one or more another features, numeral, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in an embodiment of the present specification. In some cases, even the term defined in an embodiment of the present disclosure should not be interpreted to exclude embodiments of the present disclosure.

In an embodiment of the present disclosure, an electronic device may be a random device, and the electronic device may be called a terminal, a portable terminal, a mobile terminal, a communication terminal, a portable communication terminal, a portable mobile terminal, a touch screen, and the like.

For example, the electronic device may be a smartphone, a portable phone, a game player, a television (TV), a display unit, a heads-up display unit for a vehicle, a notebook computer, a laptop computer, a tablet personal computer (PC), a personal media player (PMP), a personal digital assistants (PDA), and the like. The electronic device may be implemented as a portable communication terminal which has a wireless communication function and a pocket size. Further, the electronic device may be a flexible device or a flexible display device.

The electronic device may communicate with an external electronic device, such as a server, and the like, or perform an operation through an interworking with the external electronic device. For example, the electronic device may transmit an image photographed by a camera and/or position information detected by a sensor unit to the server through a network.

Figure 2:
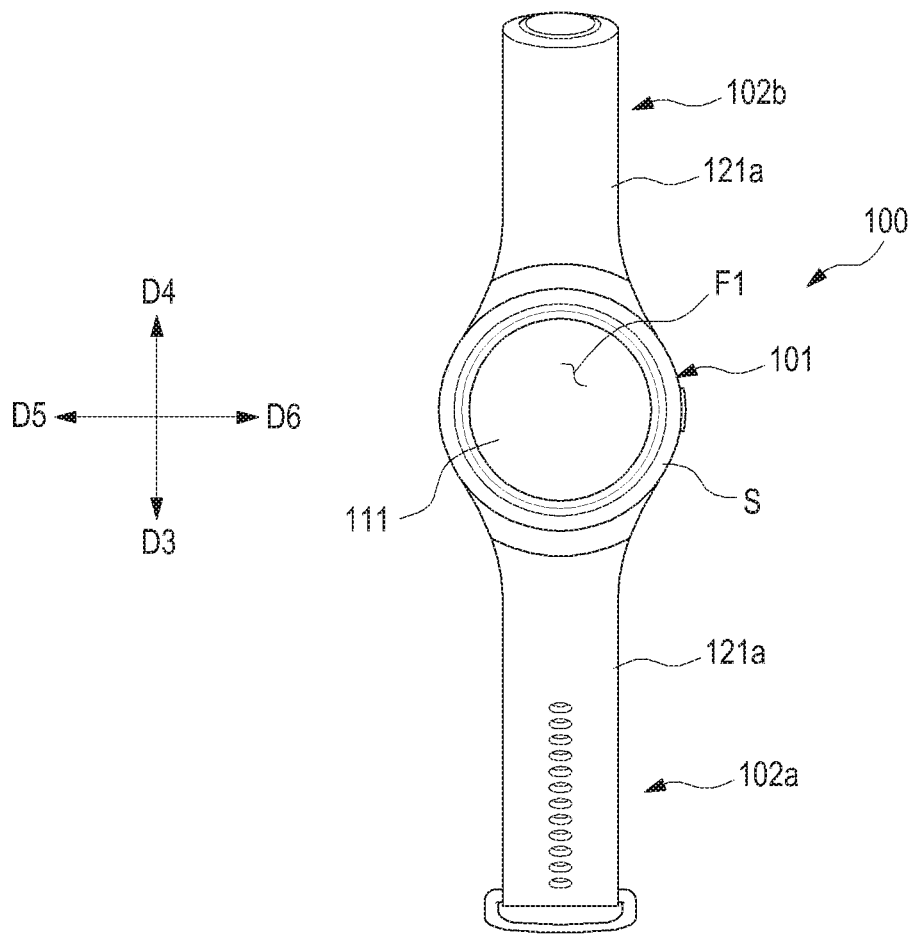
FIG. 2 is a plan view illustrating an electronic device including a coupling member according to various embodiments of the present disclosure.
Figure 3:
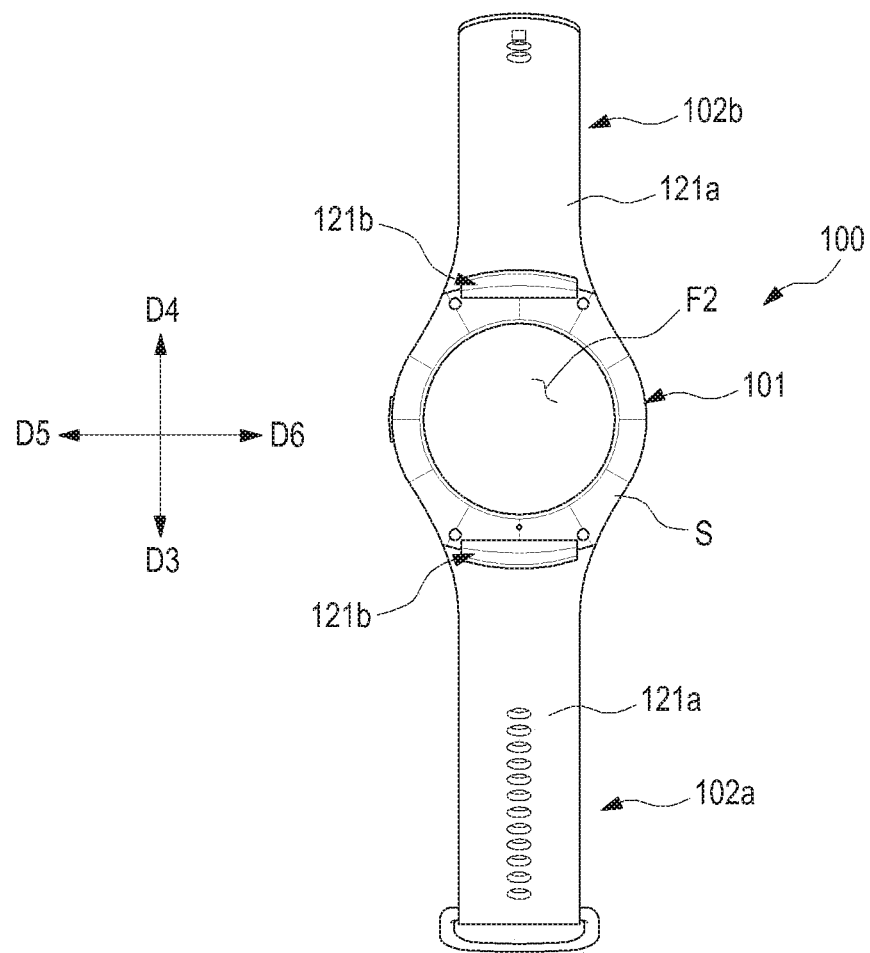
FIG. 3 is a bottom view illustrating an electronic device including a coupling member according to various embodiments of the present disclosure.
Figure 4:
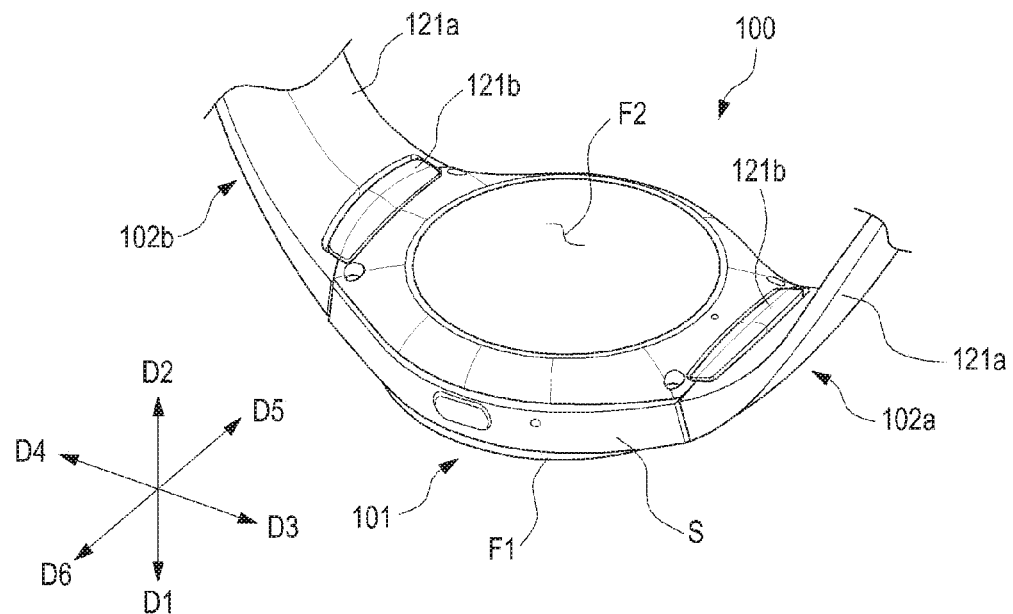
FIG. 4 is a perspective view illustrating a portion of an electronic device including a coupling member in an enlarged scale according of various embodiments of the present disclosure.

FIG. 1 is a perspective view illustrating an electronic device including a coupling member according to various embodiments of the present disclosure. FIG. 2 is a plan view illustrating an electronic device including a coupling member according to various embodiments of the present disclosure. FIG. 3 is a bottom view illustrating an electronic device including a coupling member according to various embodiments of the present disclosure. FIG. 4 is a perspective view illustrating a portion of an electronic device including a coupling member according to various embodiments of the present disclosure in an enlarged scale.

Referring to FIGS. 1 to 4, an electronic device 100 includes a housing 101 and coupling members 102a and 102b that are provided on the housing 101. As will be described below, the coupling members 102a and 102b are attachable to/detachable from the housing 101, and may be utilized for wearing the electronic device 100 (e.g., the housing 101) to a user's body.

The housing 101 includes a first face F1 that faces in a first direction D1, a second face F2 that faces in a second direction D2 that is opposite to the first direction D1, and a side face S that at least partially encloses a space between the first face F1 and the second face F2. Various electric circuit components (e.g., a processor, a communication module, and a video/audio module) may be accommodated in the housing 101, and a display 111 may be installed to the housing 101 to be exposed through the first face F1.

At least one of the coupling members 102a and 102b may be mounted on the side face S of the housing 101. For example, the coupling members 102a and 102b may be attached to/detached from a portion that faces in a third direction D3 in the side face S of the housing 101. According to various embodiments of the present disclosure, the electronic device 100 includes one pair of coupling members 102a and 102b, in which the first coupling member 102a may be provided to be attachable to/detachable from a portion of the side face S of the housing 101 that faces in the third direction D3, and the second coupling member 102b may be provided to be attachable to/detachable from another portion of the side face S of the housing that faces in a fourth direction D4 that is opposite to the third direction D3. For example, the pair of coupling members 102a and 102b may be mounted on the portions of the side face S of the housing 101, and may be arranged to extend away from each other.

The user may wear the electronic device 100 on a body portion (e.g., a wrist) using the coupling members 102a and 102b. In the state where the housing 101 is positioned on the user's body portion, the electronic device 100 may be worn on the user's body portion by wrapping the coupling members 102a and 102b, which extend in opposite directions from each other, around the user's body portion (e.g., the wrist).

In the state where the electronic device 100 is worn on the user's body portion, each of the coupling members 102a and 102b includes a first portion that is in contact with the user's body portion (e.g., a band member 121a). Each of the band members 121a are provided with, for example, a hole or a protrusion, in which the hole and the protrusion correspond to each other such that the first and second coupling members 102a and 102b can be bound to each other. For example, in the state of being worn on the user's body portion, the first and second coupling members 102a and 102b and the housing 101 may form a closed curve shape.

Each of the coupling members 102a and 102b may be provided with a second member (e.g., a locking member 121b) to maintain a first portion (e.g., the band member 121a) in the state of being mounted on the housing 101. Each of the locking member 121b may be partially engaged with the housing 101 in the state where the band members 121a are bound to the housing 101 in order to prevent the band members 121a from being released. The configuration of the locking members 121b will be described in more detail with reference to FIG. 13.

In the following detailed description, among the coupling members 102a and 102b, the first coupling member 102a arranged in the third direction D3 will be mainly described while being denoted by reference numeral "102a" and referred to as a "coupling member." In addition, in describing, for example, a first recess and/or a mounting recess that are formed in the housing 101, descriptions will be made on, for example, a configuration positioned to face in the third direction D3 while being formed in a forth direction D4 that is opposite to the third direction D3. The descriptions are related to a first recess and/or a mounting recess that corresponds to the first coupling member 102a disposed in the third direction D3, and it shall be noted that a recess and/or a mounting recess that correspond to the second coupling member 102b disposed in the fourth direction D4 may be different from the structures to be described in the following detailed description.

Figure 5:
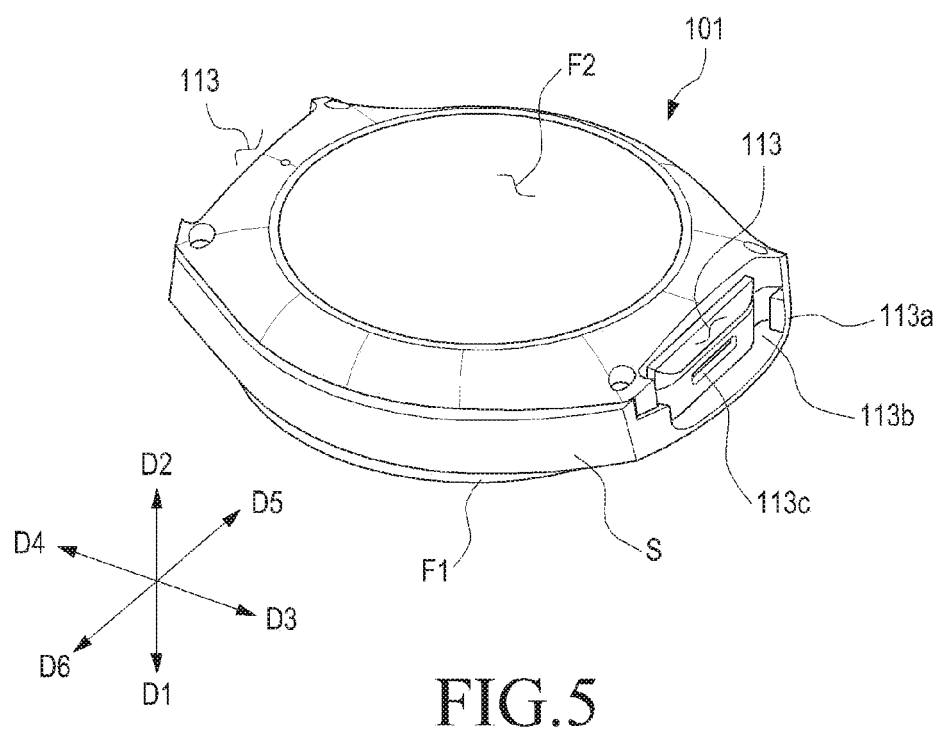
FIG. 5 is a perspective view illustrating a housing of an electronic device including a coupling member according to various embodiments of the present disclosure.
Figure 6:
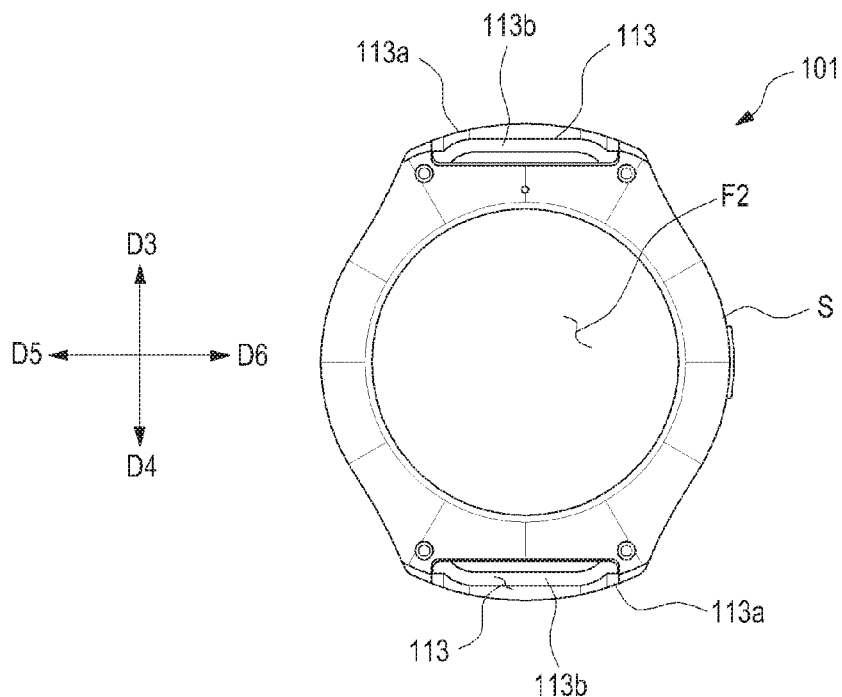
FIG. 6 is a bottom view illustrating a housing of an electronic device including a coupling member according to various embodiments of the present disclosure.
Figure 7:
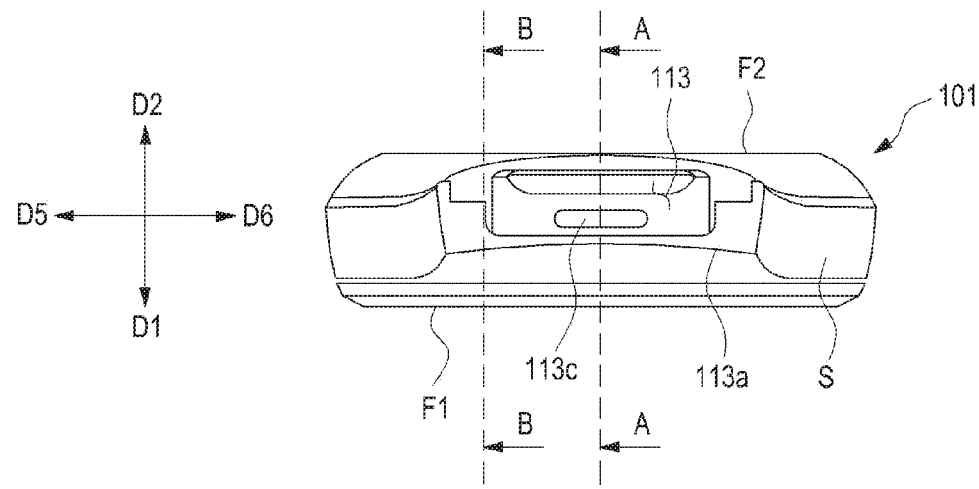
FIG. 7 is a side view illustrating a housing of an electronic device including a coupling member according to various embodiments of the present disclosure.

FIG. 5 is a perspective view illustrating a housing of an electronic device including a coupling members according to various embodiments of the present disclosure. FIG. 6 is a bottom view illustrating a housing of an electronic device including a coupling members according to various embodiments of the present disclosure. FIG. 7 is a side view illustrating a housing of an electronic device including the coupling members according to various embodiments of the present disclosure.

Referring to FIGS. 5 to 7, the housing 101 includes a first recess (e.g., a mounting recess 113) that is formed to face in the fourth direction D4 on a portion of the side face S that faces in the third direction D3. For example, the mounting recess 113 may have a shape that is partially recessed in the fourth direction D4 in a portion of the side face S of the housing 101 that faces in the third direction D3. For example, a mounting recess, which corresponds to the second coupling member 102*b*, may have a shape that is partially recessed in the third direction D3 in a portion of the side face S of the housing 101 that faces in the fourth direction D4.

The housing 101 includes a first protrusion 113*a* that protrudes in the third direction D3 on another portion of the side face S (e.g., around the mounting recess 113). For example, the first protrusion 113*a* may be integrally formed on the housing 101, and may form a portion of the first face F1, the second face F2 and/or the side face S of the housing 101.

The first protrusion 113*a* may be formed to enclose a portion of the mounting recess 113, and to expose the mounting recess 113, for example, in the second direction D2. The housing 101 includes a second recess (e.g., a binding recess 113*b*) that is exposed in the second direction D2, on one face of the first protrusion 113*a* (e.g., the face that faces in the second direction D2). The binding recess 113*b* may have a shape that is at least partially extended or recessed in the first direction D1, and may be formed along a portion of the periphery of the mounting recess 113. For example, the first protrusion 113*a* includes a portion (hereinafter, referred to as a "first portion of the first protrusion") that extends in a fifth direction D5 that is perpendicular to the first, second, third, and fourth directions D1, D2, D3, and D4 while enclosing a portion of the binding recess 113*b* at the first face F1 side. According to various embodiments of the present disclosure, the first protrusion 113*a* includes other portions (hereinafter, referred to as "second portions of the first protrusion"), each of which extends in the second direction D2 from the first portion of the first protrusion 113*a*, (e.g., from the opposite ends of the first portion of the first protrusion 113*a*). The second portions of the first protrusion 113*a* may be formed to enclose another portion of the binding recess 113*b*. For example, the binding recess 113*b* may not include a shape that extends, or is recessed in the first direction D1. For example, the binding recess 113*b* may have a form that is enclosed only by the first and second portions of the first protrusion 113*a* without having a shape that is recessed in the first direction D1.

The binding recess 113*b* may provide a means for fixing the coupling member(s) 102*a*. On the bottom surface of the mounting recess 113 (e.g., the surface that faces in the third direction D3), a locking recess 113*c* may be formed. The locking recess 113*c* may be recessed to face in the fourth direction D4 from the bottom surface of the mounting recess 113.

The coupling member 102*a* may be mounted such that a portion of the coupling member 102*a* faces a portion of the side face S of the housing 101. For example, one end of the coupling member 102*a* may be mounted to face the protrusion 113*a*. According to various embodiments of the present disclosure, the face of the first protrusion 113*a*, which faces in the third direction D3, has a shape that is the same as a face of the coupling member 102*a*, which faces a portion of the side face S of the housing 101.

Figure 8:
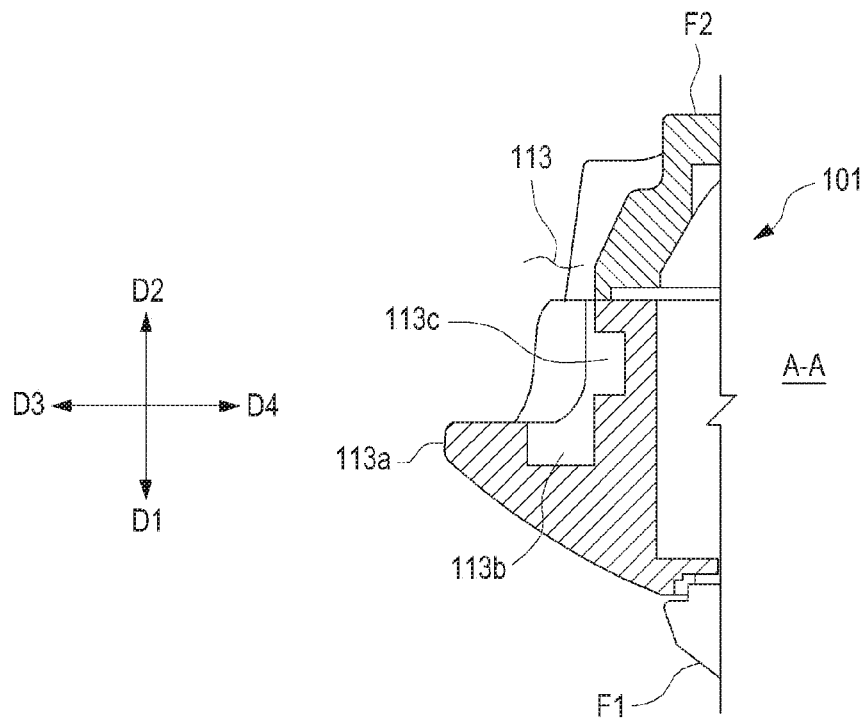
FIG. 8 is a cross-sectional view taken by cutting one portion of a housing of an electronic device which includes a coupling member according to various embodiments of the present disclosure.
Figure 9:
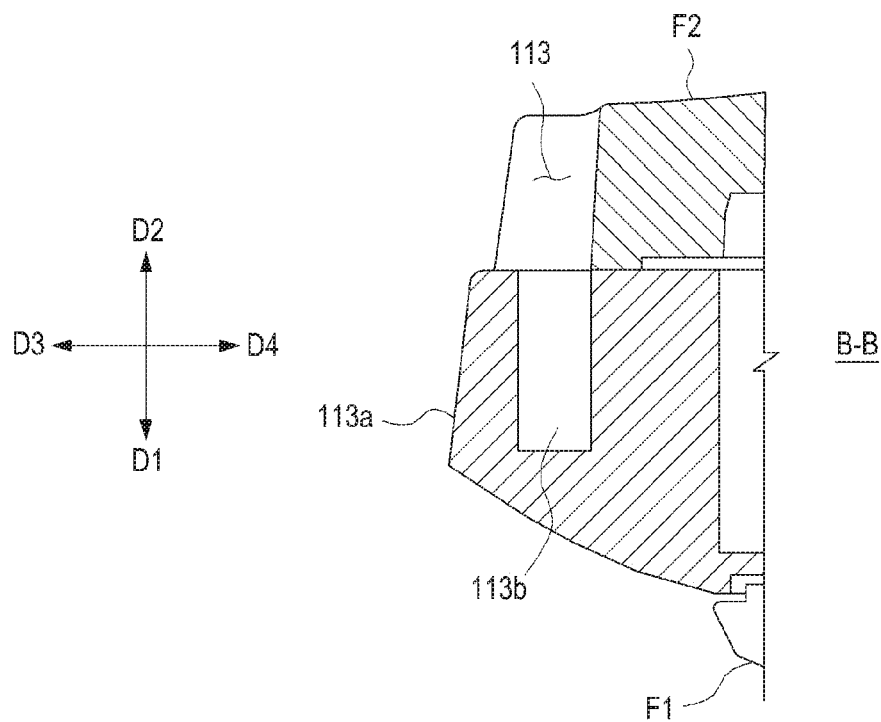
FIG. 9 is a cross-sectional view taken by cutting another portion of a housing of an electronic device which includes a coupling member according to various embodiments of the present disclosure.

FIG. 8 is a cross-sectional view taken by cutting one portion of a housing of an electronic device including a coupling member according to various embodiments of the present disclosure. FIG. 9 is a cross-sectional view taken by cutting one portion of a housing of an electronic device including a coupling member according to various embodiments of the present disclosure.

FIGS. 8 and 9 are cross-sectional views of the housing 101 that are taken along line A-A and line B-B in FIG. 7, respectively. Referring to FIG. 8, the first protrusion 113*a* may be formed on the edge that is adjacent to the first face F1 around the mounting recess 113. For example, in the first direction D1, the mounting recess 113 may be closed by a portion of the first protrusion 113*a*, Referring to FIG. 9, the other portions of the first protrusion 113*a* may close the mounting recess 113 at the opposite sides of the mounting recess 113, respectively. For example, the mounting recess 113 may be exposed in the second and third directions D2 and D3, and may be closed by the first protrusion 113*a* in another direction.

The binding recess 113*b* may be exposed in the second direction D2, and may have a shape that is recessed on one face of the protrusion 113*a* toward the first direction D1. The coupling member 102*a* is provided with a third portion (e.g., a slide member 121*c* (see FIG. 13)) so that as the slide member 121*c* is inserted into the mounting recess 113, a portion of the edge of the slide member 121*c* may be engaged in the binding recess 113*b*. The binding structure, and the like, of the slide member 121*c* will be described in more detail with reference to, for example, FIG. 13.

The locking recess 113*c* may be recessed to face in the fourth direction D4 from the bottom surface of the mounting recess 113 (e.g., the surface that faces in the third direction D3). The slide member 121*c* is adapted to be introduced into the mounting recess 113 in the first direction D1 from the second face F2 side, and a portion of the coupling member(s) 102*a* (e.g., a portion of the locking member 121*b* to be described later) may be engaged in the locking recess 113*c*. As a portion of the locking member 121*b* is engaged in the locking recess 113*c*, the coupling member(s) 102*a* may be stably fixed to the housing 101.

Figure 10:
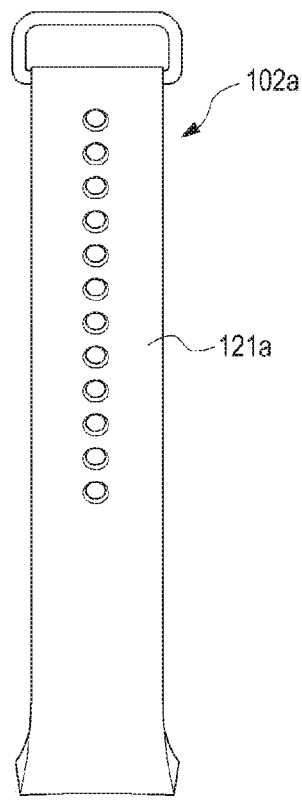
FIG. 10 is a first side view illustrating a coupling member according to various embodiments of the present disclosure.
Figure 11:
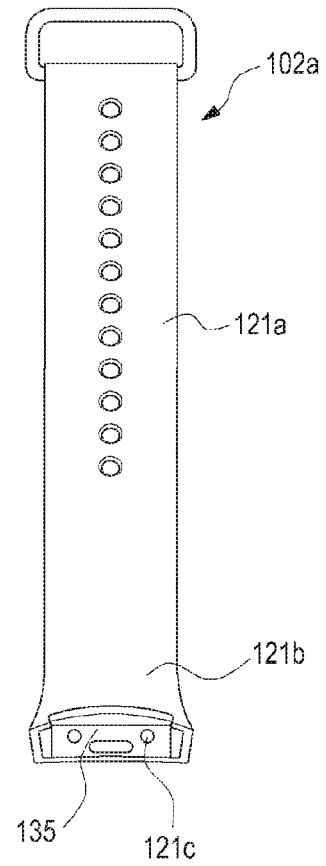
FIG. 11 is a second side view illustrating a coupling member according to various embodiments of the present disclosure.
Figure 12:
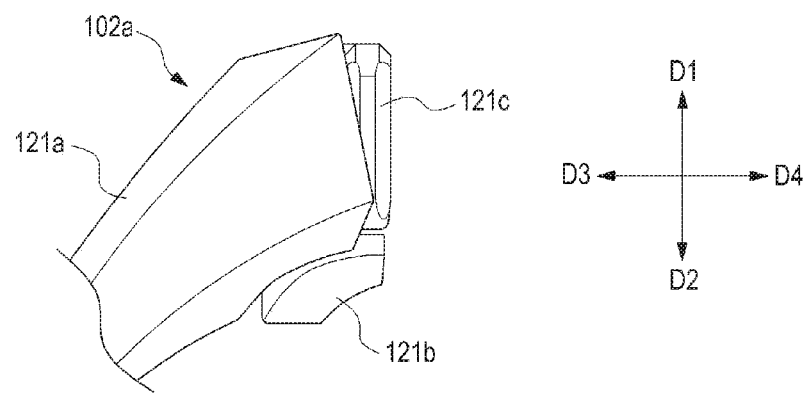
FIG. 12 is a third side view illustrating a coupling member according to various embodiments of the present disclosure.

FIG. 10 is a first side view illustrating a coupling member according to various embodiments of the present disclosure. FIG. 11 is a second side view illustrating a coupling member according to various embodiments of the present disclosure. FIG. 12 is a third side view illustrating a coupling member according to various embodiments of the present disclosure.

Referring to FIGS. 10 to 12, the coupling member 102*a* includes a first portion (e.g., the above-described band member 121*a*), a second portion (e.g., the above-described locking member 121*b*), and a third portion (e.g., the above-described slide member 121*c*). The first portion (e.g., the band member 121*a*) may be in contact with a portion of a user's body portion (e.g., a wrist) in the state where the electronic device 100 is worn on the user's body. The band member 121*a* practically enables the electronic device 100 to be worn on the user's body.

The second portion (e.g., the locking member 121*b*) may prevent the coupling member 102*a* from being released from the housing 101 in the state where the coupling member 102*a* is fastened to and mounted on the housing 101. For example, the locking member 121*b* includes a second protrusion (e.g., a locking protrusion 135), and the locking protrusion 135 may be engaged in the locking recess 113*c* so as to prevent the coupling member 102*a* from being released.

The third portion (e.g., the slide member 121*c*) may be introduced into the mounting recess 113 to be bound and fixed to the binding recess 113*b*. The slide member 121*c* may be introduced into the mounting recess 113 along the first direction D1 from the second face F2 side, and may be fixedly engaged in the binding recess 113b in the state where the slide member 121c is fully introduced into the mounting recess 113. When the locking protrusion 135 is engaged in the locking recess 113c in the state where the slide member 121c is engaged in the binding recess 113b, the movement of the slide member 121c in the second direction D2 may be restricted. For example, the locking protrusion 135 is engaged in the locking recess 113c so that the slide member 121c may be fixed to the mounting recess 113 and the coupling member 102a may be fixed to the housing 101.

Hereinafter, the structures of fixing the coupling member 102a to the housing 101 and/or separating the coupling member 102a from the housing 101 will be described in more detail with reference to, for example, FIG. 13. According to various embodiments of the present disclosure, the electronic device 100 includes a plurality of (e.g., a pair of) coupling members 102a and 102b, and even if the coupling members 102a and 102b are different from each other, the structures to be fixed to the housing 101 may be the same. As will be described later, according to various embodiments of the present disclosure, the coupling members 102a and 102b may be provided with electric structures (e.g., an antenna and/or a camera module). In such a case, an electric connection structure may be provided to a structure that fixes the coupling members 102a and 102b to the housing 101.

Figure 13:
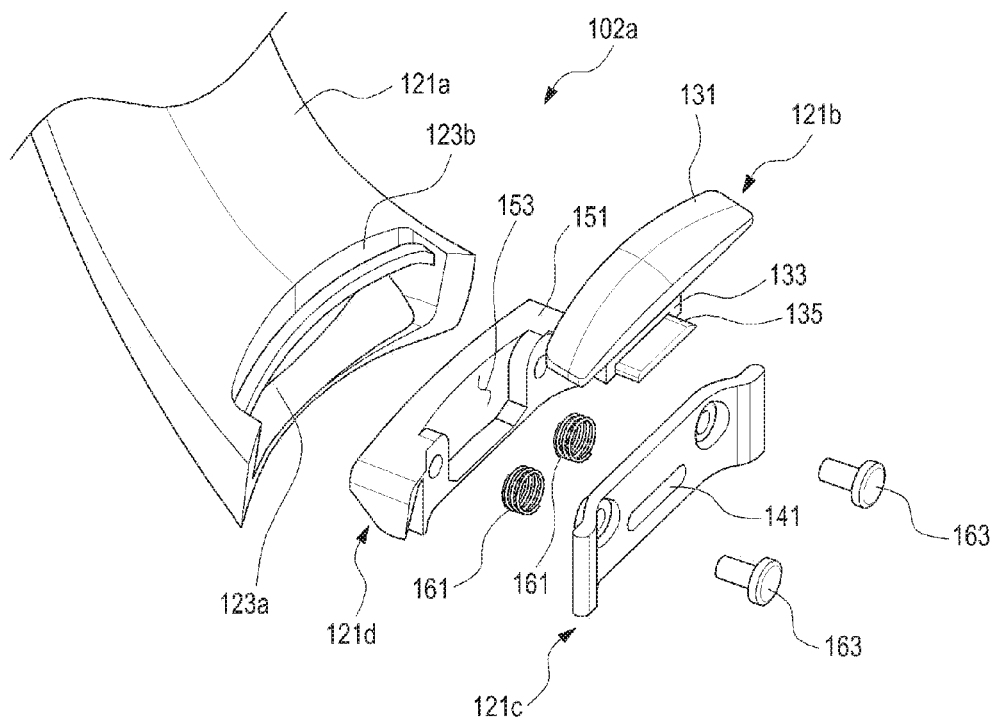
FIG. 13 is an exploded perspective view illustrating a coupling member according to various embodiments of the present disclosure.
Figure 14:
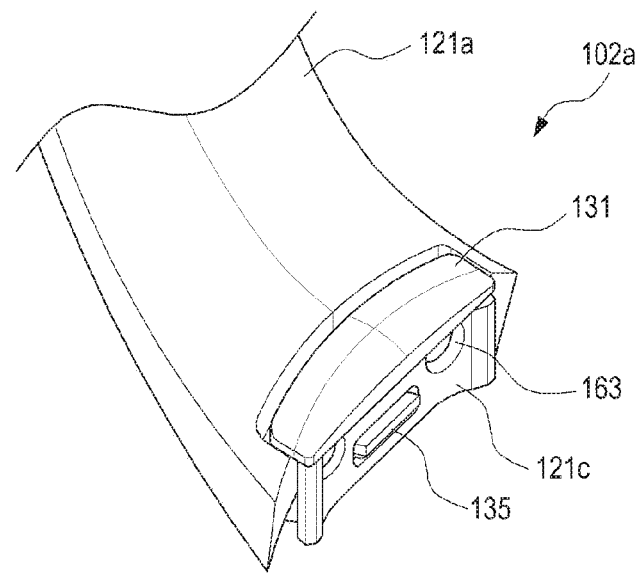
FIG. 14 is a perspective view illustrating a coupling member according to various embodiments of the present disclosure.
Figure 15:
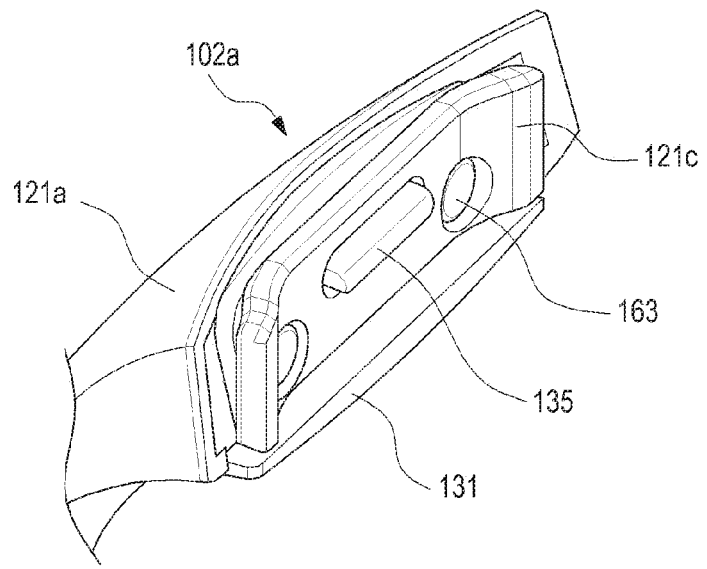
FIG. 15 is a perspective view illustrating a coupling member when viewed from a certain direction according to various embodiments of the present disclosure.

FIG. 13 is an exploded perspective view illustrating a coupling member according to various embodiments of the present disclosure. FIG. 14 is a perspective view illustrating a coupling member according to various embodiments of the present disclosure. FIG. 15 is a perspective view illustrating a coupling member when viewed from a certain direction according to various embodiments of the present disclosure.

Referring to FIGS. 13 to 15, the coupling member 102a includes a band member 121a, a locking member 121b, and a slide member 121c. According to various embodiments of the present disclosure, the coupling member 102a includes a mounting member 121d in order to join the locking member 121b and/or slide member 121c to the band member 121a.

The band member 121a includes an assembly hole 123a formed at an end of the band member 121a and an accommodation recess 123b formed on the inner face of the band member 121a and positioned adjacent to the assembly hole 123a. The assembly hole 123a is a space that is provided to assemble or mount the locking member 121b, the slide member 121c and/or the mounting member 121d, and may prevent the slide member 121c, and the like, from being released from the band member 121a. For example, the slide member 121c is to mount and fix the coupling member 102a to the housing 101, and may require sufficient rigidity. On the contrary, the band member 121a may be flexible in order to allow the worn state to be easily released while being wound on a portion of the user's body. In order to fix the slide member 121c to the flexible band member 121a, the mounting member 121d may be provided as described above. If it is possible to rigidly fix the slide member 121c, and the like, with the band member 121a itself, the mounting member 121d may not be provided.

The mounting member 121d may be made of a material that is more rigid than the band member 121a (e.g., a metal or a synthetic resin), and may be fixed to one end of the band member 121a through a method, such as dual injection molding, insert injection molding, bonding, or welding. According to various embodiments of the present disclosure, the mounting member 121d may form the external appearance of the coupling member 102a together with the band member 121a. For example, the mounting member 121d may form a portion of the external appearance of the coupling member 102a. However, the present disclosure is not needed to be limited thereto. For example, the mounting member 121d is to provide a stable joint and fixing structure between the flexible band member 121a and the rigid slide member 121c, and may be concealed in the inside of the band member 121a.

FIG. 13 exemplifies a configuration in which the assembly hole 123a is formed at one end of the band member 121a. However, if the mounting member 121d is fixed to the band member 121a by dual injection molding and/or insert injection molding, the mounting member 121d may be joined to the band member 121a in the state where a portion of the mounting member 121d is enclosed in the band member 121a simultaneously with molding the band member 121a. If one end of the band member 121a has sufficient rigidity, the mounting member 121d and/or the slide member 121c may be assembled and mounted to the one end of the band member 121a. A fastening member 163, such as a screw, may be used in order to assemble and mount the mounting member 121d and/or the slide member 121c to one end of the band member 121a.

The locking member 121b includes a manipulating portion (or a button) 131, a support portion 133, and/or a locking protrusion 135, and may be reciprocated on the band member 121a. At least a portion of the manipulating portion 131 is positioned in the accommodation recess 123b to be exposed to the inside of the band member 121a. Another portion of the manipulating portion 131 may be positioned on the top face 151 of the mounting member 121d. For example, the top face 151 of the mounting member 121d may be concealed by the manipulating portion 131. In the state where the coupling member 102a is fastened to the housing 101, the user may move the manipulating portion 131 so as to release the locking state of the coupling member 102a. When the locking state is released, the user may separate the coupling member 102a from the housing 101. The manipulating portion 131 may be made of a metal or a synthetic resin to be more rigid than the band member 121a, and the appearance design line of the manipulating portion 131 that generally appears to the outside (e.g., a corner) may be in harmony with the appearance design line of the inner face of the band member 121a. According to various embodiments of the present disclosure, the manipulating portion 131 includes a protruding or recessed shape portion on a portion thereof so as to facilitate the user's manipulation, and surface treatment, such as sanding or hairline, may be performed or a separate material, such as leather or fabric, may be attached so as to make the exterior appearance beautiful.

The support portion 133 may extend from the inner face of the manipulating portion 131 and may be positioned to face a portion of the mounting member 121d. The locking member 121b may be reciprocated according to the user's manipulation, and the mounting member 121d may be formed with an operating recess 153 so as to secure a moving space (or interval) for the support portion 133. For example, as the locking member 121b is reciprocated, the support portion 133 may be reciprocated within the operating recess 153, or may be introduced into/separated from the operating recess 153.

The locking protrusion 135 may protrude from a face of the support portion 133 and may be positioned to face at least a portion of the manipulating portion 131. When the coupling member 102a is mounted on and fixed to the housing 101, the locking protrusion 135 may be engaged in the locking recess 113c such that the coupling member 102a may stably maintain the fixed state with respect to the coupling member 102a.

The slide member 121c may be mounted on and fixed to the mounting member 121d (or the band member 121a) in the state of facing at least a portion of the locking member 121b (e.g., the support portion 133). For example, at least a portion of the locking member 121b (e.g., the support portion 133) may be positioned between the slide member 121c and the mounting member 121d and/or the band member 121a. When the coupling member 102a is joined to the housing 101, the slide member 121c may be positioned between the locking member 121b (e.g., the support portion 133) and the housing 101.

The slide member 121c includes at least one opening 141. The opening 141 may be formed to correspond to the locking protrusion 135. For example, the locking protrusion 135 may protrude to the outside of the slide member 121c through the opening 141. Thereby, the locking member 121b may be reciprocated between the mounting member 121d and the slide member 121c, and a portion of the locking member 135 may be restrained on the band member 121a in the state of being positioned within the opening 141.

According to various embodiments of the present disclosure, the coupling member 102a includes at least one elastic member 161 and at least one joint member 163. The elastic member 161 may be accommodated within the operating recess 153 to be supported by the support portion 133. For example, the elastic member 161 may provide an elastic force acting in a direction that causes the locking protrusion 135 to protrude to the outside of the slide member 121c. In the state where the coupling member 102a is joined to the housing 101, the locking protrusion 135 may be maintained in the state of being engaged in a portion of the mounting recess 113 (e.g., the locking recess 113c) by the elastic force of the elastic member 161.

In order to separate the coupling member 102a from the housing 101, the user may move the locking member 121b (e.g., the manipulating portion 131 or the button) in the third direction D3, thereby releasing the locking state of the coupling member 102a. For example, when the locking member 121b moves in the third direction D3 by the user's manipulation, the locking protrusion 135 may be released from the locking recess 113c. When the external force applied to the locking member 121b (e.g., the manipulating force applied by the user) is removed, the locking protrusion 135 may protrude to the outside of the slide member 121c again by the elastic force of the elastic member 161. The joint member 163 may fixedly fasten the slide member 121c to the mounting member 121d.

Hereinafter, more various configurations of the locking member 121b and the slide member 121c will be described with reference to FIGS. 16 to 21.

Figure 16:
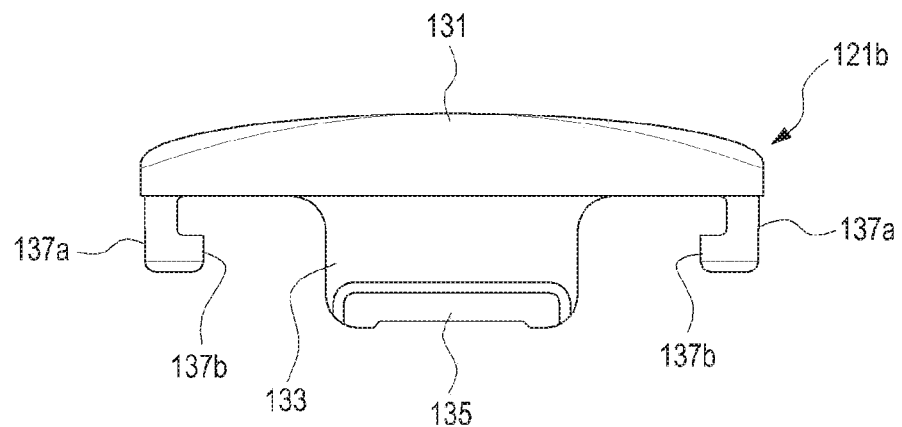
FIG. 16 is a front view illustrating a locking member of a coupling member according to various embodiments of the present disclosure.
Figure 17:
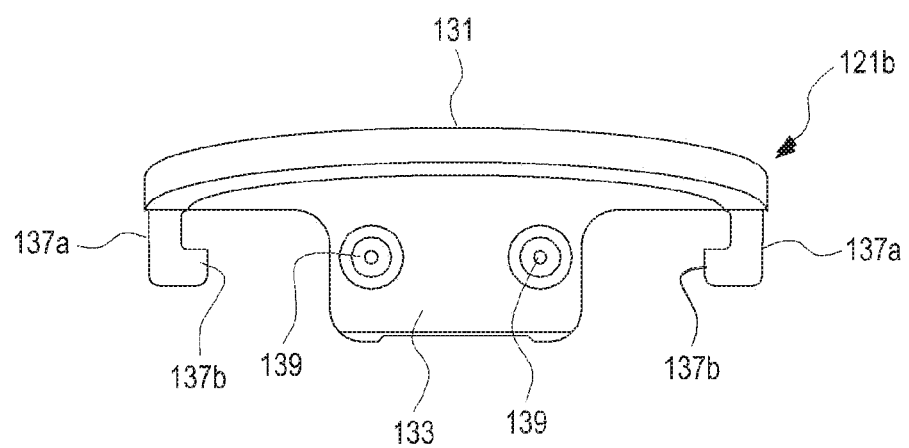
FIG. 17 is a rear view illustrating a locking member of a coupling member according to various embodiments of the present disclosure.

FIG. 16 is a front view illustrating a locking member of a coupling member according to various embodiments of the present disclosure. FIG. 17 is a rear view illustrating a locking member of a coupling member according to various embodiments of the present disclosure.

In describing the present embodiment of the present disclosure, the components that can be easily understood from the preceding embodiment may be denoted by the same reference numerals or the reference numerals thereof may be omitted, and the detailed descriptions thereof may also be omitted.

Referring to FIGS. 16 and 17, the locking member 121b includes a guide portion 137a that extends from the manipulating portion 131. The guide portion 137a may extend from each of the opposite side ends of the inner surface of the manipulating portion 131 in parallel with the support portion 133. The locking member 121b includes guide protrusions 137b that extend in the directions in which the guide protrusions 137b get closer to each other from the ends of the guide portions 137a, respectively. In the thickness direction oriented from the inner surface to the outer surface of the band member 121a (e.g., in the direction where the support portion 133 extends from the manipulating portion 131), the guide protrusions 137b may be arranged to be deviated from the locking protrusion 135. The locking member 121b includes support protrusion(s) 139 formed on the other surface of the support portion 133 (e.g., the surface that is opposite to the surface on which the locking protrusion 135 is formed). The elastic member(s) 161 may be arranged in the form of enclosing the periphery of the support protrusion(s) 139 while being positioned within the operating recess 153. For example, the elastic member(s) 161 may provide an elastic force to the support portion 133 at a certain position(s).

Figure 18:
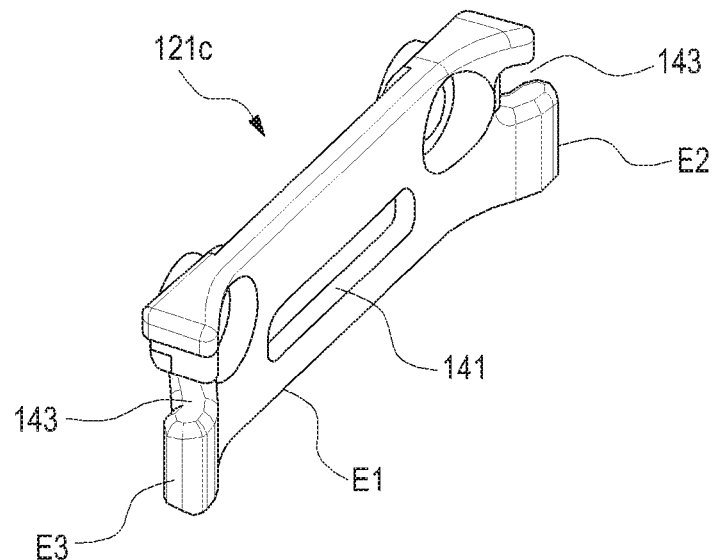
FIG. 18 is a perspective view illustrating a slide member of a coupling member according to various embodiments of the present disclosure.
Figure 19:
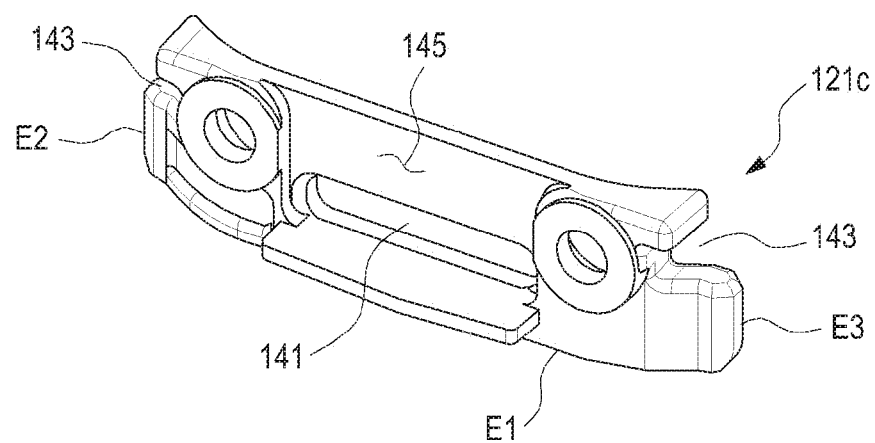
FIG. 19 is a perspective view illustrating a slide member of a coupling member in which the slide member is viewed from a certain direction according to various embodiments of the present disclosure.
Figure 20:
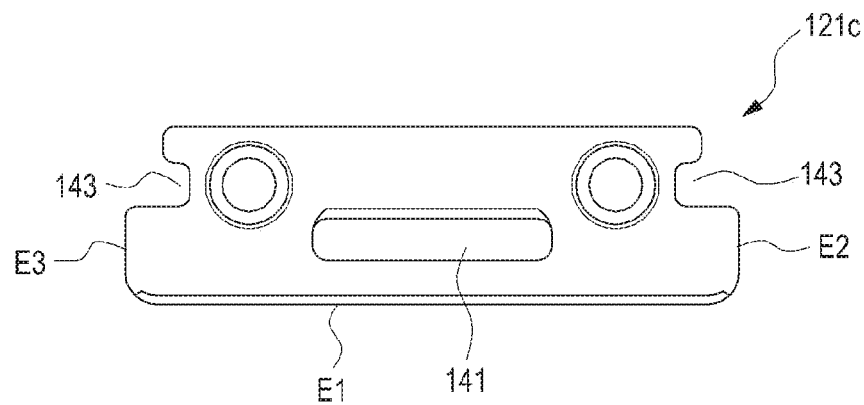
FIG. 20 is a front view illustrating a slide member of a coupling member according to various embodiments of the present disclosure.

FIG. 18 is a perspective view illustrating a slide member of a coupling member according to various embodiments of the present disclosure. FIG. 19 is a perspective view illustrating a slide member of a coupling member in which a slide member is viewed from a certain direction according to various embodiments of the present disclosure. FIG. 20 is a front view illustrating a slide member of a coupling member according to various embodiments of the present disclosure.

Referring to FIGS. 18 to 20, the slide member 121c includes guide recesses 143 that correspond to the guide protrusions 137b, respectively. The guide recesses 143 may be formed at the opposite side ends of the slide member 121c, respectively. For example, when the locking member 121b is reciprocated, the guide protrusions 137b may be accommodated in the guide recesses 143, respectively, to guide the reciprocating movements of the locking member 121b. In the inner surface of the slide member 121c, a second operating recess 145 may be formed. The second operating recess 145 may be positioned to face the operating recess 153 of the mounting member 121d. For example, the support portion 133 of the locking member 121b may be reciprocated within the space that is formed by the operating recess 153 and the second operating recess 145. One end of the second operating recess 145 may be connected to the opening 141. For example, the support portion 133 may be formed on the second operating recess 145, and the locking protrusion 135 may protrude to the outside of the slide member 121c through the opening 141. When the slide member 121c is joined to the mounting recess 113 of the housing 101, the edges of the slide member 121c (e.g., a portion of each of the lower end E1 and the opposite side ends E2 and E3) may be engaged in the binding recess 113b.

Figure 21:
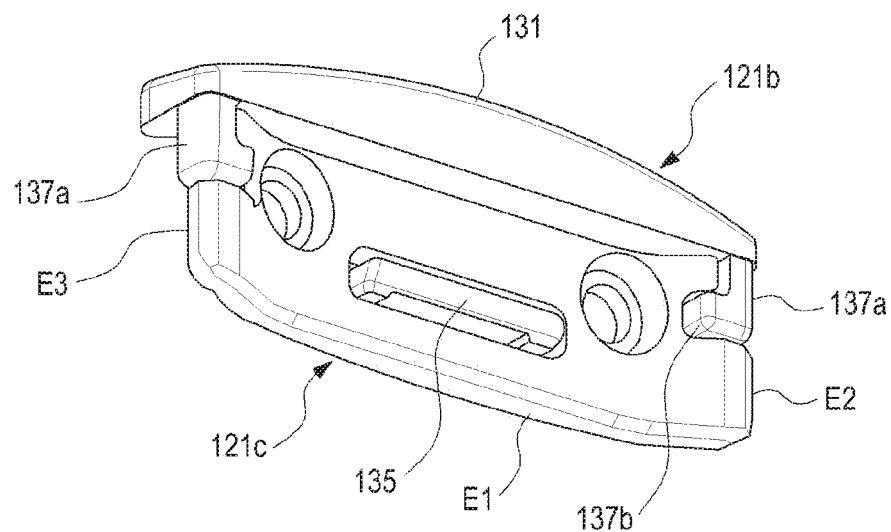
FIG. 21 is a perspective view illustrating a state in which a locking member and a slide member of a coupling member are assembled with each other according to various embodiments of the present disclosure.

FIG. 21 is a perspective view illustrating a state in which a locking member and a slide member of a coupling member are joined with each other according to various embodiments of the present disclosure.

Referring to FIG. 21, the slide member 121c may be joined with the locking member 121b in the state of facing the support portion 133. When the locking member 121b is joined with the slide member 121c, the guide protrusions 137b may be positioned in the guide recesses 143, respectively, and the locking member 135 may be positioned in the opening 141. According to various embodiments of the present disclosure, the locking member 121b may receive the elastic force of the elastic member 161 so that the locking protrusion 135 may maintain the state of protruding to the outside of the slide member 121c. When the user manipulates the manipulating portion 131, the guide protrusions 137b and/or the locking protrusion 135 may guide the reciprocating movements of the locking member 121b while being reciprocated within the guide recesses 143 and/or the opening 141.

Figure 22:
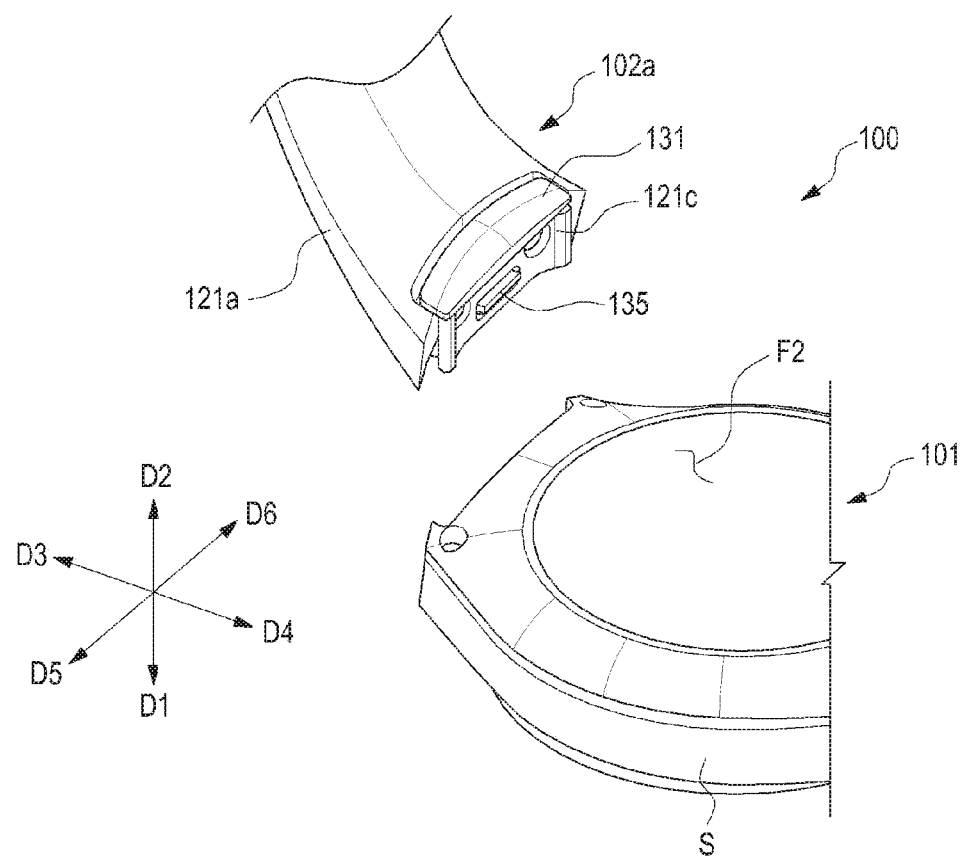
FIGS. 22 and 23 are perspective views illustrating states in which a coupling member is coupled to a housing according to various embodiments of the present disclosure.
Figure 23:
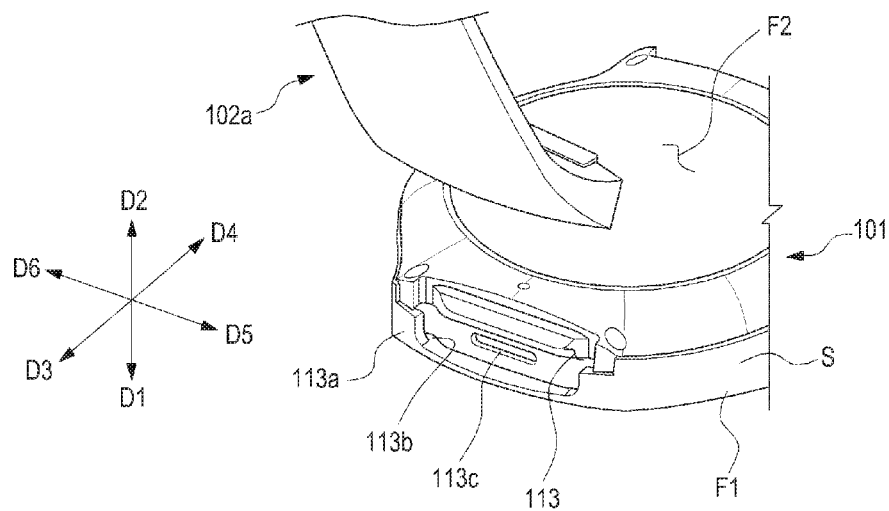
Figure 24:
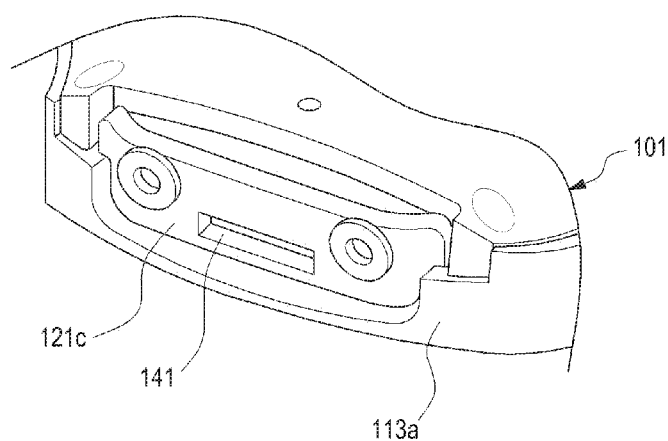
FIG. 24 is a perspective view illustrating a state in which a slide member of a coupling member is coupled to a housing according to various embodiments of the present disclosure.
Figure 25:
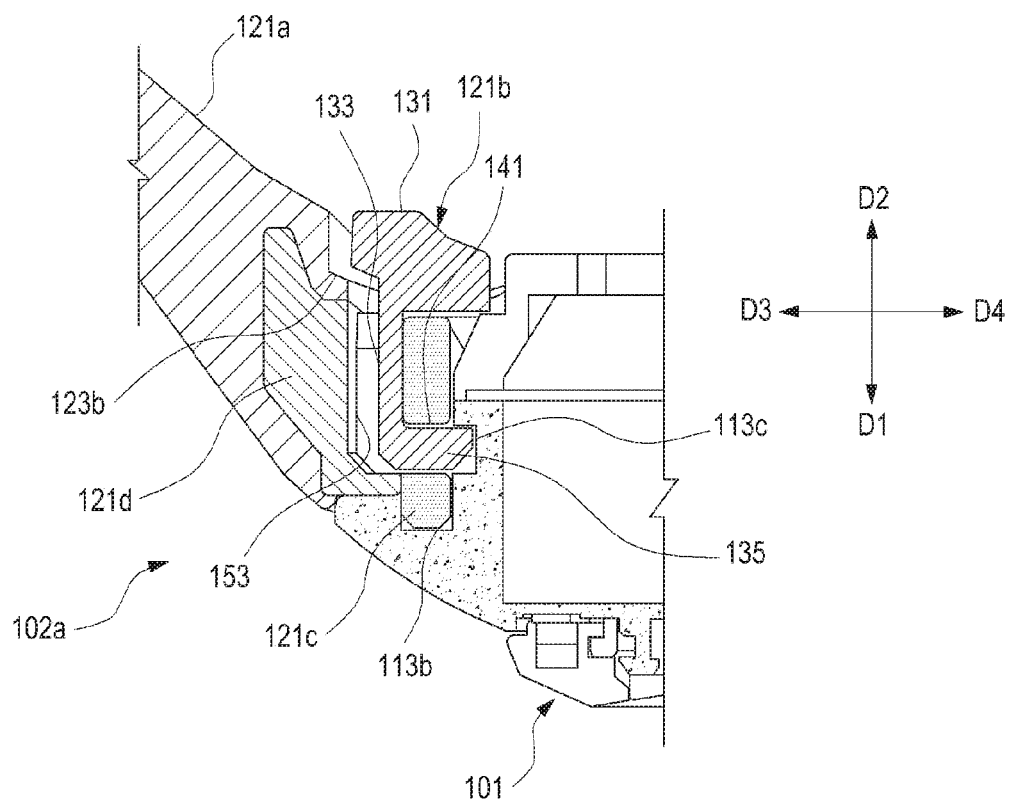
FIG. 25 is a cross-sectional view taken by cutting one portion of an electronic device in a state where a coupling member is joined to a housing according to various embodiments of the present disclosure.
Figure 26:
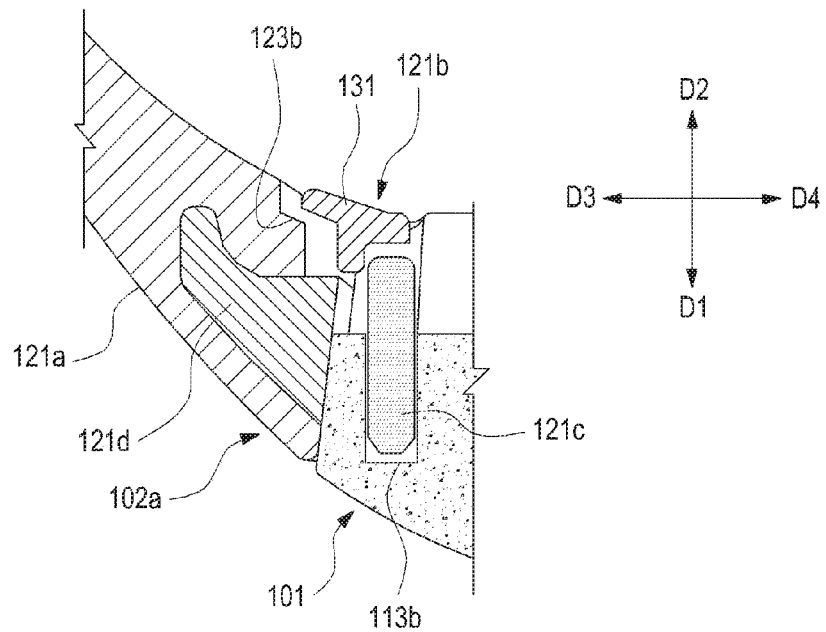
FIG. 26 is a cross-sectional view taken by cutting a portion of an electronic device in a state where a coupling member is joined to a housing according to various embodiments of the present disclosure.

FIGS. 22 and 23 are perspective views illustrating states in which a coupling member is joined to a housing according to various embodiments of the present disclosure. FIG. 24 is a perspective view illustrating a state in which a slide member of a coupling member is joined to a housing according to various embodiments of the present disclosure. FIG. 25 is a cross-sectional view taken by cutting one portion of an electronic device in a state where a coupling member is joined to a housing according to various embodiments of the present disclosure. FIG. 26 is a cross-sectional view taken by cutting a portion of an electronic device in a state where a coupling member is joined to a housing according to various embodiments of the present disclosure.

Referring to FIGS. 22 to 26, the third portion of the coupling member 102a (e.g., the slide member 121c) may be mounted in the mounting recess 113 in the state of being positioned between the second portion (e.g., the above-described locking member 121b) and the housing 101. As the slide member 121c is introduced into the mounting recess 113 along the first direction on the second face F2, the coupling member 102a may be joined with the housing 101. Upon being fully introduced into the mounting recess 113, the slide member 121c may be fixed to the mounting recess 113 as the lower end E1 and/or the opposite side ends E2 and E3 are engaged in the binding recess 113b. In the state where the slide member 121c (or a portion of an edge thereof) is engaged in the binding recess 113b, the movements of the slide member 121c may be restricted in the direction that is parallel to the first face F1 and/or the second face F2 (e.g., the third and fourth directions D3 and D4 and/or the fifth and/or sixth directions D5 and D6 that are perpendicular to the third and fourth directions D3 and D4).

According to various embodiments of the present disclosure, in the state where the slide member 121c (or a portion of an edge thereof) is engaged in the binding recess 113b, the locking protrusion 135 may protrude to the outside of the slide member 121c to be engaged in the locking recess 113c. The slide member 121c is movable in the second direction D2 in the state where the slide member 121c (or a portion of an edge thereof) is engaged in the locking recess 113c in the state where the slide member 121c is engaged in the binding recess 113b. When the locking protrusion 135 is engaged in the locking recess 113c, the movement of the slide member 121c in the second direction D2 may be restricted. When the locking protrusion 135 is engaged in the locking recess 113c, it is possible to prevent the slide member 121c from being released from the mounting recess 113.

When the slide member 121c is engaged in the binding recess 113b and the locking protrusion 135 is engaged in the locking recess 113c, the coupling member 102a may be rigidly fixed to the housing 101. When separating the coupling member 102a from the housing 101 is desired, the user may move the locking member 121b (e.g., the manipulating portion 131) in the third direction D3, thereby releasing the locking protrusion 135 from the locking recess 113c. In the state where the locking protrusion 135 is released from the locking recess 113c, the slide member 121c is movable in the second direction D2 so that the user can easily separate the coupling member 102a from the housing 101.

Hereinafter, a method of fastening/separating the coupling member 102a of the above-described embodiments to/from the housing 101 will be described.

Figure 27:
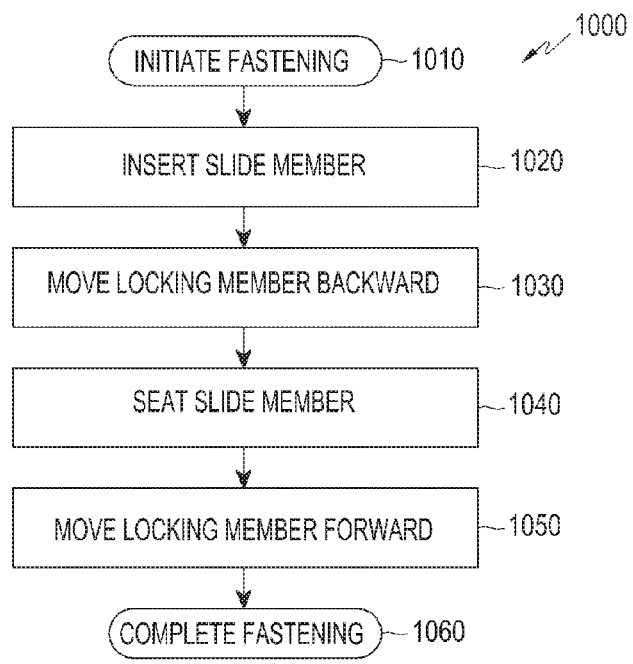
FIG. 27 is a flowchart illustrating a method of fastening a coupling member to a housing, in an electronic device according to various embodiments of the present disclosure.

FIG. 27 is a flowchart illustrating a process of fastening a coupling member to a housing in an electronic device according to various embodiments of the present disclosure. FIGS. 28 to 33 are views illustrating operations of fastening a coupling member to a housing in an electronic device according to various embodiments of the present disclosure.

Referring to FIG. 27, the fastening method in operation 1000 may fasten the coupling member to the housing in operation 1060 through an operation of initiating fastening in operation 1010, an operation of inserting the slide member in operation 1020, an operation of moving the locking member backward in operation 1030, an operation of seating the slide member in operation 1040, and an operation of moving the locking member forward in operation 1050.

Figure 28:
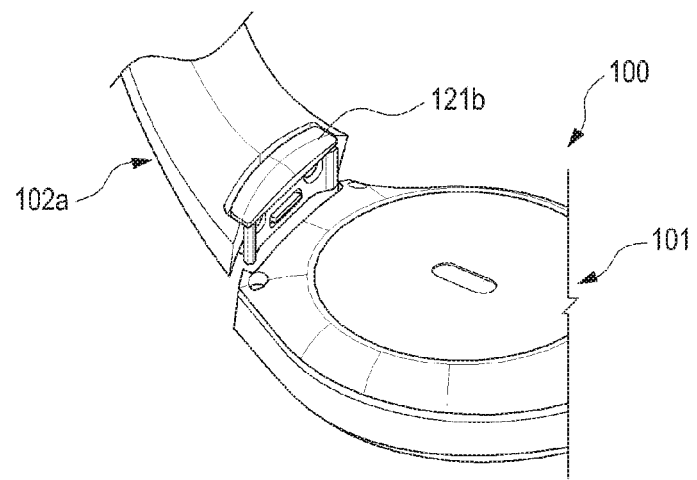
FIGS. 28 to 33 are views illustrating operations of fastening a coupling member to a housing in an electronic device according to various embodiments of the present disclosure.

Referring to FIG. 28, the operation of initiating the fastening in operation 1010 includes an operation of selecting a coupling member 102a that is desired by the user and aligning the coupling member 102a to the mounting recess 113 of the housing 101. For example, the mounting recess 113 is closed in the direction of the first face F1 or side face S of the housing 101 by the first protrusion 113a and is exposed in the direction of the second face F2, in which the coupling member 102a (e.g., the slide member 121c) may be aligned with the mounting recess 113 at the second face F2 side.

The operation of inserting the slide member 121c in operation 1020 includes an operation of introducing the slide member 121c into the mounting recess 113 in the state where the lower end E1 and/or the opposite side ends E2 and E3 of the slide member 121c are aligned to the binding recess 113b.

The operation of moving the locking member 121b backward in operation 1030 includes an operation of moving the locking member 121b backward while causing the locking protrusion 135 to interfere with a portion of the housing 101 (e.g., the bottom face of the mounting recess 113) while the slide member 121c is introduced into the mounting recess 113.

Figure 29:
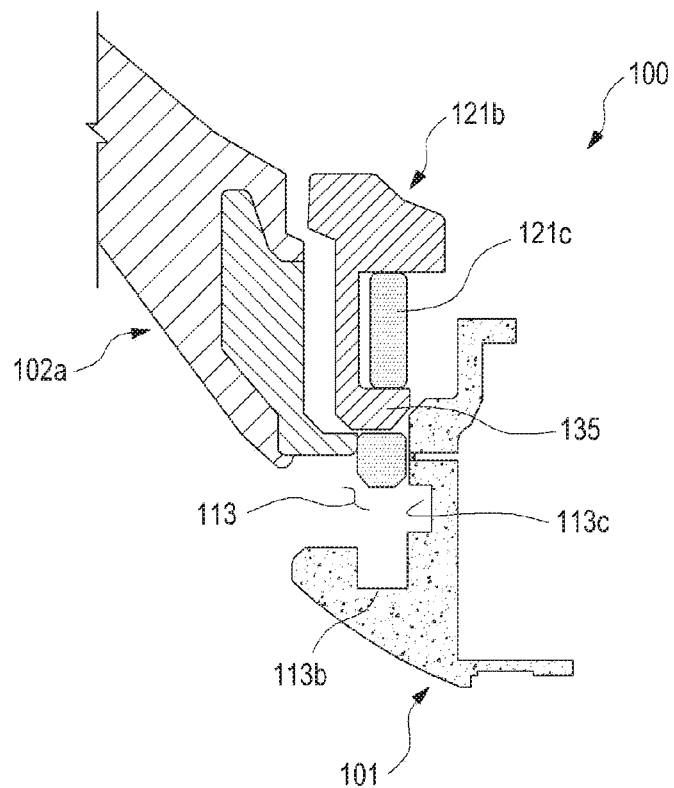
Figure 30:
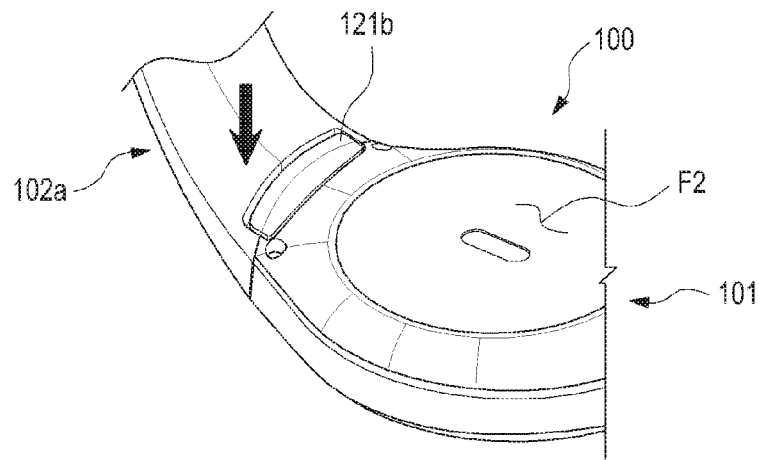
Figure 31:
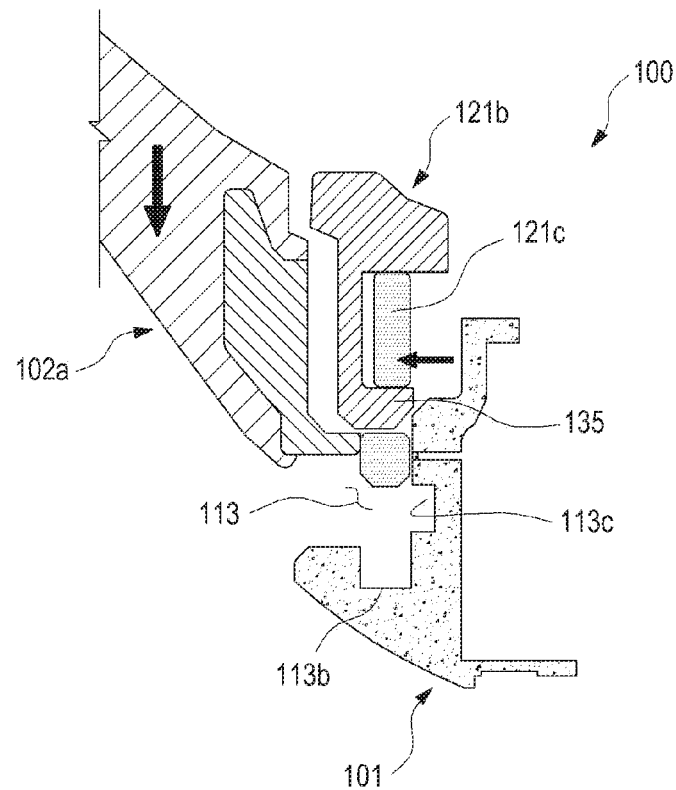

Referring to FIGS. 29 to 31, while the slide member 121c is introduced into the mounting recess 113, the locking protrusion 135 may be moved backward in a direction away from housing 101 (e.g., in the third direction D3) while interfering with the housing 101. Although not illustrated in, for example, FIG. 29, the locking member 121b is in the state of receiving the elastic force of the elastic member 161. While the slide member 121c is introduced into the mounting recess 113, the locking protrusion 135 may rub against the bottom surface of the mounting recess 113.

The operation of seating the slide member 121c in operation 1040 includes an operation of causing the slide member 121c to be fully inserted into the mounting recess 113, and the edge portions of the slide member 121c to be engaged in the binding recess 113b. As the edge portions (e.g., the opposite side ends and/or the lower end) of the slide member 121c are engaged in the binding recess 113b, the movements of the slide member 121c in the first direction D1, the third direction D3, the fourth direction D4, the fifth direction D5, and/or the sixth direction D6 described above may be restricted. In the above-described embodiment of the present disclosure, since the mounting recess 113 has a structure that is opened in the second direction D2 (e.g., at the second face F2 side), the slide member 121c is movable in the second direction D2 even in the state of being seated in the mounting recess 113.

The operation of moving the locking member 121b forward in operation 1050 includes an operation of causing the locking protrusion 135 to protrude to the outside of the slide member 121c. For example, when the slide member 121c is seated in the mounting recess 113, the opening 141 may be positioned to face the locking recess 113c. For example, a space, which enables the locking protrusion 135 to protrude to the outside of the slide member 121c (e.g., the locking recess 113c), may be positioned. Since the space, which enables the locking protrusion 135 to protrude to the outside of the slide member 121c, is secured and the elastic force of the above-described elastic member 161 acts, the locking member 121b moves in the fourth direction D4 so as to cause the locking protrusion 135 to be engaged in the locking recess 113c.

Figure 32:
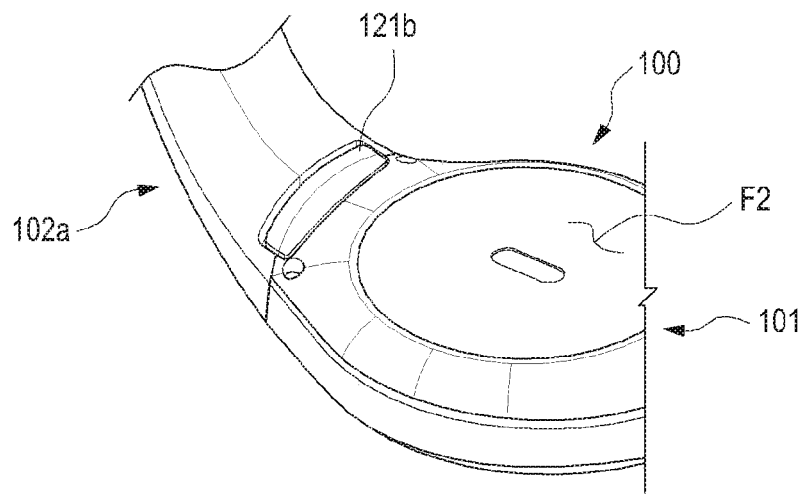
Figure 33:
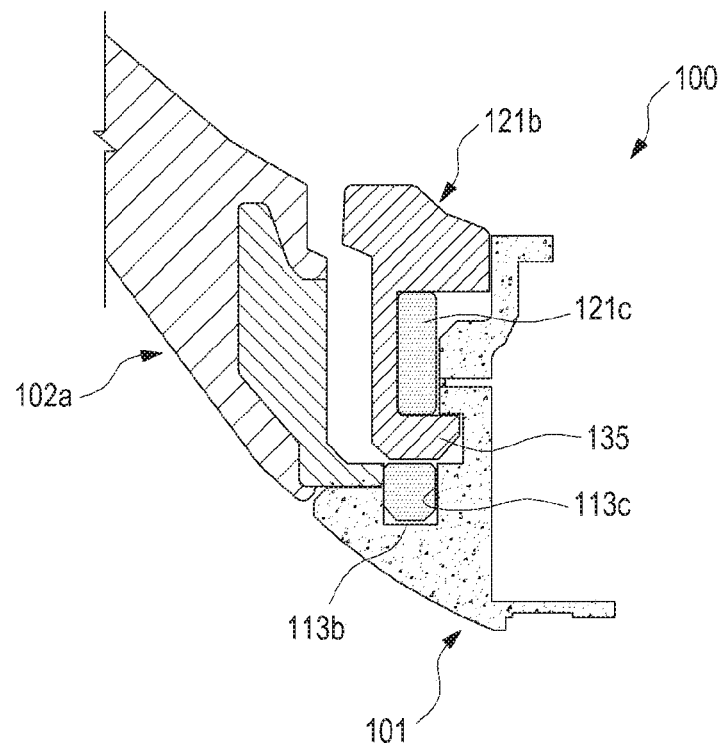

Referring to FIGS. 32 and 33, in the state where the slide member 121c is seated in the mounting recess 113, the slide member 121c is engaged in the binding recess 113b and the locking protrusion 135 is engaged in the locking recess 113c such that the coupling member 102a may be fixed to the housing 101. For example, when the locking member 121b moves forward, the locking protrusion 135 may be engaged in the locking recess 113c such that the fastening of the coupling member 102a may be completed in operation 1060.

Figure 34:
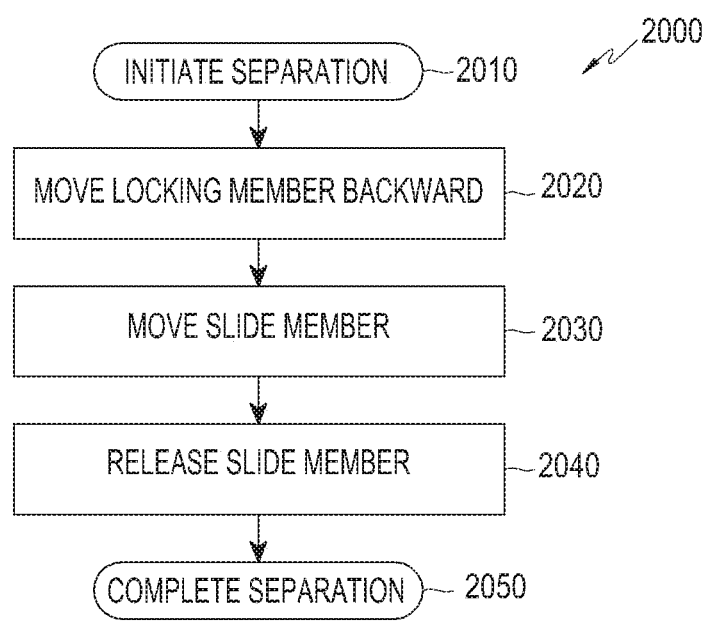
FIG. 34 is a flowchart illustrating a method of separating a coupling member from a housing, in an electronic device according to various embodiments of the present disclosure.

FIG. 34 is a flowchart illustrating a method of separating a coupling member from a housing in an electronic device according to various embodiments of the present disclosure. FIGS. 35 to 40 are views illustrating operations of separating a coupling member from a housing in an electronic device according to various embodiments of the present disclosure.

Referring to FIG. 34, the separating method in operation 2000 may separate the coupling member 102a from the housing 101 through an operation of initiating separation in operation 2010, an operation of moving the locking member 121b backward in operation 2020, an operation of moving the slide member 121c in operation 2030, and an operation of releasing the slide member 121c in operation 2040.

The operation of initiating the separation in operation 2010 includes an operation of disposing the electronic device 100 at a position where, for example, the locking member 121b (e.g., the above-mentioned manipulating portion 131) may be easily manipulated. For example, in order to join another coupling member that is desired by the user to the housing 101, the electronic device 100 may be moved or rotated to a position where the coupling member 102a may be conveniently separated.

Figure 35:
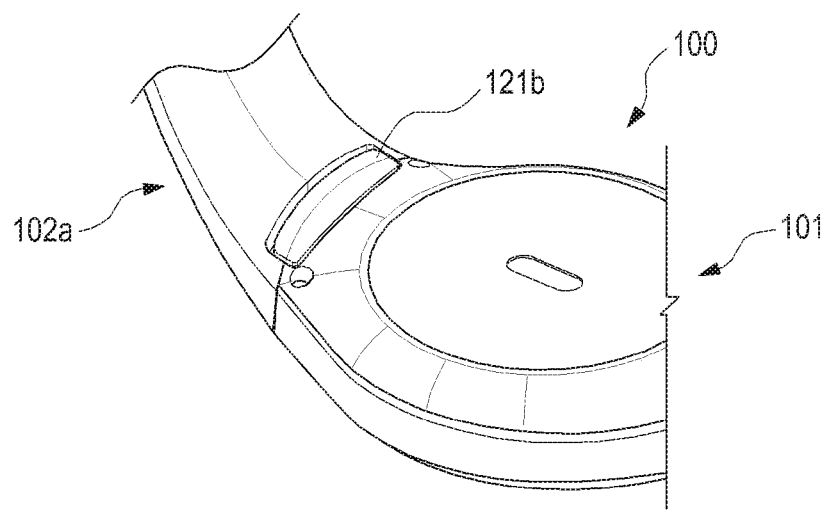
FIGS. 35 to 40 are views illustrating operations of separating a coupling member from a housing in an electronic device according to various embodiments of the present disclosure.
Figure 36:
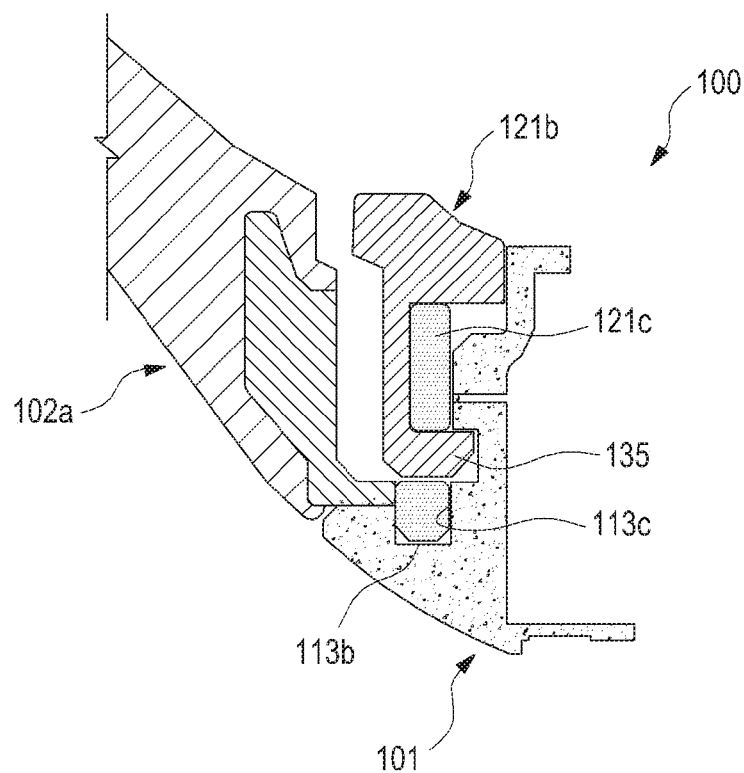

Referring to FIGS. 35 and 36, in the operation of initiating the separation in operation 2010, the coupling member 102a may stably maintain the state of being fastened to the housing 101. For example, the slide member 121c may maintain the state of being engaged in the binding recess 113b and the locking protrusion 135 may maintain the state of being engaged in the locking recess 113c.

Figure 37:
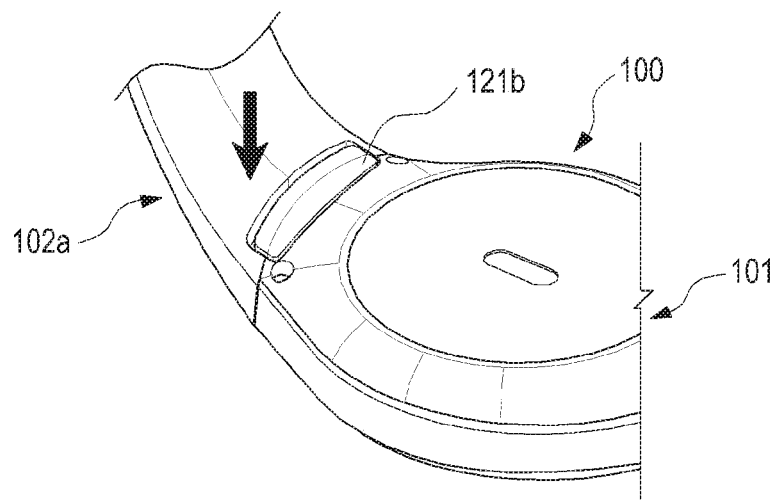
Figure 38:
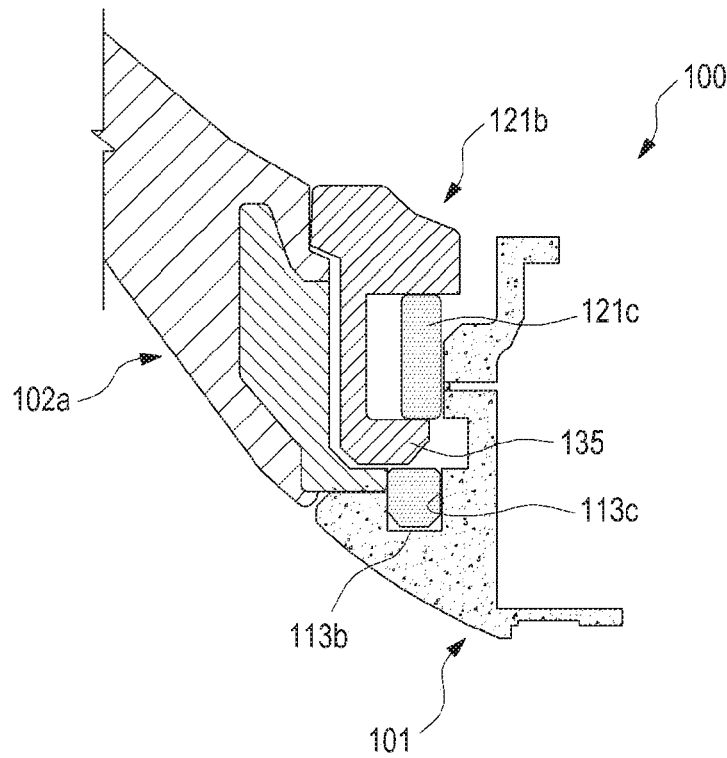

The operation of moving the locking member 121b backward in operation 2020 includes an operation of causing the locking member 121b to move in the third direction D3 by the user's manipulation to be introduced into the locking member 153. Referring to FIGS. 37 and 38, for example, as the locking member 121b moves backward, the locking protrusion 135 may be released from the locking recess 113c to be further accommodated in the inside of the opening 141. When the locking protrusion 135 is released from the locking recess 113c, the coupling member 102a (e.g., the slide member 121c) is movable in the second direction D2.

The operation of moving the slide member 121c in operation 2030 includes an operation of moving the slide member 121c in the second direction D2 in the state where the locking protrusion 135 is released from the locking recess 113c. While the slide member 121c moves in the second direction D2, the user may maintain the locking member 121b in the state of being moved backward. According to various embodiments of the present disclosure, when the slide member 121c moves in the second direction D2 such that the opening 141 is moved away from the position where the opening 141 faces the locking recess 113c, the locking protrusion 135 may rub against the bottom surface of the mounting recess 113. For example, after the opening 141 is moved away from the position where the opening faces the locking recess 113c, it is not necessary for the user to maintain the locking member 121b in the backwardly moved state, and by the elastic force of the above-described elastic member 161, the locking protrusion 135 may protrude to the outside of the slide member to rub against the bottom surface of the mounting recess 113.

Figure 39:
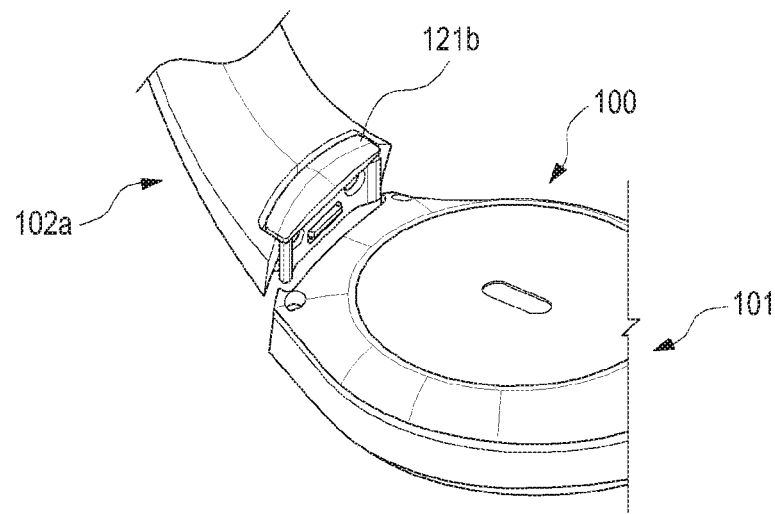
Figure 40:
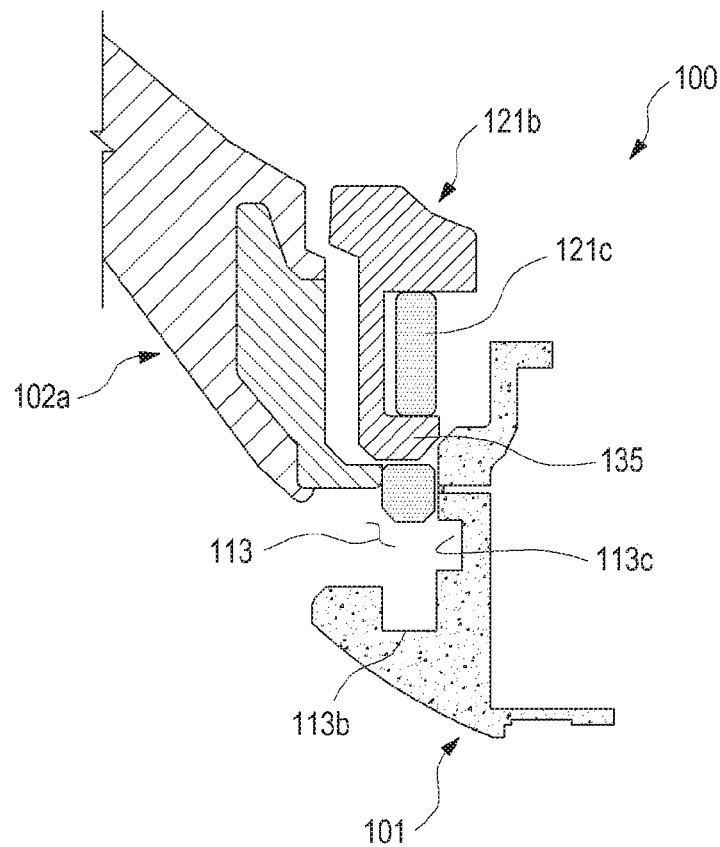

The operation of releasing the locking member 121c in operation 2040 includes an operation of causing the locking member 121c to continuously move in the second direction D2 to be released from the mounting recess 113. When the slide member 121c is released from the mounting recess 113, the locking member 121b is moved forward by the elastic force of the above-described elastic member 161 so as to cause the locking protrusion 135 to protrude to the outside of the slide member 121c since there is no structure to interfere with the locking protrusion 135. Referring to FIGS. 39 and 40, when the slide member 121c is released from the mounting recess 113, the locking member 102a may be fully separated from the housing 101 in operation 2050.

According to various embodiments of the present disclosure, when the user wishes to replace the coupling member 102a that is that is in use (e.g., the coupling member that is joined to the housing 101), the user may easily separate the coupling member 102a from the housing while manipulating the locking member 121b. According to various embodiments of the present disclosure, since the new coupling member may be joined to the housing 101 by aligning and inserting the slide member 121b into the mounting recess 113, a coupling member having an exterior appearance that is desired by the user may be easily joined. The above-described embodiments disclose an example in which a pair of coupling members 102a and 102b are provided on the side faces of the housing 101, respectively, to be worn around a wrist, but the present disclosure does not need to be limited thereto. For example, when the above-mentioned locking member 121b, slide member 121c, and the like, is provided to a coupling member in the form of a necklace, the above-described housing 101 may be worn around the user's neck by being joined to the coupling member in the form of the necklace.

According to various embodiments of the present disclosure, the above-described electronic device 100 includes electric components that are provided to the coupling member 102a (e.g., an antenna, a camera module, an illuminance sensor, and a biometric signal detecting sensor). When the electric components are provided to the above-described coupling member 102a, an electric connection structure may be further included between the coupling member 102a and the housing 101.

Figure 41:
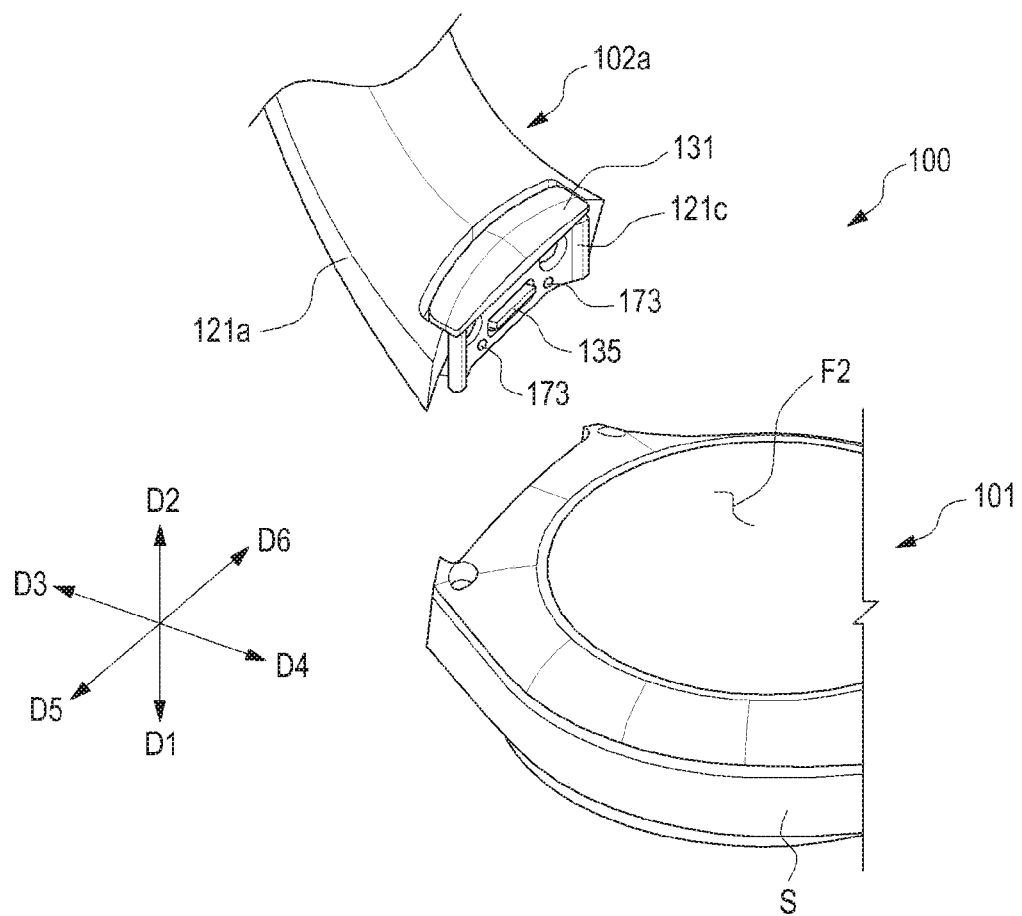
FIGS. 41 and 42 are perspective views illustrating states in which a coupling member is coupled to a housing according to various embodiments of the present disclosure.
Figure 42:
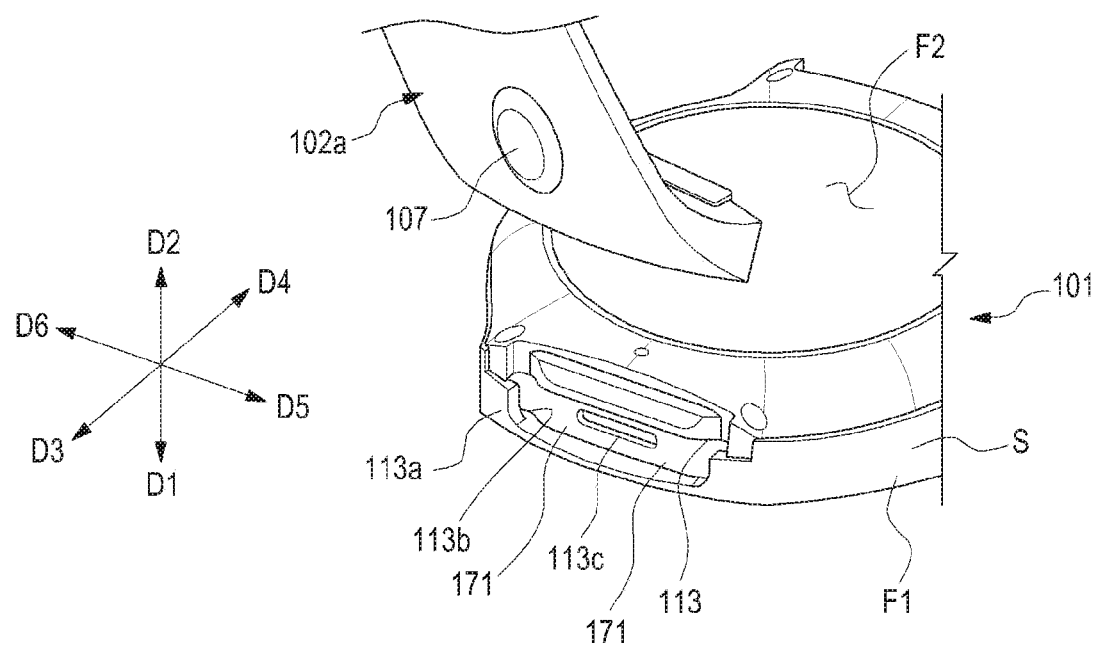
Figure 43:
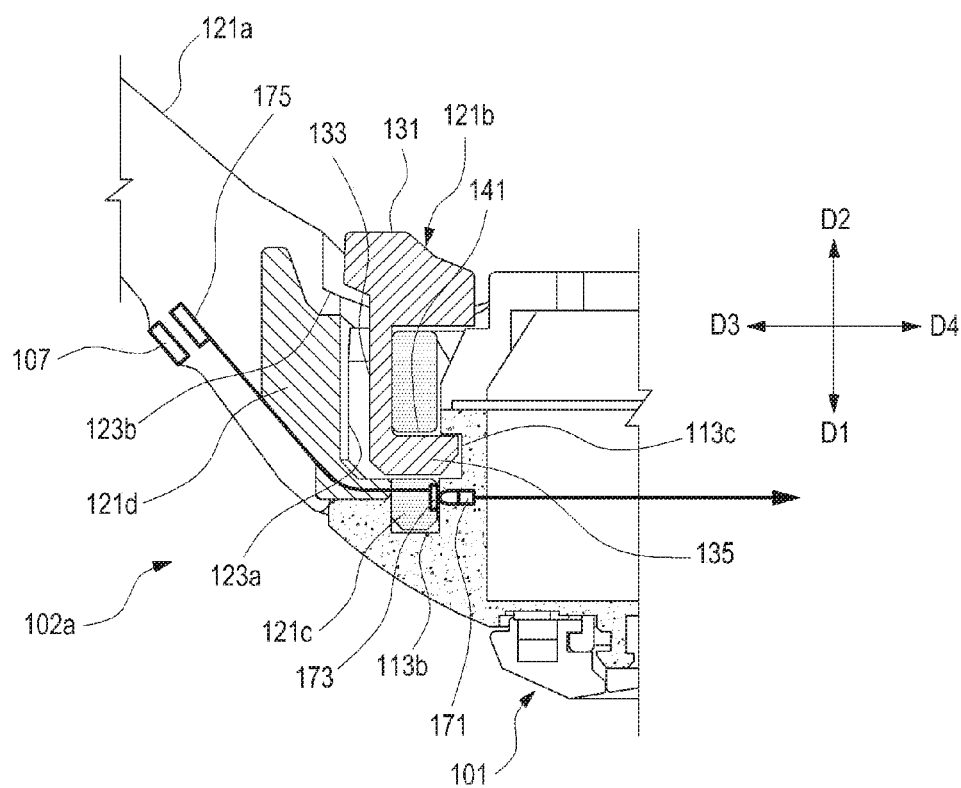
FIG. 43 is a cross-sectional view taken by cutting one portion of an electronic device in a state where a coupling member is joined to a housing according to various embodiments of the present disclosure.

FIGS. 41 and 42 are perspective views illustrating states in which a coupling member is joined to a housing according to various embodiments of the present disclosure. FIG. 43 is a cross-sectional view taken by cutting a portion of an electronic device in a state where a coupling member is joined to a housing according to various embodiments of the present disclosure.

In describing the present embodiment of the present disclosure, the components that can be easily understood from the preceding embodiment may be denoted by the same reference numerals or the reference numerals thereof may be omitted, and the detailed descriptions thereof may also be omitted.

Referring to FIGS. 41 to 43, the electronic device 100 includes the electric components 107 that are disposed in at least one of the coupling members 102a and 102b (e.g., at least one of an input/output device, such as a camera module, various sensors, a speaker, and a display, a communication device, such as an antenna, and a device for supporting various functions, such as a battery). In the case where an electric component 107 is provided to the coupling member(s) 102a, a wired or wireless electric connection structure may be provided between the coupling member 102a and the housing 101. For example, a signal or power may be transferred between an electric circuit embedded in the housing 101 and the electric component included in the coupling member 102a.

The electric component 107 includes an image sensor 175 disposed inside the coupling member 102a, and the electronic device 100 includes a first terminal 171 disposed on the housing 101 and a second terminal 173 disposed on the coupling member 102a so that the image sensor 175 may be electrically connected to an electric circuit disposed inside the housing 101. The first and second terminals 171 and 173 may be disposed to be exposed to the bottom surface of the mounting recess 113 and/or the outer surface of the slide member 121c, respectively, (e.g., to be adjacent to the locking recess 113c and/or the opening 141). At least one of the first and second terminals 171 and 173 includes an elastic connection structure (e.g., a pogo pin, a spring terminal, or a conductive interposer).

In an embodiment of the present embodiment of the present disclosure, descriptions will be made on an example in which the first terminals 171 are disposed in the mounting recess as the elastic connection structure. However, this is to make the description concise and clear, and various embodiments of the present disclosure are not limited to such a structure. For example, the second terminals 173 may be the elastic connection structure and may be disposed in the mounting recess 113c. According to various embodiments of the present disclosure, the second terminals 173 may be disposed to be exposed to the outer surface of the slide member 121c, and may be a flat contact pad that is not elastic. In addition, while the present embodiment exemplifies a configuration in which a pair of first terminals 171 and a pair of second terminals 172 are disposed, three or more first terminals 171 and three or more second terminals 173 (e.g., ground terminals, one or more signal terminals, and a power terminals) may be provided to the housing 101 or the coupling member 102a depending on the functions of the electric components included in the coupling member 102a.

When the coupling member 102a, which includes the electric components 107, is joined to the housing 101, the second terminals 173 are positioned to face the first terminals 171, respectively, and the first terminals 171 may maintain the state of being in close contact with the second terminals 173 by the elastic force.

Figure 44:
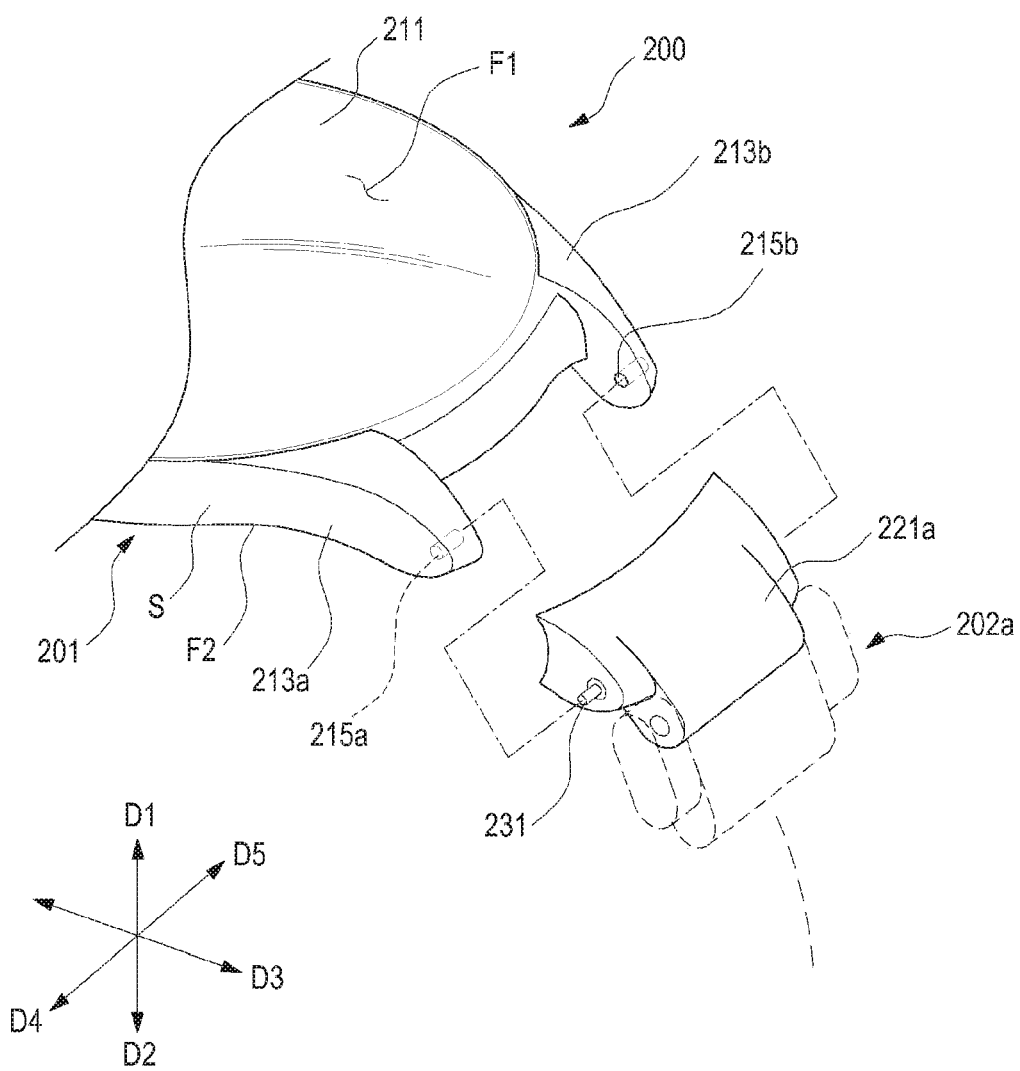
FIG. 44 is an exploded perspective view illustrating an electronic device including a coupling member according to various embodiments of the present disclosure.
Figure 45:
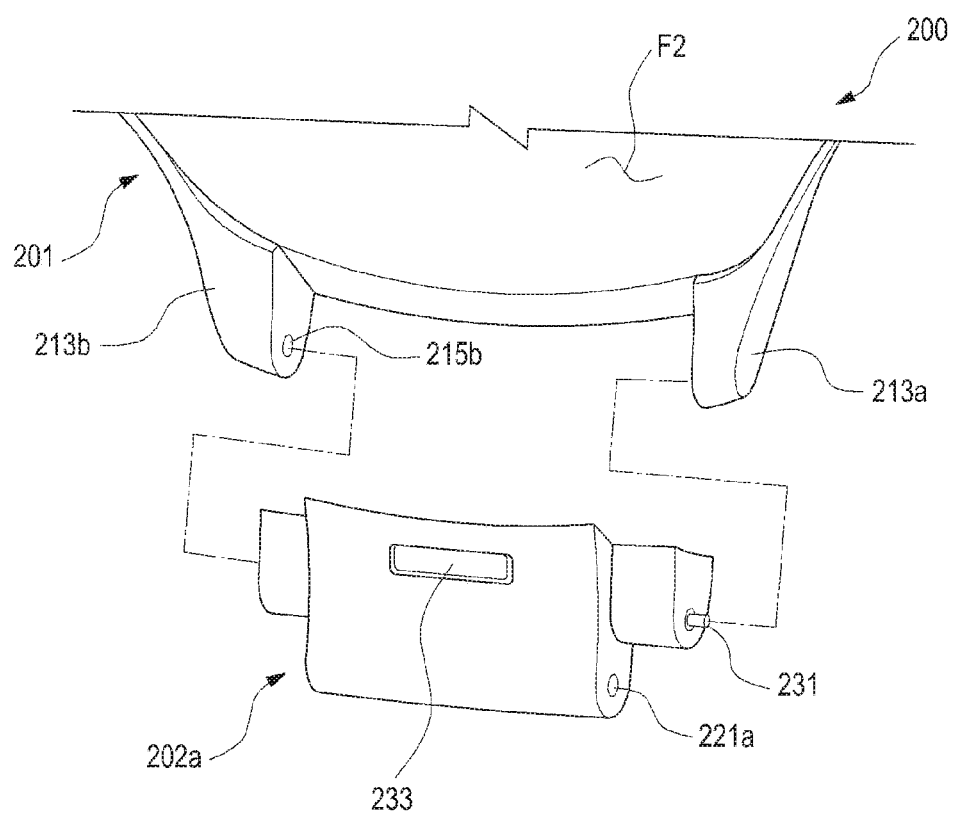
FIG. 45 is an exploded perspective view illustrating an electronic device including a coupling member in which an electronic device is viewed from a certain direction in which an electronic device is viewed from a certain direction according to various embodiments of the present disclosure.

FIG. 44 is an exploded perspective view illustrating an electronic device including a coupling member according to various embodiments of the present disclosure. FIG. 45 is an exploded perspective view illustrating an electronic device including a coupling member in which the electronic device is viewed from a certain direction according to various embodiments of the present disclosure.

Referring to FIGS. 44 to 45, the electronic device 200 includes a housing 201 and coupling member(s) 202a that is (are) detachably mounted on the housing 201. The coupling member 202a may detachably couple the electronic device 200 (e.g., the housing 201) to a user's body portion.

The housing 201 includes a first face F1 that faces in a first direction D1, a second face F2 that faces in a second direction D2 that is opposite to the first direction D1, and a side face S that at least partially encloses a space between the first face F1 and the second face F2. Various electric circuit components (e.g., a processor, a communication module, and a video/audio module) may be accommodated in the housing 201, and a display 211 may be installed to the housing 201 to be exposed through the first face F1.

The housing 201 includes first and second protrusions 213a and 213b, which are formed on a portion of the side face S to face each other. The first and second protrusions 213a and 213b may protrude from the side face S to be oriented in the third direction D3 that is parallel with the first face F1 and/or the second face F2 while being perpendicular to the first and second directions D1 and D2. When the coupling members 202a have a configuration to be joined at symmetric positions on the side face S of the housing 201, the other protrusions may be formed on the side face S of the housing 201 at the positions that are symmetric to the first and second protrusions 213a and 213b, respectively. For example, the electronic device 200 includes protrusions that protrude in the direction opposite to the third direction D3 from the other portion of the side face S (e.g., the other portion of the side face S that are symmetric to the portion of the side face S where the first and second protrusions 213a and 213b are formed).

First recesses 215a may be formed on the first protrusions 213a, respectively. The first recess 215a may extend, from one face of the first protrusion 213a that faces the second protrusion 213b, in the fourth direction D4 that is perpendicular to the third direction D3. A second recess 215b may be formed on the second protrusion 213b. The second recess 215b may extend in the fifth direction D5, which is perpendicular to the third direction D3, from one face of the second protrusion 213b that faces the first protrusion 213a. The fifth direction D5 may be opposite to the fourth direction D4. For example, the first and second recesses 215a and 215b may be formed on the first and second protrusions 213a and 213b, respectively, to extend in the opposite directions.

At least one of the coupling members 202a may be mounted on the side face of the housing 201. For example, the coupling members 202a may be attached to/detached from a portion that faces in a third direction D3 in the side face S of the housing 201. In the state where the electronic device 200 is worn on the user's body portion, the coupling members 202a includes a first portion(s) 221a that is (are) in contact with the user's body portion. The coupling member 202a may have a chain structure in which a plurality of first portions 221a are connected to each other.

Figure 46:
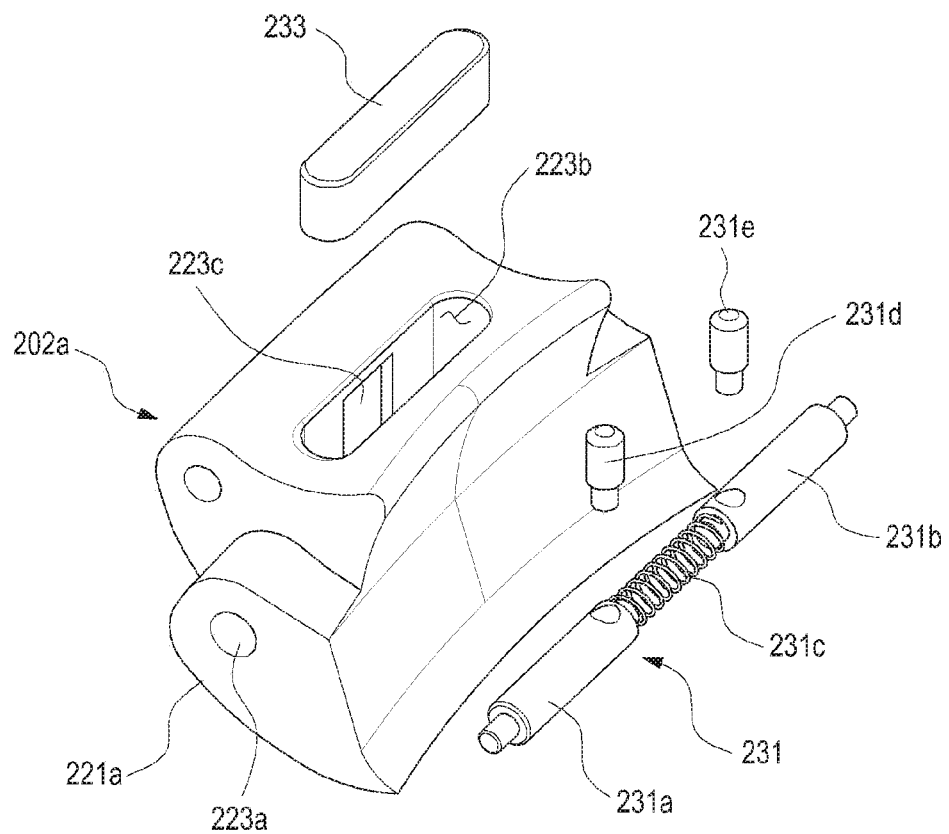
FIG. 46 is an exploded perspective view illustrating a portion of a coupling member according to various embodiments of the present disclosure.

FIG. 46 is an exploded perspective view illustrating a portion of a coupling member according to various embodiments of the present disclosure.

Referring to FIG. 46, the coupling member 202a includes a first portion 221a that is in contact with a portion of the user's body when the user wears the electronic device 200, a through-hole 223a that is formed through the first portion 221a in the fourth direction D4 or the fifth direction D5, and a bar 231 that is disposed inside the through-hole 223a. The bar 231 (e.g., an elastic body 231c to be described later) may provide an elastic force in the fourth direction D4 and/or the fifth direction D5. The bar 231 includes, for example, a first sub-bar 231a that extends in the above-described fourth direction D4, a second sub-bar 231b that extends in the above-described fifth direction D5, and an elastic body 231c that is disposed between the first and second sub-bars 231a and 231b. The elastic body 231c may provide an elastic force that acts in the direction that causes the first and second sub-bars 231a and 231b to be away from each other.

According to various embodiments of the present disclosure, the bar 231 includes a first pin 231d that protrudes in the second direction D2 from the first sub-bar 231a and a second pin 231e that protrudes in the second direction D2 from the second sub-bar 231b. The first and second pins 231d and 231e may be assembled to the first and second sub-bars 231a and 231b, respectively, or may be integrally formed with the first and second sub-bars 231a and 231b, respectively.

The coupling member 202a may be joined to the housing 201 in the state where the first portion 221a is at least partially disposed between the first and second protrusions 231a and 231b. When the first portion 221a or a portion of the first portion 221a is disposed between the first and second protrusions 213a and 213b, the opposite ends of the bar 231 may be accommodated in and bound to the first and second recesses 215a and 215b, respectively. For example, when the first and second sub-bars 231a and 231b are bound to the first and second recesses 215a and 215b, respectively, in the state where the bar 231 is disposed inside the through-hole 223a, the first portion 221a and/or the coupling member 202a may be bound to the housing 201.

The coupling member 202a includes a recess 223b formed on the first portion 221a and a button 233 disposed in the recess 223b. The recess 223b may extend in the first direction D1 from one face of the first portion 221a to be connected to the through-hole 223a. The button 233 may be at least partially disposed inside the recess 223b and may be reciprocated in the first direction D1 and/or the second direction D2. When the bar 231 is disposed in the through-hole 223a, each of the first and second pins 231d and 231e may be at least partially disposed inside the recess 223b. The button 233 may interfere with or may be in contact with the first and second pins 231d and 231e, respectively. For example, upon being pushed in the first direction D1, the button 233 may interfere with the first and second pins 231d and 231e, respectively. When the button 233 is pushed in the first direction D1, the first and second pins 231d and 231e interfere with the button 233 such that the opposite ends of the bar 231 may move in the fourth direction D4 and/or the fifth direction D5. For example, when the button 233 is pushed, the bar 231 may be contracted, and the opposite ends of the bar 231 may be released from the first recess 215a and/or the second recess 215b to be introduced into the through-hole 223a.

A guide recess 223c may be formed on the inner wall of the recess 223b so as to guide the reciprocating movement of the button 233. The guide recess 223c may extend along the reciprocating direction of the button 233, and a guide protrusion 223a (see, e.g., FIG. 47) provided on the button 233 may interfere with the end wall of the guide recess 223c, thereby preventing the button 233 from being released from the recess 223b. According to various embodiments of the present disclosure, the inner wall of the recess 223b and/or the inner wall of the guide recess 223c includes a lubricating layer that relives a frictional force with the button 233 (e.g., a layer formed by depositing and coating a material, such as Teflon, or a lubricant (e.g., grease) layer).

The button 233 and the bar 231 will be discussed in more detail with reference to, for example, FIG. 47.

Figure 47:
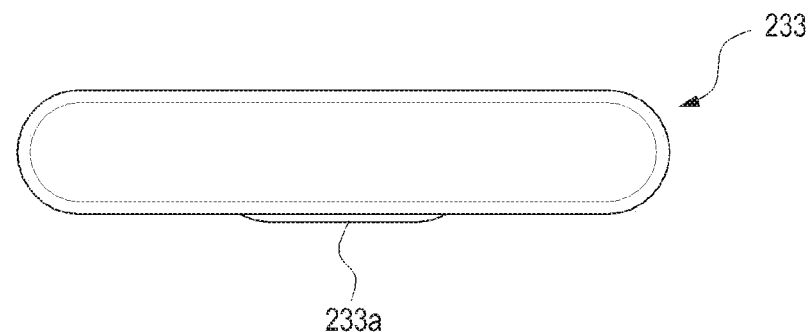
FIG. 47 is a plan view illustrating a button of a coupling member according to various embodiments of the present disclosure.
Figure 48:
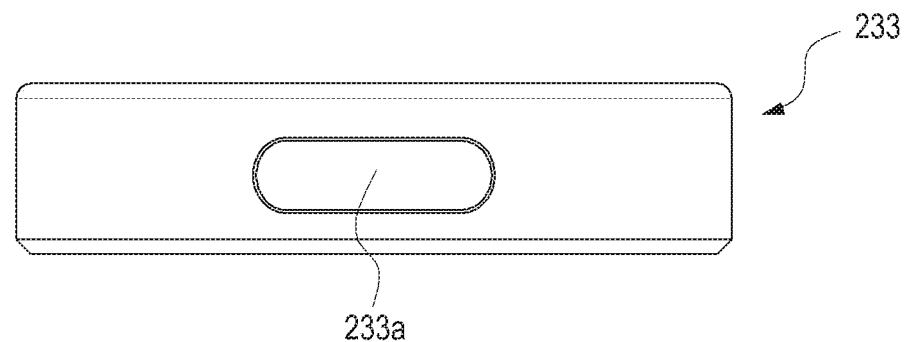
FIG. 48 is a side view illustrating a button of a coupling member according to various embodiments of the present disclosure.
Figure 49:
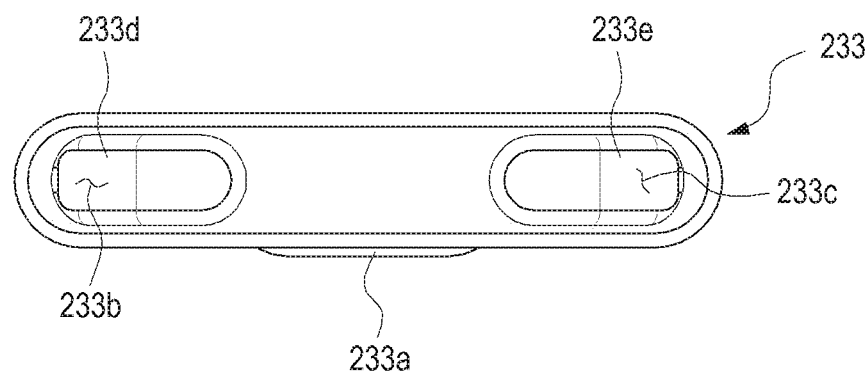
FIG. 49 is a bottom view illustrating a button of a coupling member according to various embodiments of the present disclosure.
Figure 50:
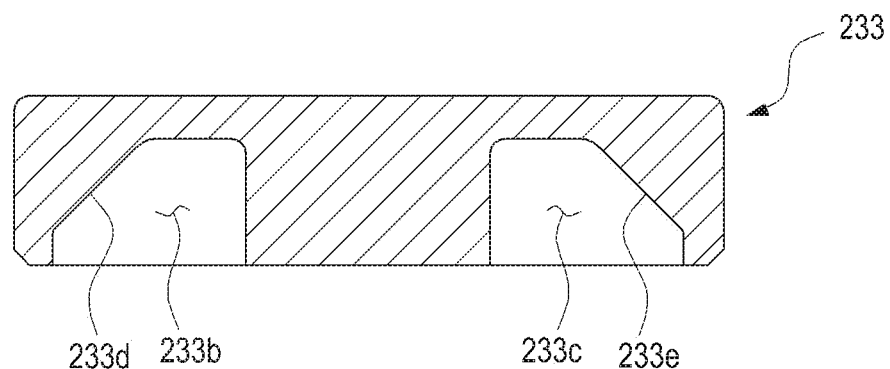
FIG. 50 is a cross-sectional view illustrating a button of a coupling member according to various embodiments of the present disclosure.

FIG. 47 is a plan view illustrating a button of a coupling member according to various embodiments of the present disclosure. FIG. 48 is a side view illustrating a button of a coupling member according to various embodiments of the present disclosure. FIG. 49 is a bottom view illustrating a button of a coupling member according to various embodiments of the present disclosure. FIG. 50 is a cross-sectional view illustrating a button of a coupling member according to various embodiments of the present disclosure.

Referring to FIGS. 47 to 50, the button 233 includes, on one face thereof, a guide protrusion 233a that corresponds to the guide recess 223c. The guide protrusion 233a may be accommodated in the guide recess 223c formed in the inner wall of the recess 223b so as to guide the reciprocating movement of the button 233, and when the button 233 moves in the second direction D2, the button 233 may interfere with the end walls of the guide recess 223c so that the moving range of the button 233 may be limited. For example, the button 233 is reciprocated within the recess 223b while being guided by the guide protrusion 233a and the guide recess 223c, and the moving range of the button 233 in the second direction D2 may be limited. According to various embodiments of the present disclosure, the guide recess 223c provides a space in which the guide protrusion 233a is assembled, so that an assembly position may be set in assembling the button 233 in the recess 223b. According to an embodiment of the present disclosure, after being introduced into the guide recess 223c, the moving range of the guide protrusion 233a in the second direction D2 is limited so that it is possible to prevent the button 233 from being released from the recess 223b.

The button 233 includes a first recess 233b and/or a second recess 233c that are formed on another face (the face that faces in the first direction D1). The first and second recesses 233b and 233c may extend in the first direction D1 from one face of the button 233, and may partially form inclined faces 233d and 233e, respectively. The first and second pins 231d and 231e of the bar 231 may be accommodated within the first and second recesses 233b and 233c, respectively, and may interfere with or come in contact with the inclined faces 233d and 233e within the first and second recesses 233b and 233c, respectively.

Figure 51:
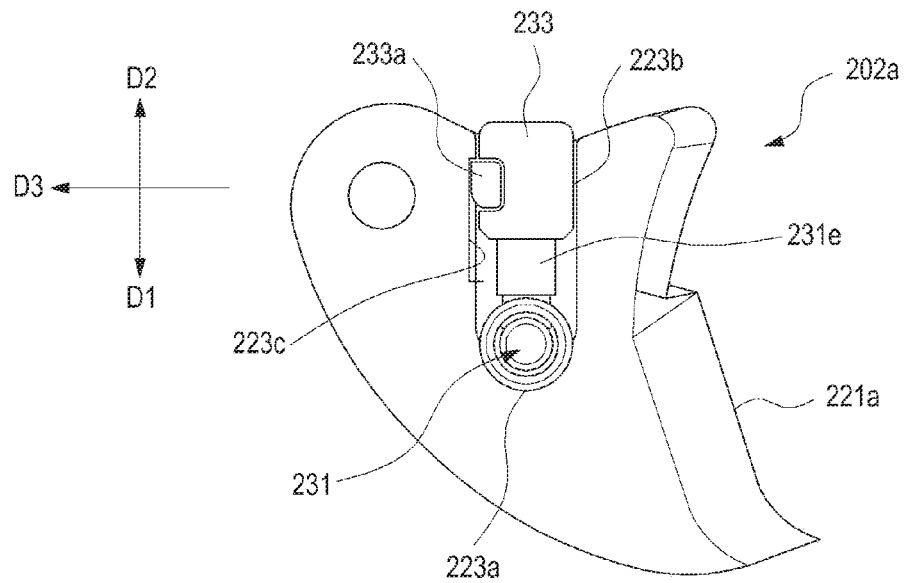
FIG. 51 is a cross-sectional view illustrating a portion of a coupling member according to various embodiments of the present disclosure.
Figure 52:
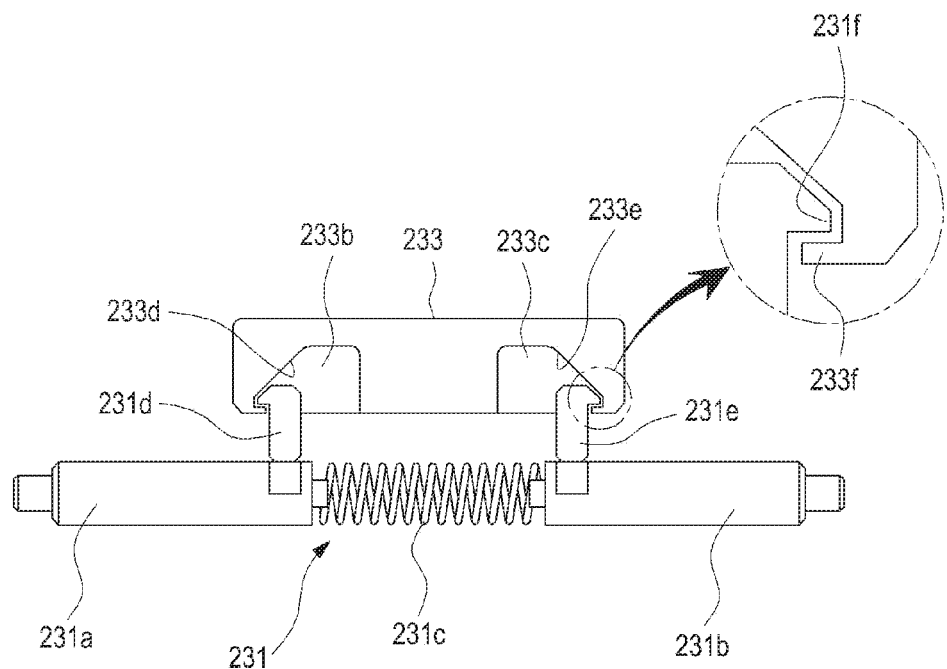
FIG. 52 is a cross-sectional view illustrating a modification of a coupling member according to various embodiments of the present disclosure.

FIG. 51 is a cross-sectional view illustrating a portion of a coupling member according to various embodiments of the present disclosure. FIG. 52 is a cross-sectional view illustrating a modification of a coupling member according to various embodiments of the present disclosure.

Referring to FIGS. 51 and 52, the guide protrusion 233a may be assembled to one face of the button 233 or may be integrally formed on the one face. When the button 233 is pushed in the first direction D1, the button 233 is interfered with the bottom of the recess 223b or the first sub-bar 231a and/or the second sub-bar 231b of the bar 231 so that the moving range of the button 233 in the first direction D1 may be limited.

According to various embodiments of the present disclosure, the moving range of the button 233 may be limited by the shapes of the first and second pins 231d and 231e and the first and second recesses 233b and 233c. For example, undercut-shaped portions 231f and 233f may be provided in the upper ends of the first and second pins 231d and 231e and around the first and second recesses 233b and 233c on one face of the button 233. The undercut-shaped portions 231f and 233f may interfere with each other so as to limit the movement of the button 233 in the second direction D2.

Figure 53:
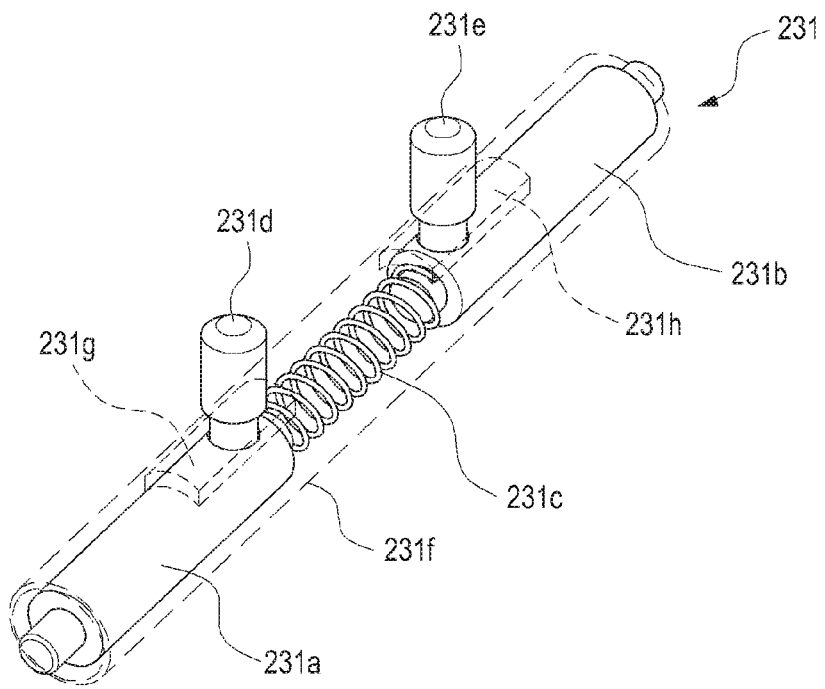
FIG. 53 is a perspective view illustrating a bar of a coupling member according to various embodiments of the present disclosure.
Figure 54:
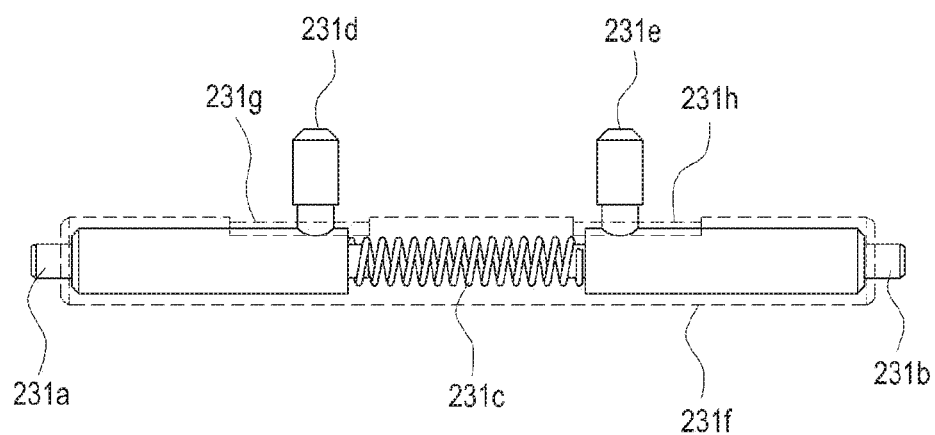
FIG. 54 is a side view illustrating a bar of a coupling member according to various embodiments of the present disclosure.

FIG. 53 is a perspective view illustrating a bar of a coupling member according to various embodiments of the present disclosure. FIG. 54 is a side view illustrating a bar of a coupling member according to various embodiments of the present disclosure.

Referring to FIGS. 53 and 54, the bar 231 includes a tube 231f that accommodates the first and second sub-bars 231a and 231b and the elastic body 231c. The opposite ends of the tube 231f may be opened such that the first and second sub-bars 231a and 231b may at least partially protrude therefrom, and operating holes 231g and 231h may be formed on a portion of the side face of the tube 231f so as to expose other portions of the first and second sub-bars 231a and 231b. The first and second pins 231d and 231e may be assembled to the first and second sub-bars 231a and 231b through the operating holes 231g and 231h, respectively.

FIGS. 55 to 58 are views illustrating operations of a coupling members according to various embodiments of the present disclosure.

In describing the operations of the coupling members with reference to FIGS. 55 to 58, FIGS. 44 and 45 will also be referred to.

Figure 55:
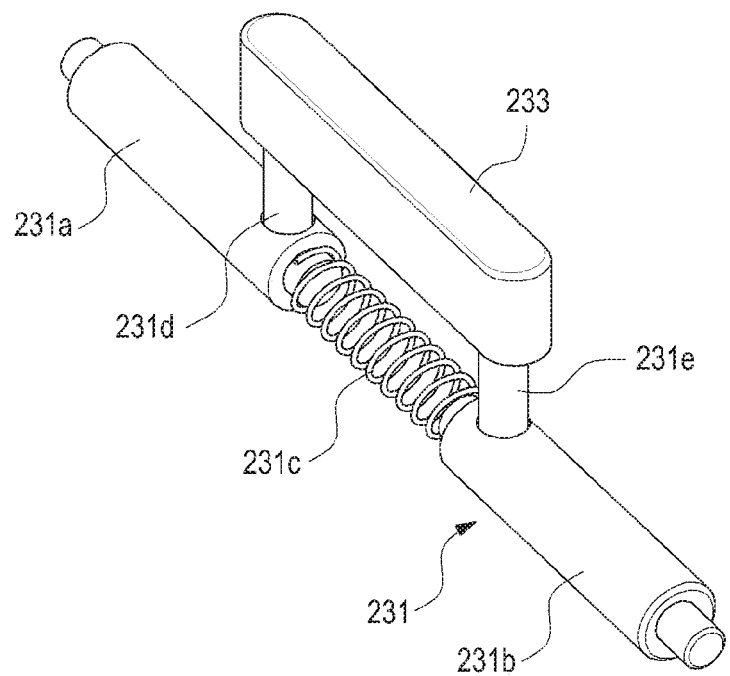
FIGS. 55 to 58 are views illustrating operations of coupling members according to various embodiments of the present disclosure.
Figure 56:
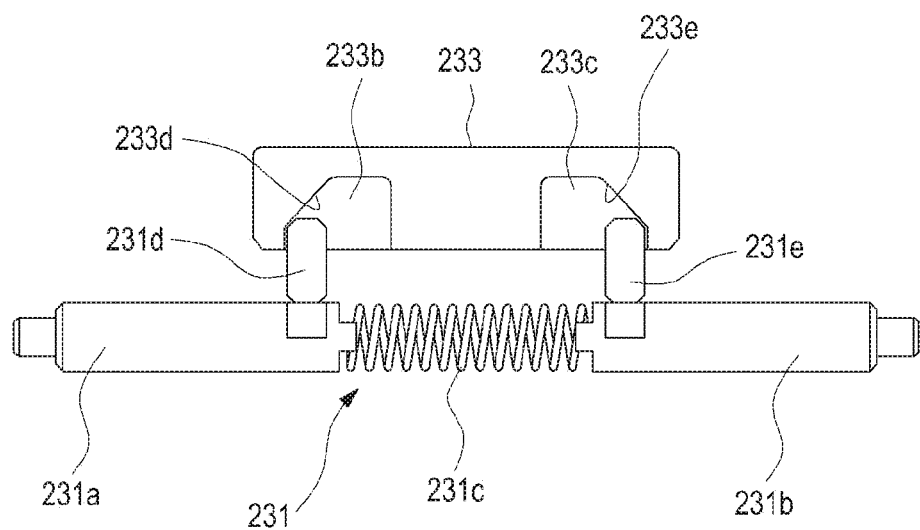

Referring to FIGS. 55 and 56, as described above, in binding the coupling member 202a to the housing 101, the opposite ends of the bar 231 are engaged in the first and second recesses 215a and 215b formed on the first and second protrusions 213a and 213b, respectively. For example, the coupling member 202a may be joined to the housing 201 as the bar 231 is bound to the first protrusion 213a and/or the second protrusion 213b in the state where the bar 231 is disposed in the first portion 221a. The first and second sub-bars 231a and 231b of the bar 231 may be engaged in the first and second recesses 215a and 215b, respectively, in the state where the first and second sub-bars 231a and 231b are distant away from each other. Referring to FIGS. 55 and 56, the button 233 may be spaced apart from the first and second sub-bars 231a and 231b by a certain height in the state where the first and second sub-bars 231a and 231b are distant away from each other.

Figure 57:
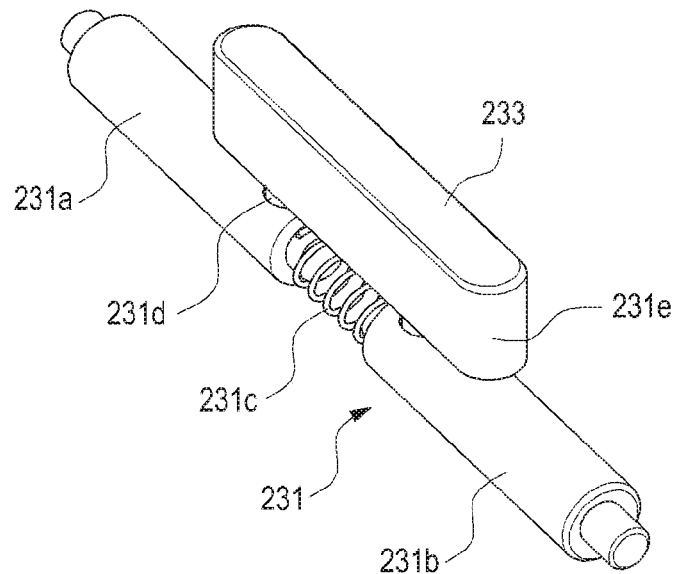
Figure 58:
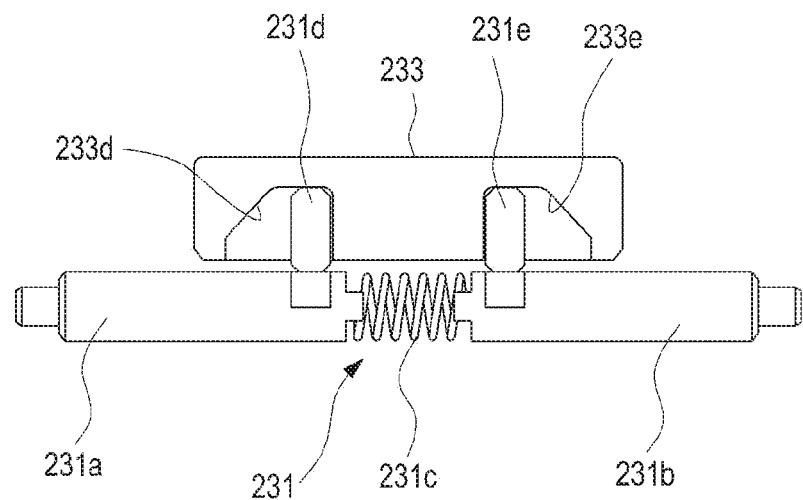

Referring to FIGS. 57 and 58, when the button 233 is pushed in the first direction D1, the first and second pins 231d and 231e may interfere with the inclined faces, respectively, to move in the fourth direction D4 and/or the fifth direction D5. Since the first and second pins 231d and 231e are provided on the first and second sub-bars 231a and 231b, the first and second sub-bars 231a and 213b may move to be closer to each other as the first and second pins 231d and 231e move. For example, when the button 233 is pushed, the first and second sub-bars 231a and 231b move so that the bar may be contracted. As the bar 231 is contracted, the opposite ends of the bar 231 may be released from the first and second recesses 215a and 215b, respectively, and the coupling member 202a may be separated from the housing 201. For example, the user may separate the coupling member 202a from the housing 201 in the state where the button 233 is pushed.

When there is no force to push the button 233, the elastic force of the elastic body 231c of the bar 231 may move the first and second sub-bars 231a and 231b to be spaced away from each other. As the first and second sub-bars 231a and 231b are moved to be spaced away from each other, the first and second pins 231d and 231e may push the inclined faces 233d and 233e so that the button 233 may be moved in the second direction D2. When the button 233 is moved in the second direction D2, the guide protrusion 233a may interfere with another end wall of the guide recess 233c (e.g., the upper end wall of the guide recess 223c in FIG. 51) so that the moving range of the button 233 in the second direction D2 may be limited.

According to another example, when the button 233 moves in the first direction D1 (e.g., when the user pushes the button 233), the upper ends of the first and second pins 231d and 231e may reach the ends of the inclined faces 233d and 233e (e.g., the deepest portions of the first and second recesses 233b and 233c). When the upper ends of the first and second pins 231d and 231e reach the ends of the inclined faces 233d and 233e, since the first and second pins 231d and 231e cannot move to the inside of the first and second recesses 233b and 233c any more, the moving range of the button 233 in the first direction D1 may be limited.

Figure 59:
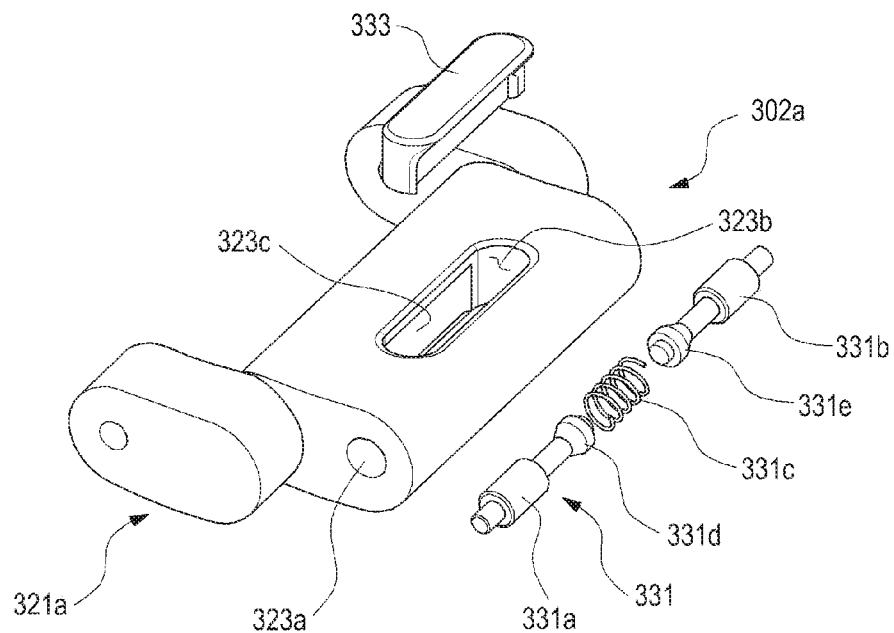
FIG. 59 is an exploded perspective view illustrating a portion of a coupling member according to various embodiments of the present disclosure.

FIG. 59 is an exploded perspective view illustrating a portion of a coupling member according to various embodiments of the present disclosure.

Referring to FIG. 59, the coupling member 302a according to the present embodiment may be similar to that of the preceding embodiment in that it includes a button 333 and a bar 331. According to various embodiments of the present disclosure, in the above described first direction D1 and/or second direction D2, one side face of the button 333 may at least partially overlap with the bar 331. For example, when the button 333 and the bar 331 are fabricated in the same sizes as those of the preceding embodiment of the present disclosure, the installed height or thickness of the button 333 and bar 331 in the above-described first direction D1 and/or second direction D2 may be smaller than that in the preceding embodiment when the button 333 and the bar 331 are installed in a first portion 321a.

Referring to FIG. 59, the coupling member 302a includes a first portion 321a that is in contact with a portion of the user's body when the user wears the electronic device 200, a through-hole 323a that is formed through the first portion 321a in the fourth direction D4 or the fifth direction D5, and a bar 331 that is disposed inside the through-hole 323a. The bar 331 may provide an elastic force in the fourth direction D4 and/or the fifth direction D5. The bar 331 includes, for example, a first sub-bar 331a that extends in the above-described fourth direction D4, a second sub-bar 331b that extends in the above-described fifth direction D5, and an elastic body 331c that is disposed between the first and second sub-bars 331a and 331b. The elastic body 331c may provide an elastic force that acts in the direction that causes the first and second sub-bars 331a and 331b to be away from each other. The first and second sub-bars 331d and 331b may be provided with first and second inclined portions 331d and 331e, respectively. The first and second inclined portions 331d and 331e may be formed to be at least partially inclined with respect to the fourth direction D4 and/or the fifth direction D5.

The coupling member 302a may be joined to the housing 201 in the state where the first portion 321a is at least partially disposed between the first and second protrusions 231a and 231b. When the first portion 321a or a portion of the first portion 321a is disposed between the first and second protrusions 213a and 213b, the opposite ends of the bar 331 may be accommodated in and bound to the first and second recesses 215a and 215b, respectively. For example, when the first and second sub-bars 331a and 331b are bound to the first and second recesses 215a and 215b, respectively, in the state where the bar 331 is disposed inside the through-hole 323a, the first portion 321a and/or the coupling member 302a may be bound to the housing 201.

The coupling member 302a includes a recess 323b formed on the first portion 321a and a button 333 disposed in the recess 323b. The recess 323b may extend in the first direction D1 from one face of the first portion 321a to be connected to the through-hole 323a. The button 333 may be at least partially disposed inside the recess 323b and may be reciprocated in the first direction D1 and/or the second direction D2. When the bar 331 is disposed in the through-hole 323a, a portion of a side face of the bar 331 may be disposed to face one side face of the button 333. The button 333 may interfere with or may be in contact with the first and second sub-bars 331a and 331b (e.g., the first and second inclined portions 331d and 331e, respectively). For example, when the button 333 is pushed in the first direction D1, the button 333 may interfere with the first and second inclined portions 333d and 333e, respectively. When the button 333 is pushed in the first direction D1, the first and second inclined portions 333d and 333e interfere with the button 333 such that the opposite ends of the bar 331 may move in the fourth direction D4 and/or the fifth direction D5. For example, when the button 333 is pushed, the bar 331 may be contracted, and the opposite ends of the bar 333 may be released from the first recess 215a and/or second recess and 215b to be introduced into the through-hole 323a.

A guide recess 323c may be formed on the inner wall of the recess 323b so as to guide the reciprocating movement of the button 333. The guide recess 323c may extend along the reciprocating direction of the button 333, and a guide protrusion 333a (see, e.g., FIG. 60) provided on the button 333 may interfere with the end wall of the guide recess 323c, thereby preventing the button 333 from being released from the recess 323b.

The button 333 and the bar 331 will be discussed in more detail with reference to, for example, FIG. 60.

Figure 60:
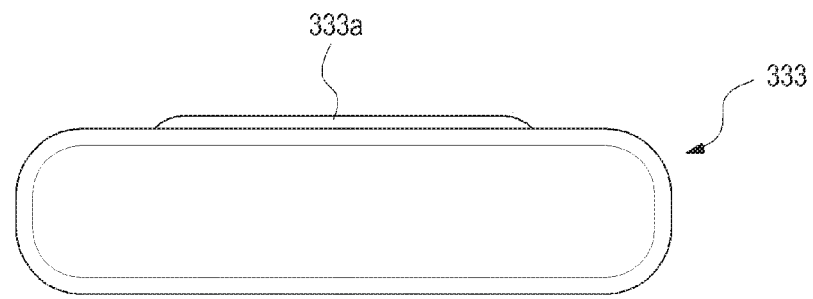
FIG. 60 is a plan view illustrating a button of a coupling member according to various embodiments of the present disclosure.
Figure 61:
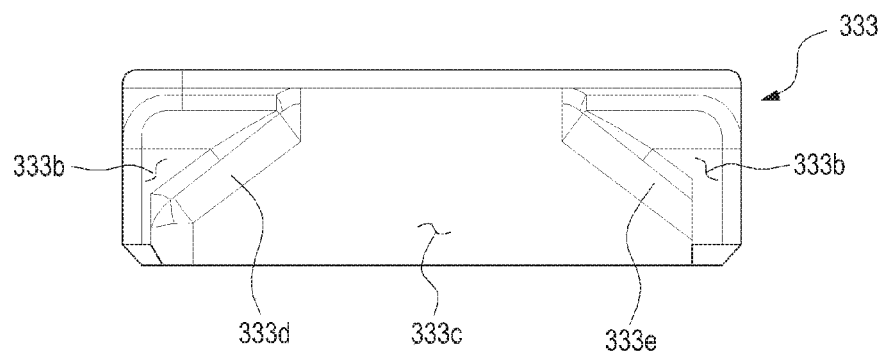
FIG. 61 is a first side view illustrating a button of a coupling member according to various embodiments of the present disclosure.
Figure 62:
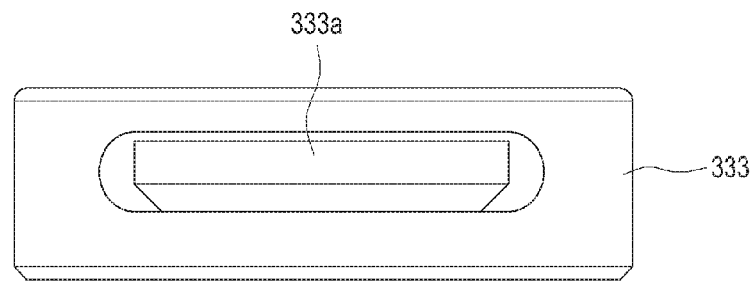
FIG. 62 is a second side view illustrating a button of a coupling member according to various embodiments of the present disclosure.

FIG. 60 is a plan view illustrating a button of a coupling member according to various embodiments of the present disclosure. FIG. 61 is a first side view illustrating a button of a coupling member according to various embodiments of the present disclosure. FIG. 62 is a second side view illustrating a button of a coupling member according to various embodiments of the present disclosure.

Referring to FIGS. 60 to 62, the button 333 includes, on one face thereof, a guide protrusion 333a that corresponds to the guide recess 323c. The guide protrusion 333a may be accommodated in the guide recess 323c formed in the inner wall of the guide recess 323c so as to guide the reciprocating movement of the button 333, and when the button 333 moves in the second direction D2, the button 333 may interfere with the end walls of the guide recess 323c so that the moving range of the button 233 may be limited. For example, the button 333 is reciprocated within the recess 323b while being guided by the guide protrusion 333a and the guide recess 323c, and the moving range of the button 333 in the second direction D2 may be limited.

The button 333 includes first and second clearance recesses 333b and 333c formed on another face (e.g., the face that is opposite to the face where the guide protrusion 333a is formed) and inclined faces 333d and 333e that interconnect the first and second clearance recesses 333b and 333c. The first clearance recess 333b is formed by being recessed from one face of the button 333 by a certain depth, and the second clearance recess 333c may be formed as a portion of the first clearance recess 333b is further recessed. The first and second clearance recesses 333b and 333c may be connected to each other through the inclined faces 333d and 333e.

Figure 63:
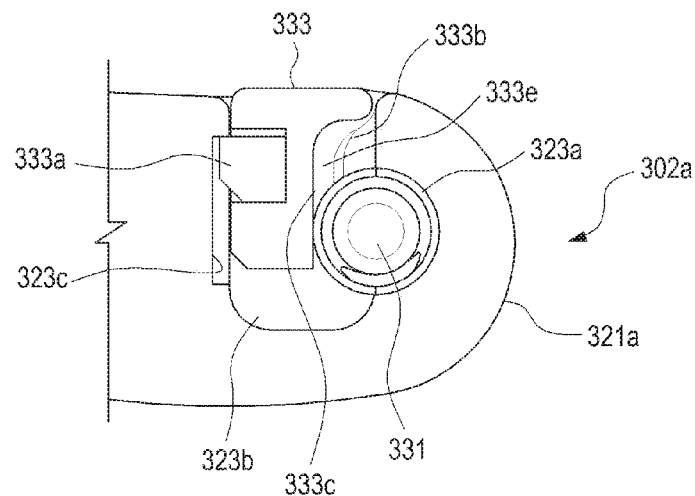
FIG. 63 is a cross-sectional view illustrating a portion of a coupling member according to various embodiments of the present disclosure.
Figure 64:
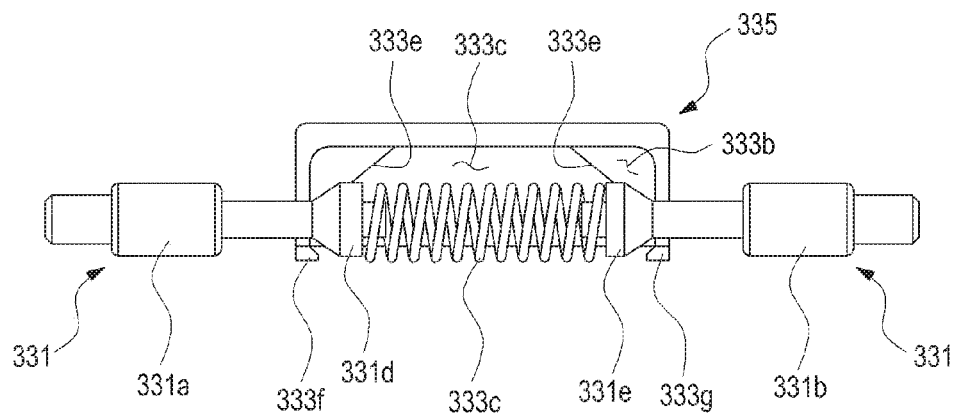
FIG. 64 is a side view illustrating a modification of a coupling member according to various embodiments of the present disclosure.

FIG. 63 is a cross-sectional view illustrating a portion of a coupling member according to various embodiments of the present disclosure. FIG. 64 is a side view illustrating a modification of a coupling member according to various embodiments of the present disclosure.

Referring to FIG. 63, it can be seen that the first and second clearance recesses 333b and 333c are illustrated in the form of lines at the right side of the button 333, and the first and second clearance recesses 333b and 333c are connected to each other through the inclined faces 333e. The guide protrusion 333a may be assembled to one face of the button 333 or may be integrally formed on the one face. When the button 333 is pushed in the first direction D1 (e.g., downward in FIG. 63), the button 333 interferes with the bottom of the recess 323b or the first sub-bar 331a and/or the second sub-bar 331b of the bar 331 so that the moving range of the button 333 in the first direction D1 may be limited. According to various embodiments of the present disclosure, the guide protrusion 333a may interfere with an end wall of the guide recess 323c (e.g., the upper end wall of the guide recess 323c in FIG. 63) so that the moving range of the button 333 in the first direction D1 may be limited.

Referring to FIG. 64, the moving range of the button 333 may be limited by the shapes of the first and second inclined faces 331d and 331e and the first and second clearance recesses 333b and 333c. For example, the undercut-shaped portions 333f and 333g are formed on the first clearance recess 333b, and as a result, when the button 333 moves in the second direction D2, the button 333 interfere with the first sub-bar 331a and/or the second sub-bar 331b, the moving range of the button 333 in the second direction D2 may be limited.

Figure 65:
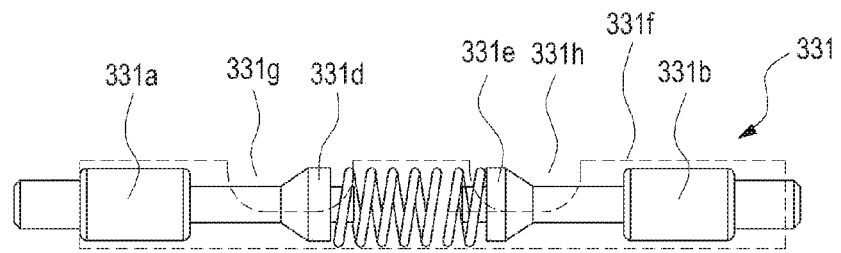
FIG. 65 is a plan view illustrating a bar of a coupling member according to various embodiments of the present disclosure.
Figure 66:
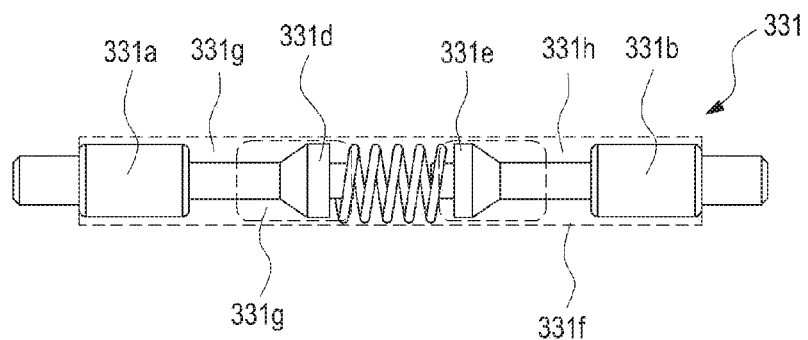
FIG. 66 is a plan view illustrating a bar of a coupling member according to various embodiments of the present disclosure.

FIG. 65 is a plan view illustrating a bar of a coupling member according to various embodiments of the present disclosure. FIG. 66 is a plan view illustrating a bar of a coupling member according to various embodiments of the present disclosure.

Referring to FIGS. 65 and 66, the bar 331 includes a tube 331f that accommodates the first and second sub-bars 331a and 331b and the elastic body 331c. The opposite ends of the tube 331f may be opened such that the first and second sub-bars 331a and 331b may at least partially protrude therefrom, and operating holes 331g and 331h may be formed on a portion of the side face of the tube 331f so as to expose other portions of the first and second sub-bars 331a and 331b (e.g., the first and second inclined portions 331d and 331e). The first and second inclined portions 331d and 331e are exposed to the outside of the tube 331f through the operating holes 331g and 331h to interfere with or come in contact with a portion of the button 333 (e.g., the inclined faces 333d and 333e).

FIGS. 67 to 70 are views illustrating operations of coupling members according to various embodiments of the present disclosure.

In describing the present embodiment of the present disclosure, FIGS. 44 and 45 will be further referred to.

Figure 67:
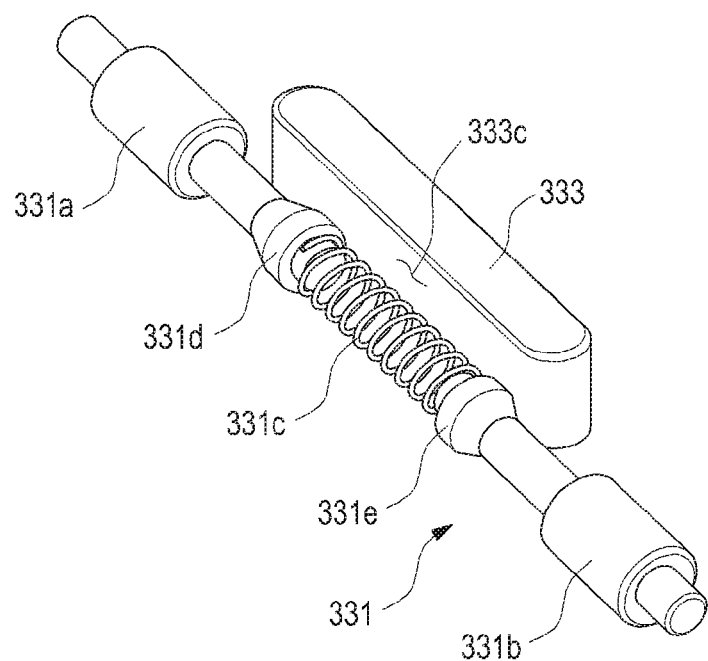
FIGS. 67 to 70 are views illustrating operations of coupling members according to various embodiments of the present disclosure.
Figure 68:
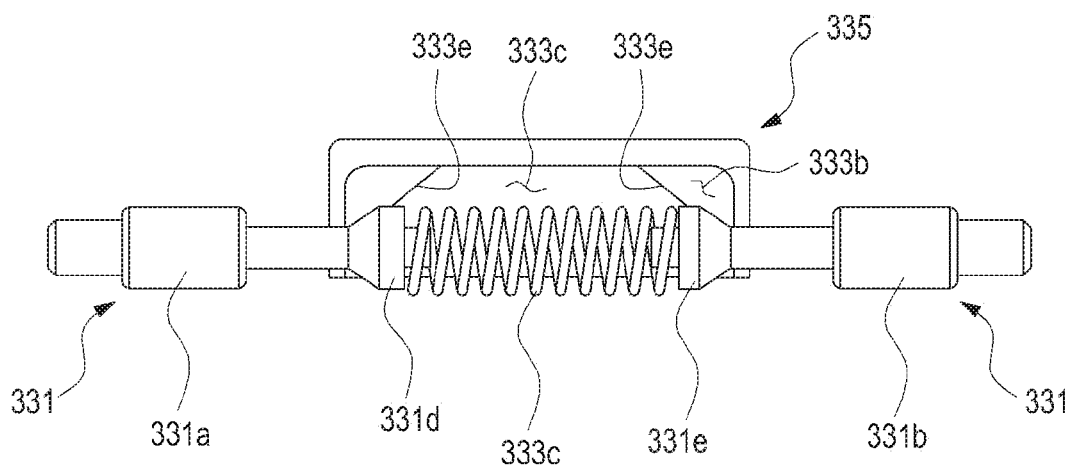

Referring to FIGS. 67 and 68, as described above, in binding the coupling member 302a to the housing 201, the opposite ends of the bar 331 are engaged in the first and second recesses 215a and 215b formed on the first and second protrusions 213a and 213b, respectively. For example, the coupling member 302a may be joined to the housing 201 as the bar 331 is bound to the first protrusion 213a and/or the second protrusion 213b in the state where the bar 331 is disposed in the first portion 321a. The first and second sub-bars 331a and 331b of the bar 331 may be engaged in the first and second recesses 215a and 215b, respectively, in the state where the first and second sub-bars 231a and 231b are distant away from each other. Referring to FIGS. 67 and 68, in the state where the first and second sub-bars 331a and 331b are positioned to be distant from each other, a first region of one face of the button 333 (e.g., the lower end region of one face of the button 333 in FIG. 67 and/or FIG. 68) may be positioned to face portions of the first and second sub-bars 331a and 331b (e.g., the first and second inclined portions 331d and 331e).

Figure 69:
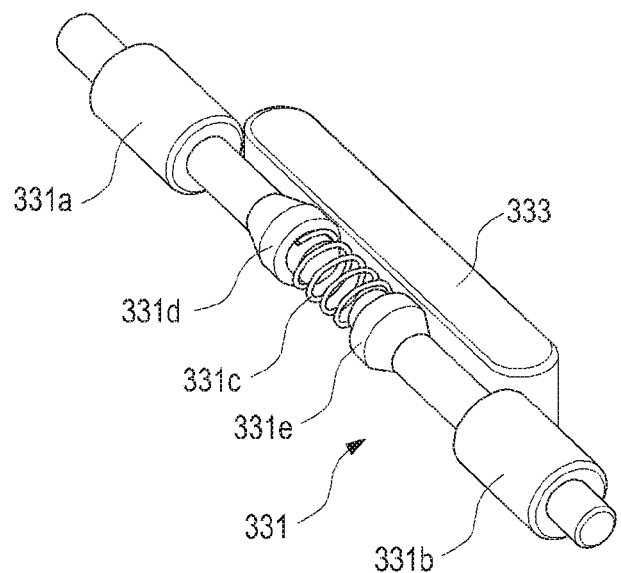
Figure 70:
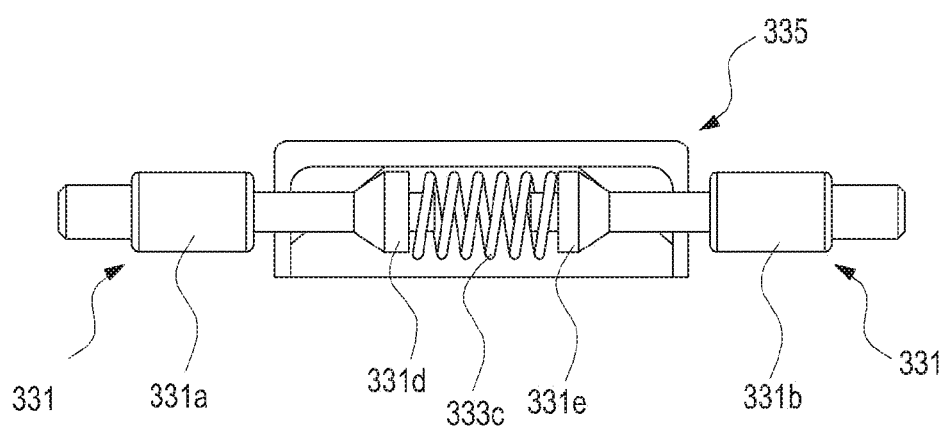

Referring to FIGS. 69 and 70, when the button 333 is pushed in the first direction D1, the first and second inclined portions 331d and 331e may interfere with the first and second inclined faces 331d and 331e, respectively, to move in the fourth direction D4 and/or the fifth direction D5 (for example, to be closer to each other). Since the first and second inclined portions 331d and 331e are provided on the first and second sub-bars 331a and 331b, the first and second sub-bars 331a and 331b may move to be closer to each other as the first and second inclined portions 331d and 331e move. For example, when the button 333 is pushed, the first and second sub-bars 331a and 331b move so that the bar 331 may be contracted. As the bar 331 is contracted, the opposite ends of the bar 331 may be released from the first and second recesses 215a and 215b, respectively, and the coupling member 302a may be separated from the housing 201. For example, the user may separate the coupling member 302a from the housing 201 in the state where the button 333 is pushed.

When there is no force to push the button 333, the elastic force of the elastic body 331c of the bar 331 may move the first and second sub-bars 331a and 331b to be spaced away from each other. As the first and second sub-bars 331a and 331b are moved to be spaced away from each other, the first and second inclined portions 331d and 331e may push the inclined faces 333d and 333e so that the button 333 may be moved in the second direction D2. When the button 333 is moved in the second direction D2, the guide protrusion 333a may interfere with another end wall of the guide recess 323c (e.g., the upper end wall of the guide recess 323c in FIG. 63) so that the moving range of the button 333 in the second direction D2 may be limited.

Hereinafter, a method of fastening/separating the coupling member 202a or 302a of the above-described embodiments to/from the housing 201 will be described.

Figure 71:
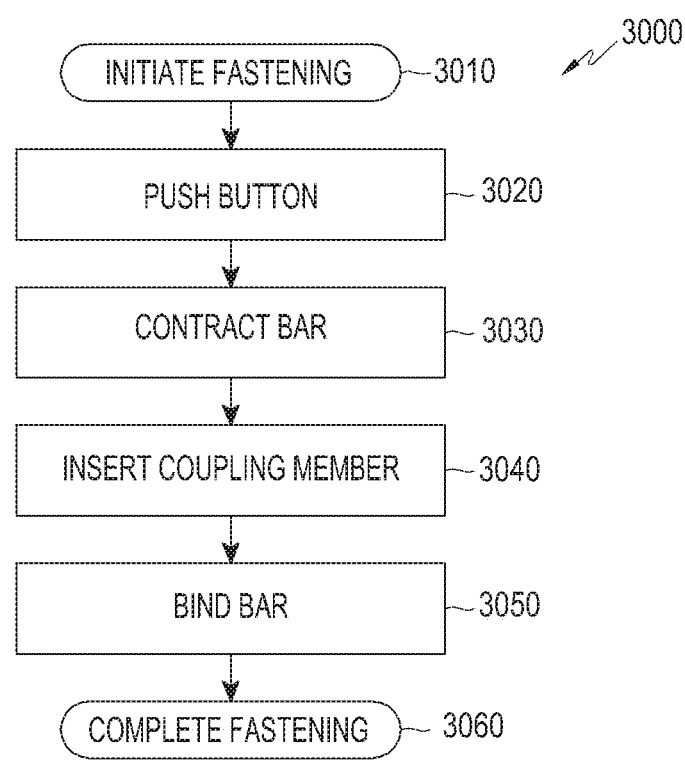
FIG. 71 is a flowchart illustrating a method of fastening a coupling member to a housing, in an electronic device according to various embodiments of the present disclosure.

FIG. 71 is a flowchart illustrating a method of fastening a coupling member to a housing in an electronic device according to various embodiments of the present disclosure.

Referring to FIG. 71, the fastening method in operation 3000 may fasten the coupling member to the housing in operation 3060 through an operation of initiating fastening in operation 3010, an operation of pushing the button in operation 3020, an operation of contracting the bar in operation 3030, an operation of inserting the coupling member in operation 3040, and an operation of binding the coupling member in operation 3050.

The operation of initiating the fastening in operation 3010 includes an operation of selecting a coupling member 202a or 302a that is desired by the user and aligning the coupling member 202a or 302a to the first and second protrusions 213a and 213b of the housing 201. For example, the coupling member 202a or 302a (e.g., the first portion 221a or 321a of the first coupling member 202a or 302a) may be aligned to be introduced into, for example, a gap between the first and second protrusions 213a and 213b. Referring to FIG. 44, the first portion 221a may be moved in the direction opposite to the third direction D3 (in the first direction D1 from the second face F2 side and/or in the second direction D2 from the first face F1 side), and may be introduced between the first and second protrusions 213a and 213b.

The operation of pushing the button 233 or 333 in operation 3020 is an operation of pushing the button 233 or 333 by the user before introducing the first portion 221a or 321a between the first and second protrusions 213a and 213b, and the operation of pushing the button 233 or 333 may be followed by an operation of contracting the bar 231 or 331. For example, when the user pushes the button 233 or 333, the first and second sub-bars 231a and 231b or 331a and 331b may be introduced into the through-hole 223a or 323a.

The operation of inserting the coupling member 202a or 302a in operation 3040 includes an operation of introducing the coupling member 202a or 302a (e.g., the first portion 231a or 321a) between the first and second protrusions 213a and 213b in the state where the bar 231 or 331 is contracted. In the state where the opposite ends of the bar 231 or 331 (e.g., the first and second sub-bars 231a and 231b or 331a and 331b) protrude from the through-hole 223a or 323a, the first portion 221a or 321a interferes with the first and second protrusions 213a and 213b so that it may be difficult for the first portion 221a or 321a to be introduced between the first and second protrusions 213a and 213b. Accordingly, the user may introduce the first portion 221a or 321a between the first and second protrusions 213a and 213b while maintaining the pushing state of the button 233 or 333. When the first portion 221a or 321a is introduced between the first and second protrusions 213a and 213b to such an extent to cause the opposite ends of the bar 231 to face the inner faces of the first and second protrusions 213a and 213b (e.g., the faces that are formed with the first and second recesses 215a and 215b, respectively), the user may not push the button 233 or 333. When the button 233 or 333 is not pushed in the state where the first portion 221a or 321a is introduced between the first and second protrusions 213a and 213b, the opposite ends of the bar 231 or 331 (e.g., the first sub-bars 231a and 231b or 331a and 331b) may rub against the inner faces of the first and second protrusions 213a and 213b.

The operation of binding the bar 231 or 331 in operation 3050 includes an operation of aligning the first and second sub-bars 231a and 231b or 331a and 331b to the first and second recesses 215a and 215b that are formed on the first and second protrusions 213a and 213b, respectively. For example, when the user adjusts the position of the first portion 221a or 321a between the first and second protrusions 213a and 213b, the first and second sub-bars 231a and 231b or 331a and 331b may be aligned to the first and second recesses 215a and 215b, respectively. When the first and second sub-bars 231a and 231b or 331a and 331b are aligned to the first and second recesses 215a and 215b, respectively, the first and second sub-bars 231a and 231b or 331a and 331b protrude from the through-hole 223a or 323a by the elastic force of the elastic body 231c or 331c to be engaged in the first and second recesses 215a and 215b, respectively.

As the opposite ends of the bar 231 or 331 (e.g., the first and second sub-bars 231a and 231b or 331a and 331b) are engaged in the first and second recesses 215a and 215b, respectively, the first portion 221a or 321a may be bound and fixed to the housing 201. Thereby, the operation of fastening the coupling member 202a or 302a to the housing 201 may be completed in operation 3060.

Figure 72:
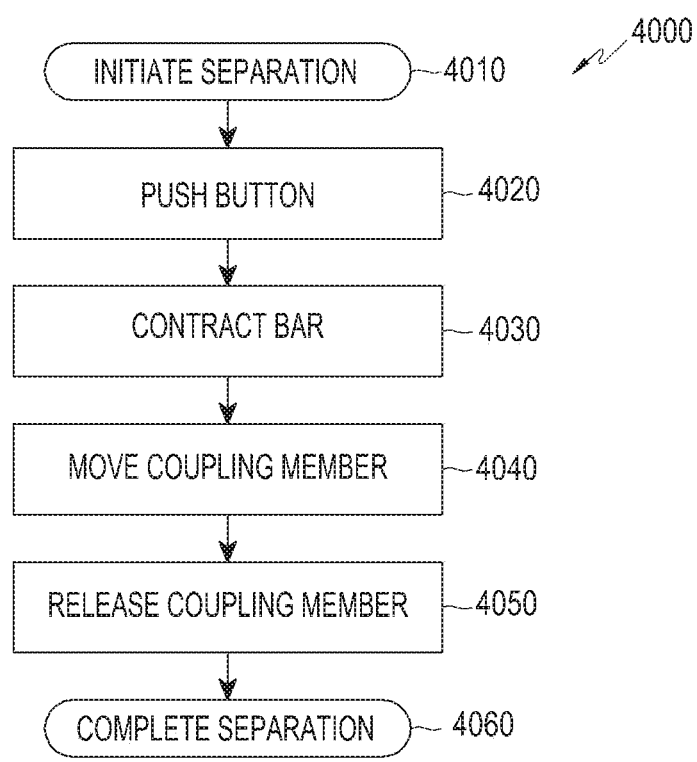
FIG. 72 is a flowchart illustrating a method of separating a coupling member from a housing, in an electronic device, according to various embodiments of the present disclosure.

FIG. 72 is a flowchart illustrating describing a method of separating a coupling member from a housing, in an electronic device, according to various embodiments of the present disclosure.

Referring to FIG. 72, the method of separating the coupling member 202a or 302a in operation 4000 may separate the coupling member 202a or 302a from the housing 201 through an operation of initiating separation in operation 4010, an operation of pushing the button in operation 4020, an operation of contracting the bar in operation 4030, an operation of moving the coupling member in operation 4040, and an operation of releasing the coupling member in operation 4050.

The operation of initiating the separation in operation 4010 includes an operation of disposing the electronic device 200 at a position where, for example, the button 233 or 333 may be easily manipulated. For example, in order to join another coupling member that is desired by the user to the housing 201, first, the electronic device 200 may be moved or rotated to a position where the coupling member 302a may be conveniently separated.

The operation of pushing the button 233 or 333 in operation 4020 includes an operation of releasing the bound state of the coupling member 202a or 302a and the housing 201. For example, the operation of contracting the bar 231 or 331 in operation 4030 may be performed according to the operation of pushing the button 233 or 333, and as the bar 231 or 331 is contracted, the opposite ends of the bar 231 or 331 (e.g., the first and second sub-bars 231a and 231b or 331a and 331b) may be released from the first and second recesses 215a and 215b to be introduced into the through-hole 223a or 322a.

The operation of moving the coupling member 202a or 302a in operation 4040 includes an operation of moving the opposite ends of the bar 231 or 331 from the position where the button 233 or 333 is aligned to the first and second recesses 215a and 215b in the state where the button 233 or 333 is pushed. For example, as the first portion 221a or 321a moves in the state where the opposite ends of the bar 231 or 331 are released from the first and second recesses 215a and 215b, the opposite ends of the bar 231 or 331 may be released from the positions of being aligned to the first and second recesses 215a and 215b.

The operation of releasing the coupling member 202a or 302a in operation 4050 includes an operation of separating the coupling member 202a or 302a (e.g., the first portion 221a or 321a) from the housing 201 between the first and second protrusions 213a and 213b. In the operation of moving the coupling member 202a or 302a in operation 4040, since the opposite ends of the bar 231 or 331 have already been released from the aligned position in relation to the first and second recesses 215a and 215b, the coupling member 202a or 302a may be released from the housing 201, and through this, the operation of separating the coupling member 202a or 302a from the housing 201 may be completed in operation 4060.

Figure 73:
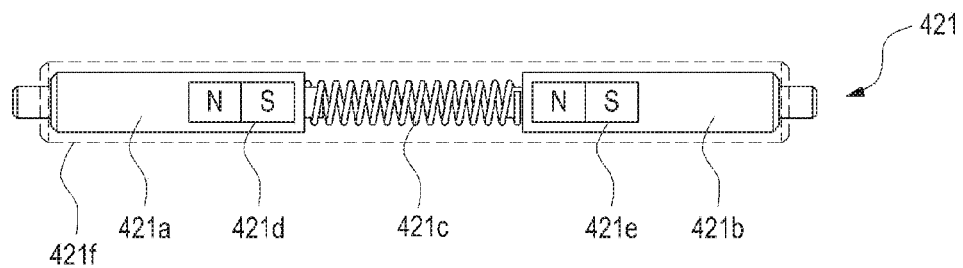
FIG. 73 is a plan view illustrating a bar of a coupling member according to various embodiments of the present disclosure.
Figure 74:
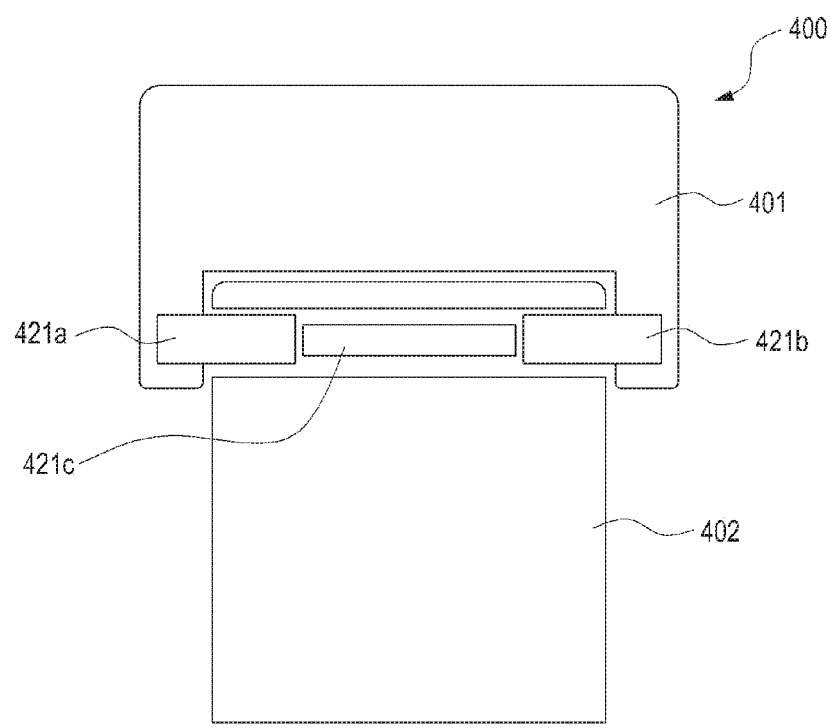
FIG. 74 is a view illustrating a configuration of an electronic device according to various embodiments of the present disclosure.

FIG. 73 is a plan view illustrating a bar of a coupling member according to various embodiments of the present disclosure. FIG. 74 is a perspective view illustrating an electronic device according to various embodiments of the present disclosure.

Referring to FIGS. 73 and 74, an electronic device 400 may be provided with a bar 421 that includes an elastic body 421c and magnetic bodies 421d and 421e so as to join the coupling member 402 to the housing 401. The coupling member 402 includes a band member or a first portion(s) 221a or 321a of the above-described embodiments.

The bar 421 includes first and second sub-bars 421a and 421b that are accommodated within a tube 421f and an elastic body 421c that provides an elastic force acting in the direction where the first and second sub bars 421a and 421b are spaced away from each other. The first and second sub-bars 421a and 421b may be provided with first and second magnetic bodies 421d and 421e, respectively. An attractive force may act between the magnetic bodies 421d and 421e. The attractive force acting between the magnetic bodies 421d and 421e may be smaller than the elastic force of the elastic body 421c. For example, the first and second sub-bars 421a and 421b may receive a force that act in the direction where the first and second sub-bars 421a and 421b are spaced away from each other.

The bar 421 enables the opposite ends thereof (e.g., the portions of the first and second sub-bars 421a and 421b) to protrude to the opposite sides of the coupling member 402 in the state where the bar 421 is disposed inside the coupling member 402. The opposite ends of the bar 421 may protrude to the opposite sides of the coupling member 402 to be bound to the housing 401. Thereby, the bar 421 may bind the coupling member 402 to the housing 401.

Figure 75:
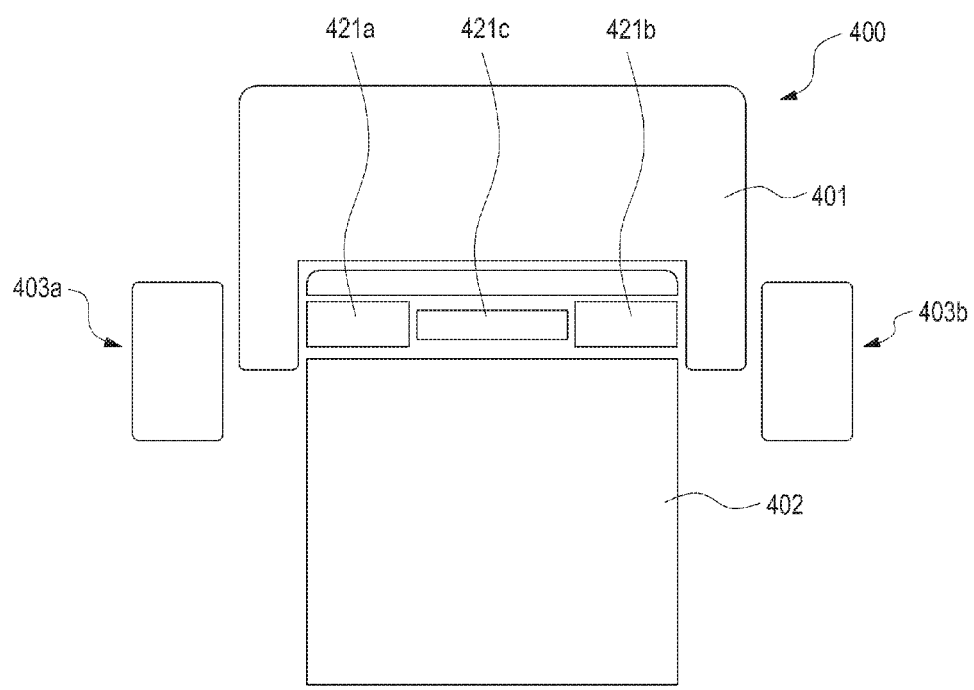
FIGS. 75 and 76 are views illustrating operations of separating a coupling member of an electronic device from a housing according to various embodiments of the present disclosure.
Figure 76:
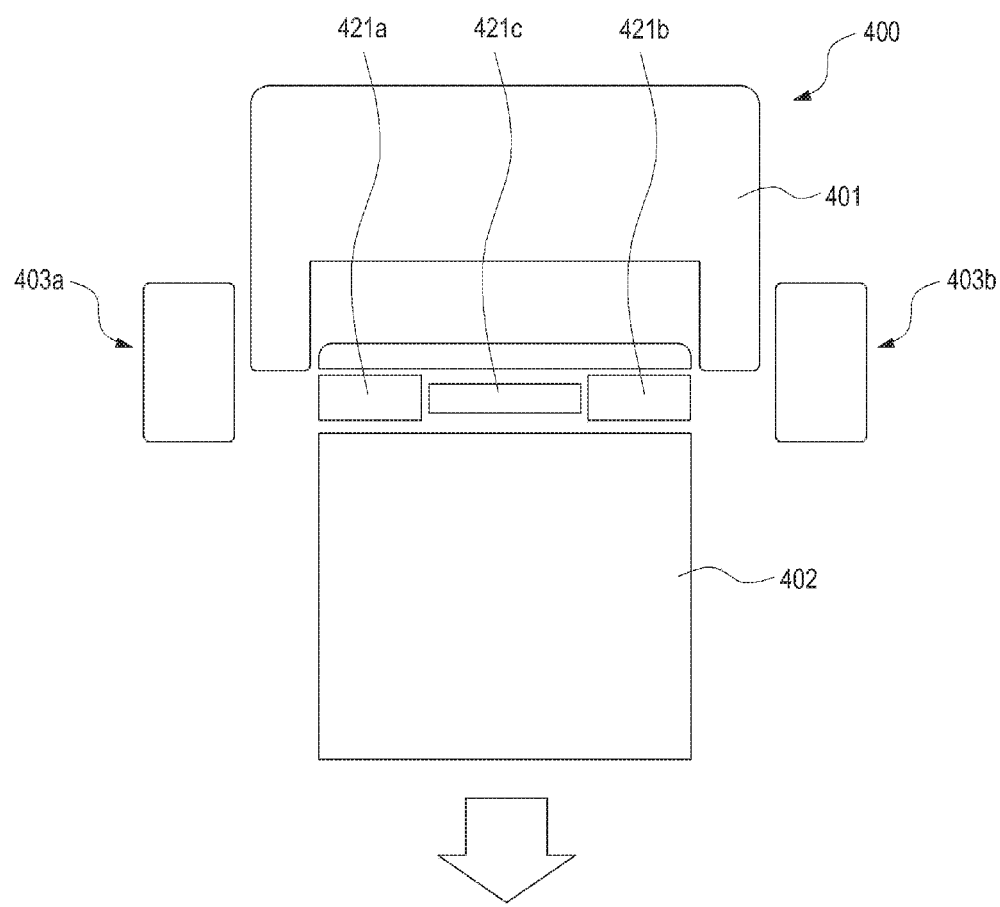

FIGS. 75 and 76 are views illustrating operations of separating a coupling member of an electronic device from a housing according to various embodiments of the present disclosure.

Referring to FIGS. 75 and 76, in the preceding embodiment(s) of the present disclosure, the bound state between the coupling member and the housing may be released by manipulating the locking member 121b or the button 233 or 333. The electronic device 400 according to the present embodiment may be disposed adjacent to jigs 403a and 403b to contract the bar 421 so that the bound state between the coupling member 402 and the housing 401 may be released. For example, the jig 403a and 403b includes a magnetic body that interacts with the magnetic bodies 421d and 421e, which are disposed on the first and second sub-bars 421a and 421b, respectively, so as to generate a repulsive force such that the first and second sub-bars 421a and 421b may be moved to get closer to each other. For example, the repulsive force generated between the magnetic bodies 421d and 421e disposed on the first and second sub-bars 421a and 421b and the jigs 403a and 403b may be larger than the elastic force of the elastic body 421c.

When the bound portion between the coupling member 402 and the housing 401 is disposed on the jig 403a or 403b, the bar 421 is contracted such that the opposite ends of the bar 421 may be introduced into the coupling member 402. For example, by being disposed on the jig 403a and 403b, the bound state between the bar 421 and the housing 401 is released and the coupling member 402 may be separated from the housing 401.

Figure 77:
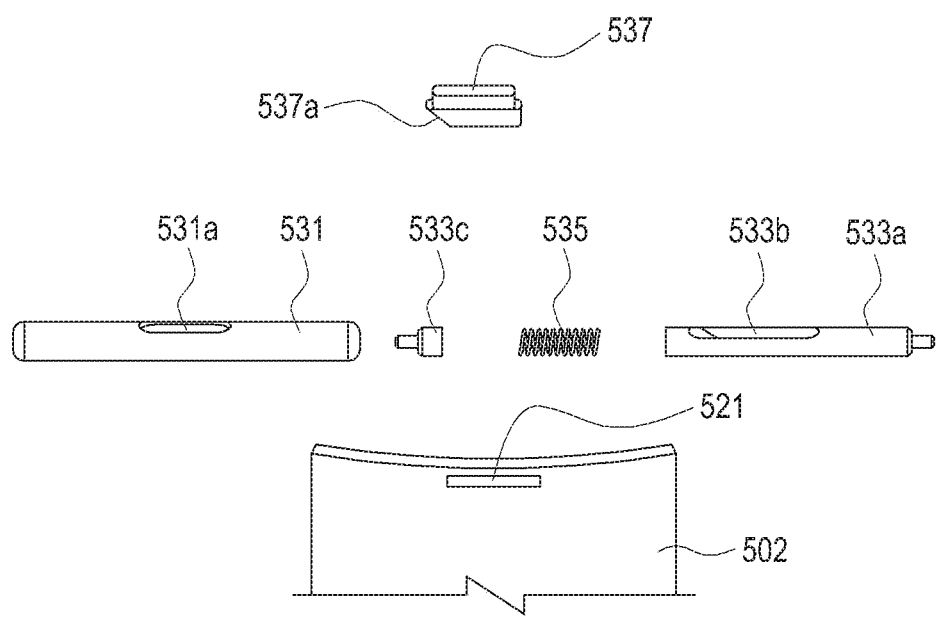
FIG. 77 is an exploded perspective view illustrating a coupling member according to various embodiments of the present disclosure.
Figure 78:
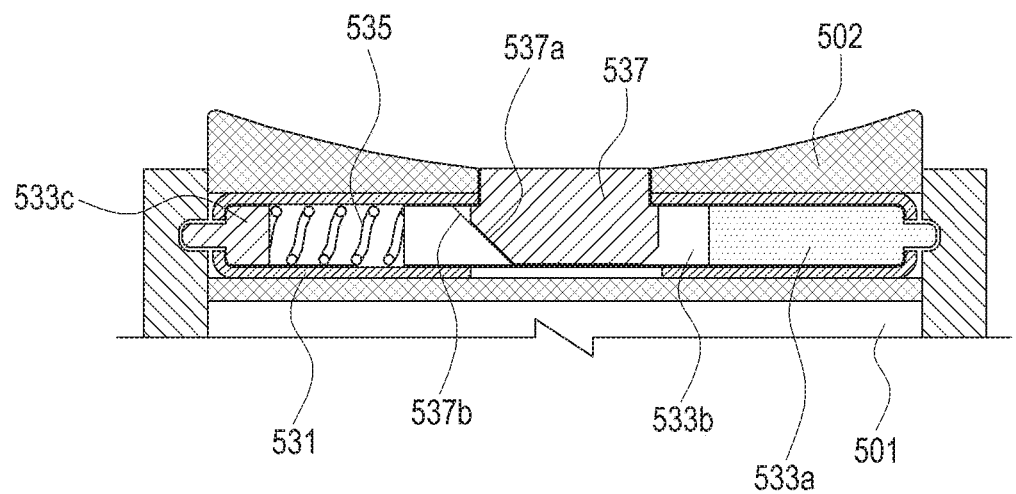
FIGS. 78 and 79 are views for describing an operation of a coupling member according to various embodiments of the present disclosure.
Figure 79:
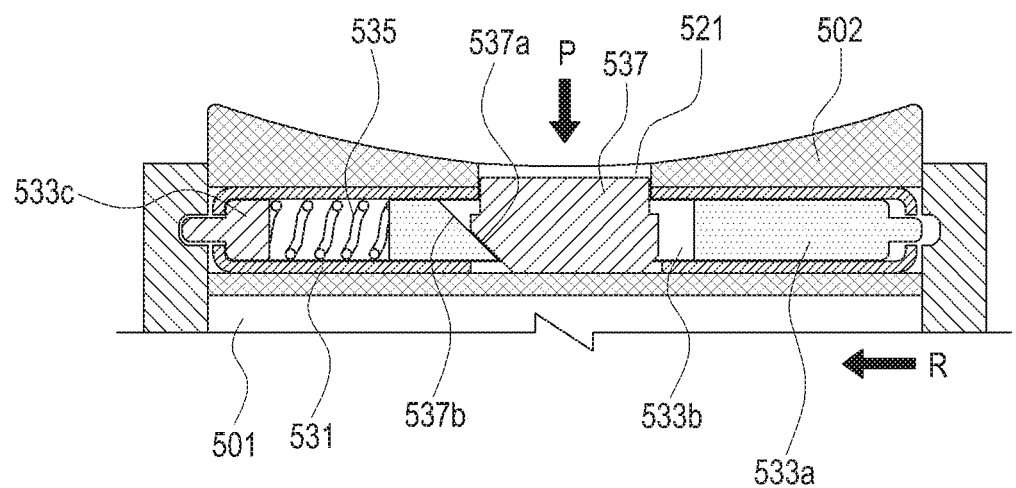

FIG. 77 is an exploded perspective view illustrating a coupling member according to various embodiments of the present disclosure, FIGS. 78 and 79 are views for describing an operation of a coupling member according to various embodiments of the present disclosure.

Referring to FIGS. 77 to 79, a coupling member 502, which may include a sub bar(s) (e.g., a first sub bar 533a) that is reciprocated as a button 537, is operated. For example, in a state where the coupling member 502 is coupled to a housing 501 of an electronic device, the first sub bar 533a is coupled to the housing 501 so as to maintain the coupling member 502 in the state where the coupling member 502 is coupled to the housing 501, and when the user operates the button 537, the first sub bar 533a may rectilinearly move on the coupling member 502 to be separated from the housing 501. For example, as the button 537 is operated, the first sub bar 533a may release the state where the coupling member 502 is coupled to the housing 501.

The coupling member 502 may include a bar housing 531 that accommodates the first sub bar 533a, a second sub bar 533c at least partially accommodated in the bar housing 531, and an elastic body 535. The bar housing 531 has a tube shape, and may accommodate the first sub bar 533a to be able to reciprocate therein. In one embodiment of the present disclosure, one end of the first sub bar 533a may protrude to one end of the bar housing 531. The second sub bar 533c may be fixed to the bar housing 531 in the state of being partially protruded to the other end of the bar housing 531. In a certain embodiment of the present disclosure, the second sub bar 533c may be partially accommodated in the bar housing 531, and may reciprocate within the bar housing 531.

The elastic body 535 is disposed between the first sub bar 533a and the second sub bar 533c so as to provide an elastic force to each of the first sub bar 533a and the second sub bar 533c. For example, by receiving the elastic force of the elastic body 535, the first sub bar 533a may remain in the state of protruding the end thereof to the one end of the bar housing 531, and the second sub bar 533c may remain in the state of protruding the end thereof to the other end of the bar housing 531. According to various embodiments of the present disclosure, the bar housing 531 may have a shape that allows the ends of the first sub bar 533a and the second sub bar 533c to protrude to the outside while maintaining the state where the remaining portions of the first sub bar 533a and the second sub bar 533c are accommodated therein.

The coupling member 502 may include a guide hole 531a formed in the bar housing 531 to accommodate a portion of the button 537 and a slot 521 correspondingly aligned with the guide hole 531a when the bar housing 531 is disposed within the coupling member 502. For example, the button 537 may be exposed to the outside of the coupling member 502 through the slot 521 in the state of being accommodated in the guide hole 531a. The first sub bar 533a may have a sufficient length to be arranged past the guide hole 531a from the one end of the housing 501, and may include a driving hole 533b corresponding to the guide hole 531a. For example, a portion of the button 537 may be positioned inside the driving hole 533b within the bar housing 531.

According to various embodiments of the present disclosure, a driving inclined face 537a may be formed on the button 537, and a driven inclined face 537b corresponding to the driving inclined face 537a may be formed in a portion of the inside of the driving hole 533b. For example, when the button 537 is accommodated in the driving hole 533b, the driving inclined face 537a may be disposed to come in contact with the driven inclined face 537b.

Referring to FIG. 78, in a state where no external force is applied to the button 537, the first sub bar 533a may receive the elastic force of the elastic body 535 to maintain the end thereof in the state of being protruded to the one end of the bar housing 531. In the state where the coupling member 502 is coupled to the housing 501, one end of the first sub bar 533a may be protruded to the one end of the bar housing 531 to be coupled to the housing 501. The first sub bar 533a receives the elastic force of the elastic body 535, thereby tending to advance in one direction (e.g., the right side direction in FIG. 78), and the driven inclined face 537b may tend to push the driving inclined face 537a to move the button 537 upwards. For example, when no external force acts, one end of the first sub bar 533a is maintained in the state of being protruded to the one end of the bar housing 531 by the elastic force of the elastic body 535, and the button 537 may be maintained in the state in which the outer end thereof is positioned to form substantially the same flat face (or a curved face) as the outer face of the coupling member 502. In a certain embodiment of the present disclosure, the outer end of the button 537 may protrude from the outer face of the coupling member 502. The second sub bar 533c is in the state of being fixed to the bar housing 531 or receiving the elastic force of the elastic body 535 as the end of the second sub bar 533c is protruded to the other end of the bar housing 531 to be coupled to the housing 501. For example, when the coupling member 502 is in the state of being coupled to the housing 501, the second sub bar 533c may maintain the state of being coupled to the housing 501.

Referring to FIG. 79, when the button 537 is pushed by an external force (e.g., the user's operation), the button 537 may be further introduced into the inside of the driving hole 533b such that the driving inclined face 537a may push the driven inclined face 537b. Depending on the inclined direction of the driving inclined face 537a and the driven inclined face 537b, the downward movement P of the button 537 may make the second sub bar 533c Retreat®. For example, when the button 537 is pushed, the second sub bar 533c may retreat such that its end is introduced into the bar housing 531. When the end of the second sub bar 533c is introduced into the bar housing 531, the coupled state with the housing 501 at one side of the coupling member 502 (e.g., the right side in FIG. 79) may be released and the coupling member 502 may be separated from the housing 501. When a force to push the button 537 does not exist, the first sub bar 533a may cause its end to protrude to the one end of the bar housing 531 again by the elastic force of the elastic body 535. When the first sub bar 533a moves in the direction where the end is protruded to the one end of the bar housing 531, the driven inclined face 537b may push the driving inclined face 537a to cause the button 537 to move upwards.

After coupling the second sub bar 533c to the housing, the user may push the button 537 so as to align the end of the first sub bar 533a to the coupled position (or a position close thereto) in the state of being accommodated in the bar housing 531. Alternatively, the user may push the button 537 so as to align the coupling member 502 or the first sub bar 533a to the coupled position (or a position close thereto) while causing the second sub bar 533c to be coupled to the housing 501 (after having caused the second sub bar 533c to be coupled to the housing) in the state where the end of the first sub bar 533a is accommodated in the bar housing 531.

When the force to push the button 537 is removed in the state where the coupling member 502 is properly aligned, the first sub bar 533a may be coupled to the housing 501 such that the coupling member 502 may be coupled to the housing 501. When the user wishes to separate the coupling member 502 coupled to the housing 501, the user may push the button 537 such that the first sub bar 533a may be separated from the housing 501. When the first sub bar 533a is separated from the housing 501, the coupling member 502 may be separated from the housing 501 from the position where the first sub bar 533a is coupled.

Figure 80:
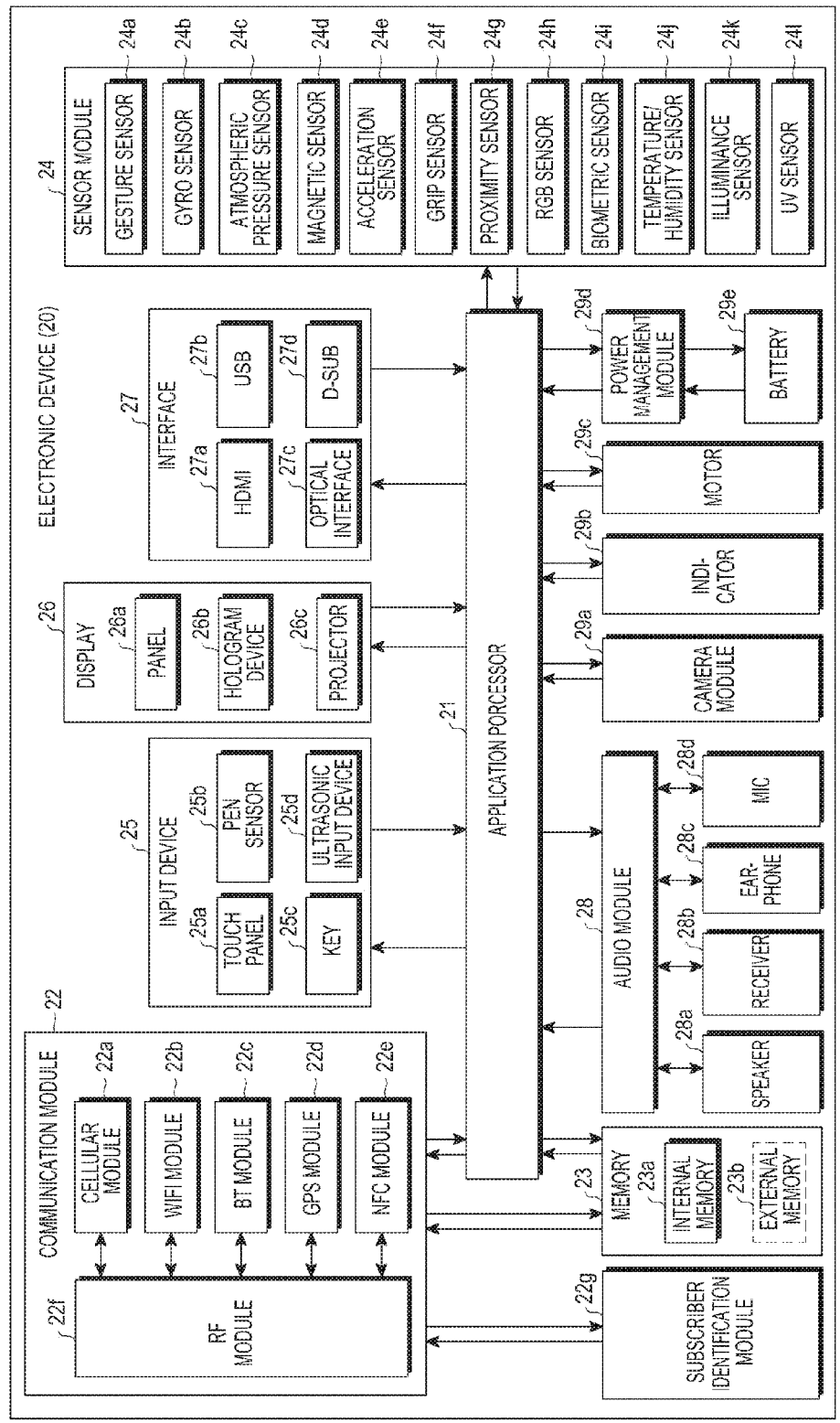
FIG. 80 is a block diagram illustrating an electronic device according to various embodiments of the present disclosure.

FIG. 80 is a block diagram illustrating an electronic device according to various embodiments of the present disclosure.

Referring to FIG. 80, an electronic device 20 includes, for example, the whole or a portion of the above-described electronic device 100, 200 or 400. The electronic device 20 includes at least one AP 21, a communication module 22, a subscriber identification module (SIM) 22g, a memory 23, a sensor module 24, an input device 25, a display 26, an interface 27, an audio module 28, a camera module 29a, a power management module 29d, a battery 29e, an indicator 29b, and a motor 29c. The above-described electric components 107 includes at least one of a SIM 22g, a memory 23, a sensor module 24, an input device 25, a display 26, an interface 27, an audio module 28, a camera module 29a, an indicator 29b, and a motor 29c.

The AP 21 may drive, for example, an operating system or an application program so as to control a plurality of hardware or software components connected thereto, and may also perform various data processing and arithmetic operations. The AP 21 may be implemented by, for example, a system-on-chip (SoC). According to an embodiment of the present disclosure, the AP 21 includes a graphic processing unit (GPU) and/or an image signal processor (ISP). The AP 21 includes at least some components (e.g., a cellular module 22a) among the components illustrated in FIG. 80. The AP 21 may load a command or data received from at least one of the other components (e.g., a non-volatile memory) in a volatile memory to process the command and data, and may store various data in a non-volatile memory.

The communication module 22 includes, for example, a cellular module 22a, a WiFi module 22b, a Bluetooth module 22c, a global navigation satellite system (GNSS) module 22d (e.g., global positioning system (GPS) module, global navigation satellite system (Glonass) module, Beidou module, or Galileo module), a near field communication (NFC) module 22e, and a radio frequency (RF) module 22f.

The cellular module 22a may provide, for example, a voice call, a video call, a message service, or an internet service through, for example, a communication network. According to an embodiment of the present disclosure, the cellular module 22a may perform discrimination and authentication of the electronic device 20 within the communication network by using the SIM (e.g., a SIM card) 22g. According to an embodiment of the present disclosure, the cellular module 22a may perform at least some of the functions that may be provided by the AP 21. According to an embodiment of the present disclosure, the cellular module 22a includes a communication processor (CP).

Each of the WiFi module 22b, the Bluetooth module 22c, the GNSS module 22d, and the NFC module 22e includes, for example, a processor to process data transmitted/received through a corresponding module. According to a certain embodiment of the present disclosure, at least some (e.g., two or more) of the cellular module 22a, the WiFi module 22b, the Bluetooth module 22c, the GNSS module 22d, and the NFC module 22e may be incorporated in a single integrated chip (IC) or an IC package.

The RF module 22f may transmit/receive, for example, a communication signal (e.g., an RF signal). The RF module 22f includes, for example, a transceiver, a power amp module (PAM), a frequency filter, a low noise amplifier (LNA), or an antenna. According to an embodiment of the present disclosure, at least one of the cellular module 22a, the WiFi module 22b, the Bluetooth module 22c, the GPS module 22d, and the NFC module 22e may transmit/receive an RF signal through one or more separate RF modules.

The SIM 22g includes, for example, a card that includes a SIM and/or an embedded SIM, and may also include intrinsic identification information (e.g., integrated circuit card identifier (ICCID)) or subscriber information (e.g., international mobile subscriber identity (IMSI)).

The memory 23 includes, for example, an internal memory 23a or an external memory 23b. The internal memory 23a includes at least one of, for example, a volatile memory (e.g., dynamic random access memory (DRAM), static RAM (SRAM), or synchronous DRAM (SDRAM)), a non-volatile memory (e.g., one time programmable read-only memory (OTPROM), PROM, erasable and programmable ROM (EPROM), electrically EPROM (EEPROM), mask ROM, flash ROM, flash memory (e.g., NAND flash memory, or NOR flash memory), hard drive, or solid state drive (SSD)).

The external memory 23b includes a flash drive (e.g., compact flash (CF), secure digital (SD), micro SD (Micro-SD), mini SD (Mini-SD), extreme digital (xD), multi-media card (MMC), or memory stick). The external memory 23b may be functionally and/or physically connected to the electronic device 20 through various interfaces.

For example, the sensor module 24 may measure a physical quantity or may detect an operating status of the electronic device 20, and may then convert the measured or detected information into electric signals. The sensor module 24 includes at least one of, for example, a gesture sensor 24a, a gyro sensor 24b, an atmospheric pressure sensor 24c, a magnetic sensor 24d, an acceleration sensor 24e, a grip sensor 24f, a proximity sensor 24g, a color sensor 24h (e.g., red, green, blue (RGB) sensor), a biometric sensor 24i, a temperature/humidity sensor 24j, an illuminance sensor 24k, and a ultra-violet (UV) sensor 24l. Additionally or alternatively, the sensor module 24 includes, for example, an E-nose sensor, an electromyography (EMG) sensor (not illustrated), an electroencephalogram (EEG) sensor, an electrocardiogram (ECG) sensor, an infra-red (IR) sensor, an iris sensor, and/or a fingerprint sensor. The sensor module 24 includes a control circuit for controlling one or more sensors incorporated therein. In a certain embodiment of the present disclosure, the electronic device 20 includes a processor configured to control the sensor module 24 as a part of the AP 21 or separate from the AP 21 so as to control the sensor module 24 while the AP 21 is in the sleep state.

The input device 25 includes, for example, a touch panel 25a, a (digital) pen sensor 25b, a key 25c, or an ultrasonic input device 25d. As the touch panel 25a, at least one of, for example, a capacitive type touch panel, a resistive type touch panel, an IR type touch panel, and an ultrasonic type panel may be used. In addition, the touch panel 25a includes a control circuit. The touch panel 25a includes a tactile layer so as to provide a tactile reaction to a user.

The (digital) pen sensor 25b may be, for example, a portion of the touch panel or includes a separate recognition sheet. The key 25c includes, for example, a physical button, an optical key, or a keypad. The ultrasonic input device 25d may detect, through a microphone (e.g., a microphone 28d), ultrasonic waves that are generated by an input tool so as to confirm data corresponding to the detected ultrasonic waves.

The display 26 includes a panel 26a, a hologram device 26b, or a projector 26c. The panel 26a may be implemented to be flexible, transparent, or wearable. The panel 26a may be configured as a single module with the touch panel 25a. The hologram device 26b may show a stereoscopic image in the air using interference of light. The projector 26c may project light onto a screen so as to display an image. The screen may be located, for example, inside or outside the electronic device 20. According to an embodiment of the present disclosure, the display 26 includes a control circuit to control the panel 26a, the hologram device 26b, or the projector 26c.

The interface 27 includes, for example, a high-definition multimedia interface (HDMI) 27a, a universal serial bus (USB) 27b, an optical interface 27c, or a d-subminiature (D-sub) 27d. Additionally or alternatively, the interface 27 includes, for example, a Mobile High-definition Link (MHL) interface, a SD card/MMC interface, or an infrared data association (IrDA) standard interface.

The audio module 28 may bi-directionally convert, for example, sound and electric signals. The audio module 28 may process sound information input or output through, for example, a speaker 28a, a receiver 28b, an earphone 28c, or a microphone 28d.

The camera module 29a is a device that is capable of photographing, for example, a still image and a moving image. According to an embodiment of the present disclosure, the camera module 29a includes one or more image sensors (e.g., a front sensor or a rear sensor), a lens, an ISP, or a flash (e.g., light-emitting diode (LED) or xenon lamp).

The power management module 29d may manage, for example, the electric power of the electronic device 20. According to an embodiment of the present disclosure, the power management module 29d includes a power management integrated circuit (PMIC), a charger integrated circuit (IC), or a battery or fuel gauge. The PMIC may be configured in a wired and/or wireless charge type. The wireless charge type includes, for example, a magnetic resonance type, a magnetic induction type, or an electromagnetic wave type, and includes an additional circuit for wireless charging (e.g., a coil loop, a resonance circuit, or a rectifier). The battery gauge may measure the residual capacity of the battery 29e, and a voltage, a current, or a temperature during the charge. The battery 29e includes, for example, a rechargeable battery and/or a solar battery.

The indicator 29b may indicate a specific status of the electronic device 20 or of a part thereof (e.g., the AP 21), such as a booting status, a message status, or a charged status. The motor 29c may convert an electric signal into a mechanical vibration, and may generate, for example, a vibration or a haptic effect. Although not illustrated, the electronic device 20 includes a processor (e.g., a GPU) to support a mobile TV. The processor to support a mobile TV may process media data according to the standards of, for example, digital multimedia broadcasting (DMB), digital video broadcasting (DVB), or MediaFlo™.

As described above, an electronic device according to various embodiments of the present disclosure is a wearable electronic device that includes a housing that includes a first face that faces in a first direction, a second face that faces a second direction that is opposite to the first direction, and a side face that at least partially encloses a space between the first face and the second face, a display that is exposed through the first face of the housing, and a coupling member that is mounted to be attachable to/detachable from a portion that faces in a third direction in the side face of the housing, and is configured to detachably couple the electronic device to a user's body portion.

A portion of the housing includes a first recess that is formed on a portion of the side face of the housing in a fourth direction that is opposite to the third direction, a first protrusion that protrudes in the third direction from another portion of the side face of the housing, and a second recess that extends on at least a portion of the first protrusion to face in the first direction.

The coupling member includes a first portion that is configured to be in contact with the user's body portion when the electronic device is coupled to the user's body portion, a second portion that is arranged to be movable in the third direction between the first portion and the portion of the housing when the coupling member is mounted on the portion of the housing and includes a second protrusion that protrudes in the fourth direction, and a third portion that is disposed between the second portion and the portion of the housing and includes at least one opening.

When the coupling member is mounted on the portion of the housing, the second protrusion may protrude to the outside of the third portion through the opening to be at least partially accommodated within the first recess, and the third portion may be at least partially accommodated within the second recess.

According to various embodiments of the present disclosure, as the second portion moves in the third direction, the second protrusion moves in the third direction to be released from the first recess.

According to various embodiments of the present disclosure, in a state where the second protrusion is spaced apart from the first recess, the third portion moves in the second direction such that the coupling member may be separated from the portion of the housing.

According to various embodiments of the present disclosure, the coupling member includes a fourth portion that is disposed between the first portion and the second portion, and includes a third recess formed in the second direction to accommodate the second portion.

According to various embodiments of the present disclosure, the coupling member includes a joint member configured to join the third portion and the fourth portion to the first portion.

According to various embodiments of the present disclosure, the electronic device includes another coupling member that is mounted to be attachable to/detachable from a portion that faces in a fourth direction in the side face of the housing, and is configured to detachably couple the electronic device to the user's body portion.

According to various embodiments of the present disclosure, the first protrusion of the portion of the housing includes a portion (hereinafter, a "first portion of the protrusion") that extends in a fifth direction that is perpendicular to the first, second, third, and fourth directions while enclosing a portion of the second recess in the second face side, and a portion that extends in the second direction from the first portion of the first protrusion to enclose another portion of the second recess.

According to various embodiments of the present disclosure, the second recess includes a portion recessed to face the first direction on at least a portion of the first protrusion.

According to various embodiments of the present disclosure, the first protrusion may be integrally formed on the housing.

According to various embodiments of the present disclosure, the first protrusion may form a portion of the first face, the second face, and/or the side face of the housing.

According to various embodiments of the present disclosure, the face of the first protrusion, which faces in the third direction, may have a shape that is the same as a face of the coupling member, which faces a portion of the side face of the housing.

A wearable electronic device according to various embodiments includes a housing that includes a first face that faces in a first direction, a second face that faces in a second direction that is opposite to the first direction, and a side face that at least partially encloses a space between the first face and the second face, a display that is exposed through the first face of the housing, and a coupling member that is mounted to be attachable to/detachable from a portion that faces in a third direction in the side face of the housing, and is configured to detachably couple the electronic device to a user's body portion.

A portion of the housing includes a first protrusion and a second protrusion that protrude in the third direction, a first recess that is formed on the first protrusion in a fourth direction that is perpendicular to the third direction, and a second recess that is formed on the second protrusion in a fifth direction that is opposite to the fourth direction.

The coupling member includes a first portion that is configured to be in contact with the user's body portion when the electronic device is coupled to the user's body portion, a through-hole that is formed through the first portion in the fourth direction or the fifth direction, a recess that is formed to extend from the one face of the first portion in the first direction to be connected to the through-hole, a bar that is disposed inside the through-hole, and configured to have elasticity in the fourth direction and/or the fifth direction, and a button that is at least partially disposed inside the recess, and is arranged to be pushed in the first direction.

When the coupling member is mounted on the portion of the housing, the first portion is at least partially disposed between the first protrusion and the second protrusion, and the opposite ends of the bar may be accommodated in the first and second recesses, respectively.

According to various embodiments of the present disclosure, as the button is pushed in the first direction, the opposite ends of the bar may move in the fourth direction and the fifth direction, respectively, such that the bar may be contracted.

According to various embodiments of the present disclosure, the bar includes a first sub-bar that extends in the fourth direction, and a second sub-bar that extends in the fifth direction, and an elastic body that is disposed between the first sub-bar and the second sub-bar.

According to various embodiments of the present disclosure, the bar includes a first pin that protrudes in the second direction from the first sub-bar, and a second pin that protrudes in the second direction from the second portion.

According to various embodiments of the present disclosure, the button includes first and second recesses, each of which extends in the second direction from one face of the button, which faces in the first direction, and is at least partially inclined.

The first pin may be accommodated within the first recess and the second pin is accommodated within the second recess.

According to various embodiments of the present disclosure, as the button is pushed in the first direction, the first pin moves along an inclined region of the first recess and the second pin moves along an inclined region of the second recess.

A wearable electronic device according to various embodiments includes a housing that includes a first face that faces in a first direction, a second face that faces in a second direction that is opposite to the first direction, and a side face that at least partially encloses a space between the first face and the second face, a display that is exposed through the first face of the housing, and a coupling member that is mounted to be attachable to/detachable from a portion that faces in a third direction in the side face of the housing, and is configured to detachably couple the electronic device to a user's body portion.

The coupling member includes a button that releases the coupling member from the portion of the housing by a movement in the third direction.

A coupling member according to various embodiments of the present disclosure is a coupling member that is attachable to/detachable from a housing of an electronic device, and makes the housing wearable on a user's body. The coupling member includes a band member that is configured to come in contact with the user's body portion, a slide member that is mounted on the band member, and is bound to a portion of the housing in the state where the coupling member is mounted on the housing, an opening that is formed in the slide member, a locking member that is disposed on the band member, and is disposed to be reciprocated between the slide member and the band member in a state where the coupling member is mounted on the housing, and a locking protrusion that is formed on a locking member.

The locking protrusion may appear to the outside of the slide member through the opening according to the reciprocating of the locking member, and the coupling member may be bound to the housing.

According to various embodiments of the present disclosure, the coupling member described above includes at least one elastic member that is provided between the band member and the locking member. The elastic member may provide an elastic force in the direction that causes the locking protrusion to protrude to the outside of the slide member.

According to various embodiments of the present disclosure, the locking member includes a manipulation unit that is positioned on an inner face of the band member, a support portion that extends from the manipulation unit and between the band member and the slide member, and guide portions that extend from opposite side ends of the manipulation unit to be in parallel to the support portion, and the locking protrusion is formed on an end of the support portion.

According to various embodiments of the present disclosure, the coupling member includes guide protrusions that extend from the ends of the guide portions to get closer to each other, and guide recesses that are formed on opposite side edges of the slide member, respectively. The guide protrusions may be accommodated in the guide recesses, respectively, so as to guide the reciprocation of the locking member.

According to various embodiments of the present disclosure, the guide protrusions may be disposed to be deviated from the locking protrusion in a thickness direction that faces an outer face from an inner face of the band member.

According to various embodiments of the present disclosure, the coupling member as described above includes an accommodation recess that is formed on the inner face of the band member, and at least a portion of the manipulation unit may be accommodated in the accommodation recess.

According to various embodiments of the present disclosure, the coupling member includes a mounting member that is mounted on one end of the band member, and an operation recess that is formed on one face of the mounting member. As the locking member is reciprocated, the support portion may be reciprocated within the operation recess.

According to various embodiments of the present disclosure, the housing of the electronic device includes a mounting recess that is formed on the side face to receive the slide member, a protrusion that is formed on a portion of a periphery of the mounting recess, a binding recess that is formed on the protrusion and is formed to partially face the front side of the housing, and a locking recess that is formed on the bottom surface of the mounting recess.

In the state where the coupling member is mounted on the housing, at least opposite ends of the slide members are engaged in the binding recess and the locking protrusion is engaged in the locking recess.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wearable electronic device comprising:
a housing that includes a first face that faces in a first direction, a second face that faces in a second direction that is opposite to the first direction, and a side face that at least partially encloses a space between the first face and the second face;
a display that is exposed through the first face of the housing; and
a coupling member that is mounted to be attachable to/detachable from a portion that faces in a third direction in the side face of the housing, and is configured to detachably couple the electronic device to a user's body portion,
wherein a portion of the housing includes:
a first recess that is formed on a portion of the side face of the housing in a fourth direction that is opposite to the third direction;
a first protrusion that protrudes in the third direction from another portion of the side face of the housing; and
a second recess that extends on at least a portion of the first protrusion to face in the first direction,
wherein the coupling member includes:
a first portion that is configured to be in contact with the user's body portion when the electronic device is coupled to the user's body portion;
a second portion that is arranged to be movable in the third direction between the first portion and the portion of the housing when the coupling member is mounted on the portion of the housing, and includes a second protrusion that protrudes in the fourth direction; and
a third portion that is disposed between the second portion and the portion of the housing and includes at least one opening, and
wherein, when the coupling member is mounted on the portion of the housing, the second protrusion protrudes to the outside of the third portion through the opening to be at least partially accommodated in the first recess, and the third portion is at least partially accommodated in the second recess.

2. The electronic device of claim 1, wherein, as the second portion moves in the third direction, the second protrusion moves in the third direction to be released from the first recess.

3. The electronic device of claim 2, wherein, in a state where the second protrusion is spaced apart from the first recess, the third portion moves in the second direction such that the coupling member is separated from the portion of the housing.

4. The electronic device of claim 1, wherein the coupling member includes:
a fourth portion that is disposed between the first portion and the second portion, and includes a third recess formed in the second direction to accommodate the second portion.

5. The electronic device of claim 1, wherein the coupling member further includes:
a joint member configured to join the third portion and the fourth portion to the first portion.

6. The electronic device of claim 1, further comprising: another coupling member that is mounted to be attachable to/detachable from a portion that faces in the fourth direction in the side face of the housing, and is configured to detachably couple the electronic device to the user's body portion.

7. The electronic device of claim 1, wherein the first protrusion of the portion of the housing includes:
a first portion of the protrusion that extends in a fifth direction that is perpendicular to the first, second, third, and fourth directions while enclosing a portion of the second recess in the second face side, and
another portion that extends in the second direction from the first portion of the first protrusion to enclose another portion of the second recess.

8. The electronic device of claim 7, wherein the second recess includes a portion recessed to face the first direction on at least a portion of the first protrusion.

9. The electronic device of claim 1, wherein the first protrusion is integrally formed on the housing.

10. The electronic device of claim 1, wherein the first protrusion forms a surface that is flush with the first face, the second face and/or the side face of the portion of the housing.

11. The electronic device of claim 1, wherein the face of the first protrusion, which faces in the third direction, has a shape that is the same as a face of the coupling member, which faces a portion of the side face of the housing.

12. A wearable electronic device comprising:
a housing that includes a first face that faces in a first direction, a second face that faces in a second direction that is opposite to the first direction, and a side face that at least partially encloses a space between the first face and the second face;
a display that is exposed through the first face of the housing; and
a coupling member that is mounted to be attachable to/detachable from a portion that faces in a third direction in the side face of the housing, and is configured to detachably couple the electronic device to a user's body portion,
wherein a portion of the housing includes:
a first protrusion and a second protrusion that protrude in the third direction;
a first recess that is formed on the first protrusion in a fourth direction that is perpendicular to the third direction; and
a second recess that is formed on the second protrusion in a fifth direction that is opposite to the fourth direction,
wherein the coupling member includes:
a first portion that is configured to be in contact with the user's body portion when the electronic device is coupled to the user's body portion;
a through-hole that is formed through the first portion in the fourth direction or the fifth direction;
a recess that is formed to extend from the one face of the first portion in the first direction to be connected to the through-hole;
a bar that is disposed inside the through-hole, and configured to have elasticity in the fourth direction and/or the fifth direction; and
a button that is at least partially disposed inside the recess, and is arranged to be pushed in the first direction, and
wherein, when the coupling member is mounted on the portion of the housing, the first portion is at least partially disposed between the first protrusion and the second protrusion, and the opposite ends of the bar are accommodated in the first and second recesses, respectively.

13. The electronic device of claim 12, wherein, as the button is pushed in the first direction, the opposite ends of the bar move in the fourth direction and the fifth direction, respectively, so that the bar is contracted.

14. The electronic device of claim 12, wherein the bar includes:
a first sub-bar that extends in the fourth direction,
a second sub-bar that extends in the fifth direction, and
an elastic body that is disposed between the first sub-bar and the second sub-bar.

15. The electronic device of claim 14, wherein the bar includes:
a first pin that protrudes in the second direction from the first sub-bar, and
a second pin that protrudes in the second direction from the second sub-bar.

16. The electronic device of claim 15,
wherein the button includes first and second recesses, each of which extends in the second direction from one face of the button, which faces in the first direction, and each of the first and second recesses is at least partially inclined, and
wherein the first pin is accommodated within the first recess and the second pin is accommodated within the second recess.

17. The electronic device of claim 16, wherein, as the button is pushed in the first direction, the first pin moves along an inclined region of the first recess and the second pin moves along an inclined region of the second recess.

18. A wearable electronic device comprising:
a housing including:
a first face that faces in a first direction,
a second face that faces in a second direction that is opposite to the first direction, and
a side face that at least partially encloses a space between the first face and the second face;
a display that is exposed through the first face of the housing; and
a coupling member that is slidingly mounted along the first direction to be attachable to/detachable from a portion of the side face that directly faces in a third direction different from the first and second directions,
wherein the coupling member is configured to detachably couple the electronic device to a user's body portion,
wherein the coupling member comprises:
a band member that is configured to come in contact with the user's body portion;
a slide member that is mounted on the band member, and bound to a portion of the housing in a state where the coupling member is mounted on the housing;
an opening that is formed in the slide member;
a locking member that is disposed on the band member, and disposed to be reciprocated between the slide member and the band member in the state where the coupling member is mounted on the housing;
a locking protrusion that is formed on the locking member; and
an elastic member that is disposed between the band member and the locking member so as to provide an elastic force in a direction that causes the locking protrusion to protrude to an outside of the slide member, and
wherein the locking protrusion appears to the outside of the slide member through the opening to bind the coupling member to the portion of the housing and disappears from the outside of the slide member to release the coupling member from the portion of the housing by the reciprocating of the locking member in the third direction.

19. A coupling member that is attachable to/detachable from a housing of an electronic device, and makes the housing wearable on a user's body, the coupling member comprising:
a band member that is configured to come in contact with the user's body portion;
a slide member that is mounted on the band member, and is bound to a portion of the housing in a state where the coupling member is mounted on the housing;
an opening that is formed in the slide member;
a locking member that is disposed on the band member, and is disposed to be reciprocated between the slide member and the band member in a state where the coupling member is mounted on the housing;
a locking protrusion that is formed on the locking member; and
an elastic member that is disposed between the band member and the locking member so as to provide an elastic force in a direction that causes the locking protrusion to protrude to the outside of the slide member,
wherein the locking protrusion appears to the outside of the slide member through the opening according to the reciprocating of the locking member, and the coupling member is bound to the housing.

20. The coupling member of claim 19,
wherein the housing of the electronic device includes:
a mounting recess that is formed on the side face to accommodate the slide member,
a protrusion that is formed on a portion of a periphery of the mounting recess,
a binding recess that is formed on the protrusion to partially face the front face of the housing, and
a locking recess that is formed on a bottom face of the mounting recess, and
wherein, in a state where the coupling member is mounted on the housing, at least opposite ends of the slide members are engaged in the binding recess and the locking protrusion is engaged in the locking recess.

21. The coupling member of claim 19,
wherein the locking member includes:
a manipulation unit that is positioned on an inner face of the band member,
a support portion that extends from the manipulation unit and between the band member and the slide member, and
guide portions that extend from opposite side ends of the manipulation unit to be in parallel to the support portion, and
wherein the locking protrusion is formed on an end of the support portion.

22. The coupling member of claim 21, further comprising:
guide protrusions that extend from the ends of the guide portions to get closer to each other; and
guide recesses that are formed on opposite side edges of the slide member, respectively,
wherein the guide protrusions are accommodated in the guide recesses, respectively, so as to guide the reciprocation of the locking member.

23. The coupling member of claim 22, wherein the guide protrusions are disposed to be deviated from the locking protrusion in a thickness direction that faces an outer face from an inner face of the band member.

24. The coupling member of claim 21, further comprising:
an accommodation recess that is formed on an inner face of the band member,
wherein at least a portion of the manipulation unit is accommodated in the accommodation recess.

25. The coupling member of claim 21, further comprising:
a mounting member that is mounted on one end of the band member; and
an operation recess that is formed on one face of the mounting member,
wherein, as the locking member is reciprocated, the support portion is reciprocated within the operation recess.

* * * * *